(12) United States Patent
Casey et al.

(10) Patent No.: US 8,478,442 B2
(45) Date of Patent: Jul. 2, 2013

(54) OBSTACLE FOLLOWING SENSOR SCHEME FOR A MOBILE ROBOT

(75) Inventors: Christopher Casey, Lexington, MA (US); Matthew Cross, Mason, NH (US); Daniel Ozick, Newton, MA (US); Joseph L. Jones, Acton, MA (US)

(73) Assignee: iRobot Corporation, Bedford, MA (US)

(*) Notice: Subject to any disclaimer, the term of this patent is extended or adjusted under 35 U.S.C. 154(b) by 209 days.

(21) Appl. No.: 12/126,757

(22) Filed: May 23, 2008

(65) Prior Publication Data

US 2009/0055022 A1 Feb. 26, 2009

Related U.S. Application Data

(63) Continuation of application No. 11/834,553, filed on Aug. 6, 2007, now Pat. No. 7,430,455, which is a continuation of application No. 11/166,986, filed on Jun. 24, 2005, which is a continuation-in-part of application No. 10/453,202, filed on Jun. 3, 2003, now Pat. No. 7,155,308, which is a continuation-in-part of application No. 09/768,773, filed on Jan. 24, 2001, now Pat. No. 6,594,844.

(60) Provisional application No. 60/177,703, filed on Jan. 24, 2000, provisional application No. 60/582,992, filed on Jun. 25, 2004.

(51) Int. Cl.
*G06F 19/00* (2011.01)

(52) U.S. Cl.
USPC .......................................................... 700/245

(58) Field of Classification Search
USPC ....... 700/245, 247, 248, 253, 258; 318/568.1,
318/568.12, 568.16, 568.17; 701/23, 25,
701/26; 15/49.1, 319; 342/127; 901/1, 47
See application file for complete search history.

(56) References Cited

U.S. PATENT DOCUMENTS

| | | | |
|---|---|---|---|
| 1,755,054 | A | 4/1930 | Darst |
| 1,780,221 | A | 11/1930 | Buchmann |
| 1,970,302 | A | 8/1934 | Gerhardt |

(Continued)

FOREIGN PATENT DOCUMENTS

| | | |
|---|---|---|
| AU | 2003275566 A1 | 6/2004 |
| DE | 2128842 C3 | 12/1980 |

(Continued)

OTHER PUBLICATIONS

Cameron Morland, *Autonomous Lawn Mower Control*, Jul. 24, 2002.

(Continued)

*Primary Examiner* — Khoi Tran
*Assistant Examiner* — Nicholas Kiswanto
(74) *Attorney, Agent, or Firm* — Fish & Richardson P.C.

(57) ABSTRACT

A robot obstacle detection system including a robot housing which navigates with respect to a surface and a sensor subsystem aimed at the surface for detecting the surface. The sensor subsystem includes an emitter which emits a signal having a field of emission and a photon detector having a field of view which intersects the field of emission at a region. The subsystem detects the presence of an object proximate the mobile robot and determines a value of a signal corresponding to the object. It compares the value to a predetermined value, moves the mobile robot in response to the comparison, and updates the predetermined value upon the occurrence of an event.

14 Claims, 28 Drawing Sheets

U.S. PATENT DOCUMENTS

| | | | |
|---|---|---|---|
| 2,136,324 A | 11/1938 | John | |
| 2,302,111 A | 11/1942 | Dow et al. | |
| 2,353,621 A | 7/1944 | Sav et al. | |
| 2,770,825 A | 11/1956 | Pullen | |
| 3,119,369 A | 1/1964 | Harland et al. | |
| 3,166,138 A | 1/1965 | Dunn | |
| 3,333,564 A | 8/1967 | Waters | |
| 3,375,375 A | 3/1968 | Robert et al. | |
| 3,381,652 A | 5/1968 | Schaefer et al. | |
| 3,457,575 A | 7/1969 | Bienek | |
| 3,550,714 A | 12/1970 | Bellinger | |
| 3,569,727 A | 3/1971 | Aggarwal et al. | |
| 3,674,316 A | 7/1972 | De Brey | |
| 3,678,882 A | 7/1972 | Kinsella | |
| 3,744,586 A | 7/1973 | Leinauer | |
| 3,756,667 A | 9/1973 | Bombardier et al. | |
| 3,809,004 A | 5/1974 | Leonheart | |
| 3,816,004 A | 6/1974 | Bignardi | |
| 3,845,831 A | 11/1974 | James | |
| RE28,268 E | 12/1974 | Autrand | |
| 3,853,086 A | 12/1974 | Asplund | |
| 3,863,285 A | 2/1975 | Hukuba | |
| 3,888,181 A | 6/1975 | Kups | |
| 3,937,174 A | 2/1976 | Haaga | |
| 3,952,361 A | 4/1976 | Wilkins | |
| 3,989,311 A | 11/1976 | Debrey | |
| 3,989,931 A | 11/1976 | Phillips | |
| 4,004,313 A | 1/1977 | Capra | |
| 4,012,681 A | 3/1977 | Finger et al. | |
| 4,070,170 A | 1/1978 | Leinfelt | |
| 4,099,284 A | 7/1978 | Shinozaki et al. | |
| 4,119,900 A | 10/1978 | Kremnitz | |
| 4,175,589 A | 11/1979 | Nakamura et al. | |
| 4,175,892 A | 11/1979 | De brey | |
| 4,196,727 A * | 4/1980 | Verkaart et al. | 128/202.23 |
| 4,198,727 A | 4/1980 | Farmer | |
| 4,199,838 A | 4/1980 | Simonsson | |
| 4,209,254 A | 6/1980 | Reymond et al. | |
| D258,901 S | 4/1981 | Keyworth | |
| 4,297,578 A | 10/1981 | Carter | |
| 4,306,329 A | 12/1981 | Yokoi | |
| 4,309,758 A | 1/1982 | Halsall et al. | |
| 4,328,545 A | 5/1982 | Halsall et al. | |
| 4,367,403 A | 1/1983 | Miller | |
| 4,369,543 A | 1/1983 | Chen et al. | |
| 4,401,909 A | 8/1983 | Gorsek | |
| 4,416,033 A | 11/1983 | Specht | |
| 4,445,245 A | 5/1984 | Lu | |
| 4,465,370 A | 8/1984 | Yuasa et al. | |
| 4,477,998 A | 10/1984 | You | |
| 4,481,692 A | 11/1984 | Kurz | |
| 4,482,960 A | 11/1984 | Pryor | |
| 4,492,058 A | 1/1985 | Goldfarb et al. | |
| 4,513,469 A | 4/1985 | Godfrey et al. | |
| D278,732 S | 5/1985 | Ohkado | |
| 4,518,437 A | 5/1985 | Sommer | |
| 4,534,637 A | 8/1985 | Suzuki et al. | |
| 4,556,313 A | 12/1985 | Miller et al. | |
| 4,575,211 A | 3/1986 | Matsumura et al. | |
| 4,580,311 A | 4/1986 | Kurz | |
| 4,596,412 A | 6/1986 | Everett et al. | |
| 4,601,082 A | 7/1986 | Kurz | |
| 4,618,213 A | 10/1986 | Chen | |
| 4,620,285 A | 10/1986 | Perdue | |
| 4,624,026 A | 11/1986 | Olson et al. | |
| 4,626,995 A | 12/1986 | Lofgren et al. | |
| 4,628,454 A | 12/1986 | Ito | |
| 4,638,445 A | 1/1987 | Mattaboni | |
| 4,644,156 A | 2/1987 | Takahashi et al. | |
| 4,649,504 A | 3/1987 | Krouglicof et al. | |
| 4,652,917 A | 3/1987 | Miller | |
| 4,654,492 A | 3/1987 | Koerner et al. | |
| 4,654,924 A | 4/1987 | Getz et al. | |
| 4,660,969 A | 4/1987 | Sorimachi et al. | |
| 4,662,854 A | 5/1987 | Fang | |
| 4,674,048 A | 6/1987 | Okumura | |
| 4,679,152 A | 7/1987 | Perdue | |
| 4,680,827 A | 7/1987 | Hummel | |
| 4,696,074 A | 9/1987 | Cavalli et al. | |
| D292,223 S | 10/1987 | Trumbull | |
| 4,700,301 A | 10/1987 | Dyke | |
| 4,700,427 A | 10/1987 | Knepper | |
| 4,703,820 A | 11/1987 | Reinaud | |
| 4,710,020 A | 12/1987 | Maddox et al. | |
| 4,716,621 A | 1/1988 | Zoni | |
| 4,728,801 A | 3/1988 | O'Connor | |
| 4,733,343 A | 3/1988 | Yoneda et al. | |
| 4,733,430 A | 3/1988 | Westergren | |
| 4,733,431 A | 3/1988 | Martin | |
| 4,735,136 A | 4/1988 | Lee et al. | |
| 4,735,138 A | 4/1988 | Gawler et al. | |
| 4,748,336 A | 5/1988 | Fujie et al. | |
| 4,748,833 A | 6/1988 | Nagasawa | |
| 4,756,049 A | 7/1988 | Uehara | |
| 4,767,213 A | 8/1988 | Hummel | |
| 4,769,700 A | 9/1988 | Pryor | |
| 4,777,416 A | 10/1988 | George, II et al. | |
| D298,766 S | 11/1988 | Tanno et al. | |
| 4,782,550 A | 11/1988 | Jacobs | |
| 4,796,198 A | 1/1989 | Boultinghouse et al. | |
| 4,806,751 A | 2/1989 | Abe et al. | |
| 4,811,228 A | 3/1989 | Hyyppa | |
| 4,813,906 A | 3/1989 | Matsuyama et al. | |
| 4,815,157 A | 3/1989 | Tsuchiya | |
| 4,817,000 A | 3/1989 | Eberhardt | |
| 4,818,875 A | 4/1989 | Weiner | |
| 4,829,442 A | 5/1989 | Kadonoff et al. | |
| 4,829,626 A | 5/1989 | Harkonen et al. | |
| 4,832,098 A | 5/1989 | Palinkas et al. | |
| 4,851,661 A | 7/1989 | Everett | |
| 4,854,000 A | 8/1989 | Takimoto | |
| 4,854,006 A * | 8/1989 | Nishimura et al. | 15/375 |
| 4,855,915 A | 8/1989 | Dallaire | |
| 4,857,912 A | 8/1989 | Everett et al. | |
| 4,858,132 A | 8/1989 | Holmquist | |
| 4,867,570 A | 9/1989 | Sorimachi et al. | |
| 4,878,003 A | 10/1989 | Knepper | |
| 4,880,474 A | 11/1989 | Koharagi et al. | |
| 4,887,415 A | 12/1989 | Martin | |
| 4,891,762 A | 1/1990 | Chotiros | |
| 4,893,025 A | 1/1990 | Lee | |
| 4,901,394 A | 2/1990 | Nakamura et al. | |
| 4,905,151 A | 2/1990 | Weiman et al. | |
| 4,912,643 A | 3/1990 | Beirne | |
| 4,918,441 A | 4/1990 | Bohman | |
| 4,919,224 A | 4/1990 | Shyu et al. | |
| 4,919,489 A | 4/1990 | Kopsco | |
| 4,920,060 A | 4/1990 | Parrent et al. | |
| 4,920,605 A | 5/1990 | Takashima | |
| 4,933,864 A | 6/1990 | Evans et al. | |
| 4,937,912 A | 7/1990 | Kurz | |
| 4,949,277 A | 8/1990 | Trovato et al. | |
| 4,953,253 A | 9/1990 | Fukuda et al. | |
| 4,954,962 A | 9/1990 | Evans et al. | |
| 4,955,714 A | 9/1990 | Stotler et al. | |
| 4,956,891 A | 9/1990 | Wulff | |
| 4,961,303 A | 10/1990 | McCarty et al. | |
| 4,961,304 A | 10/1990 | Ovsborn et al. | |
| 4,962,453 A | 10/1990 | Pong et al. | |
| 4,971,591 A | 11/1990 | Raviv et al. | |
| 4,973,912 A | 11/1990 | Kaminski et al. | |
| 4,974,283 A | 12/1990 | Holsten et al. | |
| 4,977,618 A | 12/1990 | Allen | |
| 4,977,639 A | 12/1990 | Takahashi et al. | |
| 4,986,663 A | 1/1991 | Cecchi et al. | |
| 5,001,635 A | 3/1991 | Yasutomi et al. | |
| 5,002,145 A | 3/1991 | Waqkaumi et al. | |
| 5,012,886 A | 5/1991 | Jonas et al. | |
| 5,018,240 A | 5/1991 | Holman | |
| 5,020,186 A | 6/1991 | Lessig et al. | |
| 5,022,812 A | 6/1991 | Coughlan et al. | |
| 5,023,788 A | 6/1991 | Kitazume et al. | |
| 5,024,529 A | 6/1991 | Svetkoff et al. | |
| D318,500 S | 7/1991 | Malewicki et al. | |
| 5,032,775 A * | 7/1991 | Mizuno et al. | 701/25 |
| 5,033,151 A | 7/1991 | Kraft et al. | |
| 5,033,291 A | 7/1991 | Podoloff et al. | |

| | | | | | | |
|---|---|---|---|---|---|---|
| 5,040,116 A | 8/1991 | Evans et al. | | 5,440,216 A | 8/1995 | Kim |
| 5,045,769 A | 9/1991 | Everett | | 5,442,358 A | 8/1995 | Keeler et al. |
| 5,049,802 A | 9/1991 | Mintus et al. | | 5,444,965 A | 8/1995 | Colens |
| 5,051,906 A | 9/1991 | Evans et al. | | 5,446,356 A | 8/1995 | Kim |
| 5,062,819 A | 11/1991 | Mallory | | 5,451,135 A | 9/1995 | Schempf et al. |
| 5,070,567 A | 12/1991 | Holland | | 5,454,129 A | 10/1995 | Kell |
| 5,084,934 A | 2/1992 | Lessig et al. | | 5,455,982 A | 10/1995 | Armstrong et al. |
| 5,086,535 A | 2/1992 | Grossmeyer et al. | | 5,465,525 A | 11/1995 | Mifune et al. |
| 5,090,321 A | 2/1992 | Abouav | | 5,465,619 A | 11/1995 | Sotack et al. |
| 5,093,955 A | 3/1992 | Blehert et al. | | 5,467,273 A | 11/1995 | Faibish et al. |
| 5,094,311 A | 3/1992 | Akeel | | 5,471,560 A | 11/1995 | Allard et al. |
| 5,105,502 A | 4/1992 | Takashima | | 5,491,670 A | 2/1996 | Weber |
| 5,105,550 A | 4/1992 | Shenoha | | 5,497,529 A | 3/1996 | Boesi |
| 5,109,566 A | 5/1992 | Kobayashi et al. | | 5,498,948 A | 3/1996 | Bruni et al. |
| 5,111,401 A | 5/1992 | Everett, Jr. et al. | | 5,502,638 A | 3/1996 | Takenaka |
| 5,115,538 A | 5/1992 | Cochran et al. | | 5,505,072 A | 4/1996 | Oreper |
| 5,127,128 A | 7/1992 | Lee | | 5,507,067 A | 4/1996 | Hoekstra et al. |
| 5,136,675 A | 8/1992 | Hodson | | 5,510,893 A | 4/1996 | Suzuki |
| 5,136,750 A | 8/1992 | Takashima et al. | | 5,511,147 A | 4/1996 | Abdel-Malek |
| 5,142,985 A | 9/1992 | Stearns et al. | | 5,515,572 A | 5/1996 | Hoekstra et al. |
| 5,144,471 A | 9/1992 | Takanashi et al. | | 5,534,762 A | 7/1996 | Kim |
| 5,144,714 A | 9/1992 | Mori et al. | | 5,537,017 A | 7/1996 | Feiten et al. |
| 5,144,715 A | 9/1992 | Matsuyo et al. | | 5,537,711 A | 7/1996 | Tseng |
| 5,152,028 A | 10/1992 | Hirano | | 5,539,953 A | 7/1996 | Kurz |
| 5,152,202 A | 10/1992 | Strauss | | 5,542,146 A | 8/1996 | Hoekstra et al. |
| 5,154,617 A | 10/1992 | Suman et al. | | 5,542,148 A | 8/1996 | Young |
| 5,155,684 A | 10/1992 | Burke et al. | | 5,546,631 A | 8/1996 | Chambon |
| 5,163,202 A | 11/1992 | Kawakami et al. | | 5,548,511 A | 8/1996 | Bancroft |
| 5,163,320 A | 11/1992 | Goshima et al. | | 5,551,119 A | 9/1996 | Wörwag |
| 5,164,579 A | 11/1992 | Pryor et al. | | 5,551,525 A | 9/1996 | Pack et al. |
| 5,165,064 A | 11/1992 | Mattaboni | | 5,553,349 A | 9/1996 | Kilstrom et al. |
| 5,170,352 A | 12/1992 | McTamaney et al. | | 5,555,587 A | 9/1996 | Guha |
| 5,173,881 A | 12/1992 | Sindle | | 5,560,077 A | 10/1996 | Crotchett |
| 5,182,833 A | 2/1993 | Yamaguchi et al. | | 5,568,589 A | 10/1996 | Hwang |
| 5,187,662 A | 2/1993 | Kamimura et al. | | D375,592 S | 11/1996 | Ljunggren |
| 5,202,742 A | 4/1993 | Frank et al. | | 5,608,306 A | 3/1997 | Rybeck et al. |
| 5,204,814 A | 4/1993 | Noonan et al. | | 5,608,894 A | 3/1997 | Kawakami et al. |
| 5,206,500 A | 4/1993 | Decker et al. | | 5,608,944 A | 3/1997 | Gordon |
| 5,208,521 A * | 5/1993 | Aoyama ...................... 318/587 | | 5,610,488 A | 3/1997 | Miyazawa |
| 5,216,777 A | 6/1993 | Moro et al. | | 5,611,106 A | 3/1997 | Wulff |
| 5,227,985 A | 7/1993 | DeMenthon | | 5,611,108 A | 3/1997 | Knowlton et al. |
| 5,233,682 A | 8/1993 | Abe et al. | | 5,613,261 A | 3/1997 | Kawakami et al. |
| 5,239,720 A | 8/1993 | Wood et al. | | 5,613,269 A | 3/1997 | Miwa |
| 5,251,358 A | 10/1993 | Moro et al. | | 5,621,291 A * | 4/1997 | Lee ........................... 318/568.16 |
| 5,261,139 A | 11/1993 | Lewis | | 5,622,236 A | 4/1997 | Azumi et al. |
| 5,276,618 A | 1/1994 | Everett | | 5,634,237 A | 6/1997 | Paranjpe |
| 5,276,939 A | 1/1994 | Uenishi | | 5,634,239 A | 6/1997 | Tuvin et al. |
| 5,277,064 A | 1/1994 | Knigga et al. | | 5,636,402 A | 6/1997 | Kubo et al. |
| 5,279,672 A | 1/1994 | Betker, Jr. et al. | | 5,642,299 A | 6/1997 | Hardin et al. |
| 5,284,452 A | 2/1994 | Corona | | 5,646,494 A | 7/1997 | Han |
| 5,284,522 A | 2/1994 | Kobayashi et al. | | 5,647,554 A | 7/1997 | Ikegami et al. |
| 5,293,955 A | 3/1994 | Lee | | 5,650,702 A | 7/1997 | Azumi |
| D345,707 S | 4/1994 | Alister | | 5,652,489 A | 7/1997 | Kawakami |
| 5,303,448 A | 4/1994 | Hennessey et al. | | 5,682,313 A * | 10/1997 | Edlund et al. ................. 342/127 |
| 5,307,273 A * | 4/1994 | Oh et al. ...................... 702/127 | | 5,682,839 A | 11/1997 | Grimsley et al. |
| 5,309,592 A | 5/1994 | Hiratsuka | | 5,696,675 A | 12/1997 | Nakamura et al. |
| 5,310,379 A | 5/1994 | Hippely et al. | | 5,698,861 A | 12/1997 | Oh |
| 5,315,227 A | 5/1994 | Pierson et al. | | 5,709,007 A | 1/1998 | Chiang |
| 5,319,827 A | 6/1994 | Yang | | 5,710,506 A | 1/1998 | Broell et al. |
| 5,319,828 A | 6/1994 | Waldhauser et al. | | 5,714,119 A | 2/1998 | Kawagoe et al. |
| 5,321,614 A | 6/1994 | Ashworth | | 5,717,169 A | 2/1998 | Liang et al. |
| 5,323,483 A | 6/1994 | Baeg | | 5,717,484 A | 2/1998 | Hamaguchi et al. |
| 5,324,948 A | 6/1994 | Dudar et al. | | 5,720,077 A | 2/1998 | Nakamura et al. |
| 5,341,186 A | 8/1994 | Kato | | 5,732,401 A | 3/1998 | Conway |
| 5,341,540 A | 8/1994 | Soupert et al. | | 5,735,959 A | 4/1998 | Kubo et al. |
| 5,341,549 A | 8/1994 | Wirtz et al. | | 5,745,235 A | 4/1998 | Vercammen et al. |
| 5,345,649 A | 9/1994 | Whitlow | | 5,752,871 A | 5/1998 | Tsuzuki |
| 5,352,901 A | 10/1994 | Poorman | | 5,756,904 A | 5/1998 | Oreper et al. |
| 5,353,224 A | 10/1994 | Lee et al. | | 5,761,762 A | 6/1998 | Kubo et al. |
| 5,363,305 A | 11/1994 | Cox et al. | | 5,764,888 A | 6/1998 | Bolan et al. |
| 5,363,935 A | 11/1994 | Schempf et al. | | 5,767,437 A | 6/1998 | Rogers |
| 5,369,347 A | 11/1994 | Yoo | | 5,767,960 A | 6/1998 | Orman |
| 5,369,838 A | 12/1994 | Wood et al. | | 5,770,936 A | 6/1998 | Hirai et al. |
| 5,386,862 A | 2/1995 | Glover et al. | | 5,777,596 A | 7/1998 | Herbert |
| 5,399,951 A | 3/1995 | Lavallee et al. | | 5,778,486 A | 7/1998 | Kim |
| 5,400,244 A | 3/1995 | Watanabe et al. | | 5,781,697 A | 7/1998 | Jeong |
| 5,404,612 A | 4/1995 | Ishikawa | | 5,781,960 A | 7/1998 | Kilstrom et al. |
| 5,410,479 A | 4/1995 | Coker | | 5,786,602 A | 7/1998 | Pryor et al. |
| 5,435,405 A | 7/1995 | Schempf et al. | | 5,787,545 A | 8/1998 | Colens |

| | | | | | | |
|---|---|---|---|---|---|---|
| 5,793,900 A | 8/1998 | Nourbakhsh et al. | | 6,076,026 A | 6/2000 | Jambhekar et al. |
| 5,794,297 A | 8/1998 | Muta | | 6,076,226 A | 6/2000 | Reed |
| 5,812,267 A | 9/1998 | Everett, Jr. et al. | | 6,076,227 A | 6/2000 | Schallig et al. |
| 5,814,808 A | 9/1998 | Takada et al. | | 6,081,257 A | 6/2000 | Zeller |
| 5,815,880 A | 10/1998 | Nakanishi | | 6,088,020 A | 7/2000 | Mor |
| 5,815,884 A | 10/1998 | Imamura et al. | | 6,094,775 A | 8/2000 | Behmer |
| 5,819,008 A | 10/1998 | Asama et al. | | 6,099,091 A | 8/2000 | Campbell |
| 5,819,360 A | 10/1998 | Fujii | | 6,101,670 A | 8/2000 | Song |
| 5,819,936 A | 10/1998 | Saveliev et al. | | 6,101,671 A | 8/2000 | Wright et al. |
| 5,820,821 A | 10/1998 | Kawagoe et al. | | 6,108,031 A | 8/2000 | King et al. |
| 5,821,730 A | 10/1998 | Drapkin | | 6,108,076 A | 8/2000 | Hanseder |
| 5,825,981 A | 10/1998 | Matsuda | | 6,108,269 A | 8/2000 | Kabel |
| 5,828,770 A | 10/1998 | Leis et al. | | 6,108,597 A | 8/2000 | Kirchner et al. |
| 5,831,597 A | 11/1998 | West et al. | | 6,112,143 A | 8/2000 | Allen et al. |
| 5,839,156 A | 11/1998 | Park et al. | | 6,112,996 A | 9/2000 | Matsuo |
| 5,839,532 A | 11/1998 | Yoshiji et al. | | 6,119,057 A | 9/2000 | Kawagoe |
| 5,841,259 A | 11/1998 | Kim et al. | | 6,122,798 A | 9/2000 | Kobayashi et al. |
| 5,867,800 A | 2/1999 | Leif | | 6,124,694 A | 9/2000 | Bancroft et al. |
| 5,867,861 A | 2/1999 | Kasen et al. | | 6,125,498 A | 10/2000 | Roberts et al. |
| 5,869,910 A | 2/1999 | Colens | | 6,131,237 A | 10/2000 | Kasper et al. |
| 5,896,611 A | 4/1999 | Haaga | | 6,138,063 A | 10/2000 | Himeda |
| 5,903,124 A * | 5/1999 | Kawakami ............... 318/587 | | 6,142,252 A | 11/2000 | Kinto et al. |
| 5,905,209 A | 5/1999 | Oreper | | 6,146,278 A | 11/2000 | Kobayashi |
| 5,907,886 A | 6/1999 | Buscher | | 6,154,279 A | 11/2000 | Thayer |
| 5,910,700 A | 6/1999 | Crotzer | | 6,154,694 A | 11/2000 | Aoki et al. |
| 5,911,260 A | 6/1999 | Suzuki | | 6,160,479 A | 12/2000 | Åhlen et al. |
| 5,916,008 A | 6/1999 | Wong | | 6,167,332 A | 12/2000 | Kurtzberg et al. |
| 5,924,167 A | 7/1999 | Wright et al. | | 6,167,587 B1 | 1/2001 | Kasper et al. |
| 5,926,909 A | 7/1999 | McGee | | 6,192,548 B1 | 2/2001 | Huffman |
| 5,933,102 A | 8/1999 | Miller et al. | | 6,216,307 B1 | 4/2001 | Kaleta et al. |
| 5,933,913 A | 8/1999 | Wright et al. | | 6,220,865 B1 | 4/2001 | Macri et al. |
| 5,935,179 A | 8/1999 | Kleiner et al. | | 6,226,830 B1 | 5/2001 | Hendriks et al. |
| 5,940,346 A | 8/1999 | Sadowsky et al. | | 6,230,362 B1 | 5/2001 | Kasper et al. |
| 5,940,927 A | 8/1999 | Haegermarck et al. | | 6,237,741 B1 | 5/2001 | Guidetti |
| 5,940,928 A | 8/1999 | Erko | | 6,240,342 B1 | 5/2001 | Fiegert et al. |
| 5,940,930 A | 8/1999 | Oh et al. | | 6,243,913 B1 | 6/2001 | Frank et al. |
| 5,942,869 A | 8/1999 | Katou et al. | | 6,255,793 B1 | 7/2001 | Peless et al. |
| 5,943,730 A | 8/1999 | Boomgaarden | | 6,259,979 B1 | 7/2001 | Holmquist |
| 5,943,733 A | 8/1999 | Tagliaferri | | 6,261,379 B1 | 7/2001 | Conrad et al. |
| 5,947,225 A | 9/1999 | Kawakami et al. | | 6,263,539 B1 | 7/2001 | Baig |
| 5,950,408 A | 9/1999 | Schaedler | | 6,263,989 B1 | 7/2001 | Won |
| 5,959,423 A | 9/1999 | Nakanishi et al. | | 6,272,936 B1 | 8/2001 | Oreper et al. |
| 5,968,281 A | 10/1999 | Wright et al. | | 6,276,478 B1 | 8/2001 | Hopkins et al. |
| 5,974,348 A | 10/1999 | Rocks | | 6,278,918 B1 | 8/2001 | Dickson et al. |
| 5,974,365 A | 10/1999 | Mitchell | | 6,282,526 B1 | 8/2001 | Ganesh |
| 5,983,448 A | 11/1999 | Wright et al. | | 6,283,034 B1 | 9/2001 | Miles |
| 5,984,880 A | 11/1999 | Lander et al. | | 6,285,778 B1 | 9/2001 | Nakajima et al. |
| 5,987,383 A | 11/1999 | Keller et al. | | 6,285,930 B1 | 9/2001 | Dickson et al. |
| 5,989,700 A | 11/1999 | Krivopal | | 6,300,737 B1 | 10/2001 | Bergvall et al. |
| 5,991,951 A | 11/1999 | Kubo et al. | | 6,321,337 B1 | 11/2001 | Reshef et al. |
| 5,995,883 A | 11/1999 | Nishikado | | 6,321,515 B1 | 11/2001 | Colens |
| 5,995,884 A | 11/1999 | Allen et al. | | 6,323,570 B1 | 11/2001 | Nishimura et al. |
| 5,996,167 A | 12/1999 | Close | | 6,324,714 B1 | 12/2001 | Walz et al. |
| 5,998,953 A | 12/1999 | Nakamura et al. | | 6,327,741 B1 | 12/2001 | Reed |
| 5,998,971 A | 12/1999 | Corbridge | | 6,332,400 B1 | 12/2001 | Meyer |
| 6,000,088 A | 12/1999 | Wright et al. | | 6,339,735 B1 | 1/2002 | Peless et al. |
| 6,009,358 A | 12/1999 | Angott et al. | | 6,362,875 B1 | 3/2002 | Burkley |
| 6,021,545 A | 2/2000 | Delgado et al. | | 6,370,453 B2 | 4/2002 | Sommer |
| 6,023,813 A | 2/2000 | Thatcher et al. | | 6,374,155 B1 | 4/2002 | Wallach et al. |
| 6,023,814 A | 2/2000 | Imamura | | 6,381,802 B2 | 5/2002 | Park |
| 6,025,687 A | 2/2000 | Himeda et al. | | 6,385,515 B1 | 5/2002 | Dickson et al. |
| 6,026,539 A | 2/2000 | Mouw et al. | | 6,388,013 B1 | 5/2002 | Saraf et al. |
| 6,030,464 A | 2/2000 | Azevedo | | 6,389,329 B1 | 5/2002 | Colens |
| 6,030,465 A | 2/2000 | Marcussen et al. | | 6,400,048 B1 | 6/2002 | Nishimura et al. |
| 6,032,542 A | 3/2000 | Warnick et al. | | 6,401,294 B2 | 6/2002 | Kasper |
| 6,036,572 A | 3/2000 | Sze | | 6,408,226 B1 | 6/2002 | Byrne et al. |
| 6,038,501 A | 3/2000 | Kawakami | | 6,412,141 B1 | 7/2002 | Azotea |
| 6,040,669 A | 3/2000 | Hog | | 6,415,203 B1 | 7/2002 | Inoue et al. |
| 6,041,471 A | 3/2000 | Charky et al. | | 6,421,870 B1 | 7/2002 | Basham et al. |
| 6,041,472 A | 3/2000 | Kasen et al. | | 6,427,285 B1 | 8/2002 | Legatt et al. |
| 6,046,800 A | 4/2000 | Ohtomo et al. | | 6,430,471 B1 | 8/2002 | Kintou et al. |
| 6,049,620 A | 4/2000 | Dickinson et al. | | 6,431,296 B1 | 8/2002 | Won |
| 6,052,821 A | 4/2000 | Chouly et al. | | 6,437,227 B1 | 8/2002 | Theimer |
| 6,055,042 A | 4/2000 | Sarangapani | | 6,437,465 B1 | 8/2002 | Nishimura et al. |
| 6,055,702 A | 5/2000 | Imamura et al. | | 6,438,456 B1 | 8/2002 | Feddema et al. |
| 6,061,868 A | 5/2000 | Moritsch et al. | | 6,438,793 B1 | 8/2002 | Miner et al. |
| 6,065,182 A | 5/2000 | Wright et al. | | 6,442,476 B1 | 8/2002 | Poropat |
| 6,073,432 A | 6/2000 | Schaedler | | 6,443,509 B1 | 9/2002 | Levin et al. |
| 6,076,025 A | 6/2000 | Ueno et al. | | 6,444,003 B1 | 9/2002 | Sutcliffe |

| Patent | Date | Inventor |
|---|---|---|
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 * | 12/2002 | Wallach et al. ............... 700/245 |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,525,509 B1 | 2/2003 | Petersson et al. |
| D471,243 S | 3/2003 | Cioffi et al. |
| 6,532,404 B2 | 3/2003 | Colens |
| 6,535,793 B2 | 3/2003 | Allard |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| 6,597,076 B2 | 7/2003 | Scheible et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker |
| 6,605,156 B1 * | 8/2003 | Clark et al. ................ 134/6 |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed, Jr. |
| 6,661,239 B1 | 12/2003 | Ozik |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 * | 12/2003 | Bisset et al. ............ 701/23 |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,711,280 B2 | 3/2004 | Stafsudd et al. |
| 6,732,826 B2 | 5/2004 | Song et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,830,120 B1 * | 12/2004 | Yashima et al. ............... 180/167 |
| 6,832,407 B2 | 12/2004 | Salem et al. |
| 6,836,701 B2 | 12/2004 | McKee |
| 6,841,963 B2 * | 1/2005 | Song et al. ............... 318/568.12 |
| 6,845,297 B2 | 1/2005 | Allard |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 * | 6/2005 | Mori et al. ............... 15/319 |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozik |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,041,029 B2 | 5/2006 | Fulghum et al. |
| 7,053,578 B2 | 5/2006 | Diehl et al. |
| 7,054,716 B2 | 5/2006 | McKee et al. |
| 7,057,120 B2 | 6/2006 | Ma et al. |
| 7,057,643 B2 | 6/2006 | Iida et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 * | 8/2006 | Aldred et al. ............... 700/253 |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 * | 12/2006 | Jones ............... 700/245 |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 * | 4/2007 | Hulden ............... 701/23 |
| 7,211,980 B1 | 5/2007 | Bruemmer et al. |

| | | | | | | |
|---|---|---|---|---|---|---|
| 7,246,405 B2 | 7/2007 | Yan | | 2002/0120364 A1 | 8/2002 | Colens |
| 7,248,951 B2 | 7/2007 | Huldén | | 2002/0124343 A1 | 9/2002 | Reed |
| 7,275,280 B2 | 10/2007 | Haegermarck et al. | | 2002/0153185 A1 | 10/2002 | Song et al. |
| 7,283,892 B1 | 10/2007 | Boillot et al. | | 2002/0156556 A1 | 10/2002 | Ruffner |
| 7,288,912 B2 | 10/2007 | Landry et al. | | 2002/0159051 A1 | 10/2002 | Guo |
| 7,318,248 B1 | 1/2008 | Yan | | 2002/0166193 A1 | 11/2002 | Kasper |
| 7,320,149 B1 | 1/2008 | Huffman et al. | | 2002/0169521 A1 | 11/2002 | Goodman et al. |
| 7,324,870 B2 | 1/2008 | Lee | | 2002/0173877 A1 | 11/2002 | Zweig |
| 7,328,196 B2 | 2/2008 | Peters | | 2002/0189871 A1 | 12/2002 | Won |
| 7,332,890 B2 | 2/2008 | Cohen et al. | | 2003/0009259 A1 | 1/2003 | Hattori et al. |
| 7,352,153 B2 | 4/2008 | Yan | | 2003/0019071 A1 | 1/2003 | Field et al. |
| 7,359,766 B2 | 4/2008 | Jeon et al. | | 2003/0023356 A1 | 1/2003 | Keable |
| 7,360,277 B2 | 4/2008 | Moshenrose et al. | | 2003/0024986 A1 | 2/2003 | Mazz et al. |
| 7,363,108 B2 | 4/2008 | Noda et al. | | 2003/0025472 A1 | 2/2003 | Jones et al. |
| 7,388,879 B2 | 6/2008 | Sabe et al. | | 2003/0028286 A1 | 2/2003 | Glenn et al. |
| 7,389,166 B2 | 6/2008 | Harwig et al. | | 2003/0030399 A1 | 2/2003 | Jacobs |
| 7,408,157 B2 | 8/2008 | Yan | | 2003/0058262 A1 | 3/2003 | Sato et al. |
| 7,418,762 B2 | 9/2008 | Arai et al. | | 2003/0060928 A1 | 3/2003 | Abramson et al. |
| 7,430,455 B2 * | 9/2008 | Casey et al. .................. 700/245 | | 2003/0067451 A1 | 4/2003 | Tagg et al. |
| 7,430,462 B2 | 9/2008 | Chiu et al. | | 2003/0097875 A1 | 5/2003 | Lentz et al. |
| 7,441,298 B2 | 10/2008 | Svendsen et al. | | 2003/0120389 A1 | 6/2003 | Abramson et al. |
| 7,444,206 B2 | 10/2008 | Abramson et al. | | 2003/0124312 A1 | 7/2003 | Autumn |
| 7,448,113 B2 | 11/2008 | Jones et al. | | 2003/0126352 A1 | 7/2003 | Barrett |
| 7,459,871 B2 | 12/2008 | Landry et al. | | 2003/0137268 A1 | 7/2003 | Papanikolopoulos et al. |
| 7,467,026 B2 | 12/2008 | Sakagami et al. | | 2003/0146384 A1 | 8/2003 | Logsdon et al. |
| 7,474,941 B2 | 1/2009 | Kim et al. | | 2003/0159232 A1 | 8/2003 | Hekman et al. |
| 7,503,096 B2 | 3/2009 | Lin | | 2003/0192144 A1 | 10/2003 | Song et al. |
| 7,515,991 B2 | 4/2009 | Egawa et al. | | 2003/0193657 A1 | 10/2003 | Uomori et al. |
| 7,555,363 B2 | 6/2009 | Augenbraun et al. | | 2003/0216834 A1 | 11/2003 | Allard |
| 7,557,703 B2 | 7/2009 | Yamada et al. | | 2003/0221114 A1 | 11/2003 | Hino et al. |
| 7,568,259 B2 | 8/2009 | Yan | | 2003/0229421 A1 | 12/2003 | Chmura et al. |
| 7,571,511 B2 | 8/2009 | Jones et al. | | 2003/0229474 A1 | 12/2003 | Suzuki et al. |
| 7,578,020 B2 | 8/2009 | Jaworski et al. | | 2003/0233171 A1 | 12/2003 | Heiligensetzer |
| 7,600,521 B2 | 10/2009 | Woo | | 2003/0233177 A1 | 12/2003 | Johnson et al. |
| 7,603,744 B2 | 10/2009 | Reindle | | 2003/0233870 A1 | 12/2003 | Mancevski |
| 7,617,557 B2 | 11/2009 | Reindle | | 2003/0233930 A1 | 12/2003 | Ozick |
| 7,620,476 B2 | 11/2009 | Morse et al. | | 2004/0016077 A1 | 1/2004 | Song et al. |
| 7,636,928 B2 | 12/2009 | Uno | | 2004/0020000 A1 | 2/2004 | Jones |
| 7,636,982 B2 | 12/2009 | Jones et al. | | 2004/0030448 A1 | 2/2004 | Solomon |
| 7,647,144 B2 | 1/2010 | Haegermarck | | 2004/0030449 A1 | 2/2004 | Solomon |
| 7,650,666 B2 | 1/2010 | Jang | | 2004/0030450 A1 | 2/2004 | Solomon |
| 7,660,650 B2 | 2/2010 | Kawagoe et al. | | 2004/0030451 A1 | 2/2004 | Solomon |
| 7,663,333 B2 | 2/2010 | Jones et al. | | 2004/0030570 A1 | 2/2004 | Solomon |
| 7,693,605 B2 | 4/2010 | Park | | 2004/0030571 A1 | 2/2004 | Solomon |
| 7,706,917 B1 | 4/2010 | Chiappetta et al. | | 2004/0031113 A1 | 2/2004 | Wosewick et al. |
| 7,765,635 B2 | 8/2010 | Park | | 2004/0049877 A1 | 3/2004 | Jones et al. |
| 7,801,645 B2 | 9/2010 | Taylor et al. | | 2004/0055163 A1 | 3/2004 | McCambridge et al. |
| 7,805,220 B2 | 9/2010 | Taylor et al. | | 2004/0068351 A1 | 4/2004 | Solomon |
| 7,809,944 B2 | 10/2010 | Kawamoto | | 2004/0068415 A1 | 4/2004 | Solomon |
| 7,849,555 B2 | 12/2010 | Hahm et al. | | 2004/0068416 A1 | 4/2004 | Solomon |
| 7,853,645 B2 | 12/2010 | Brown et al. | | 2004/0074038 A1 | 4/2004 | Im et al. |
| 7,860,680 B2 | 12/2010 | Arms et al. | | 2004/0076324 A1 | 4/2004 | Burl et al. |
| 7,920,941 B2 | 4/2011 | Park et al. | | 2004/0083570 A1 | 5/2004 | Song et al. |
| 7,937,800 B2 | 5/2011 | Yan | | 2004/0085037 A1 | 5/2004 | Jones et al. |
| 7,957,836 B2 | 6/2011 | Myeong et al. | | 2004/0088079 A1 | 5/2004 | Lavarec et al. |
| 8,087,117 B2 | 1/2012 | Kapoor et al. | | 2004/0093122 A1 | 5/2004 | Galibraith |
| 2001/0004719 A1 | 6/2001 | Sommer | | 2004/0098167 A1 | 5/2004 | Yi et al. |
| 2001/0013929 A1 | 8/2001 | Torsten | | 2004/0111184 A1 | 6/2004 | Chiappetta et al. |
| 2001/0020200 A1 | 9/2001 | Das et al. | | 2004/0111821 A1 | 6/2004 | Lenkiewicz et al. |
| 2001/0025183 A1 | 9/2001 | Shahidi | | 2004/0113777 A1 | 6/2004 | Matsuhira et al. |
| 2001/0037163 A1 | 11/2001 | Allard | | 2004/0117064 A1 | 6/2004 | McDonald |
| 2001/0043509 A1 | 11/2001 | Green et al. | | 2004/0117846 A1 | 6/2004 | Karaoguz et al. |
| 2001/0045883 A1 | 11/2001 | Holdaway et al. | | 2004/0118998 A1 | 6/2004 | Wingett et al. |
| 2001/0047231 A1 | 11/2001 | Peless et al. | | 2004/0128028 A1 | 7/2004 | Miyamoto et al. |
| 2001/0047895 A1 | 12/2001 | De Fazio et al. | | 2004/0133316 A1 | 7/2004 | Dean |
| 2002/0011367 A1 | 1/2002 | Kolesnik | | 2004/0134336 A1 | 7/2004 | Solomon |
| 2002/0011813 A1 | 1/2002 | Koselka et al. | | 2004/0134337 A1 | 7/2004 | Solomon |
| 2002/0016649 A1 | 2/2002 | Jones | | 2004/0143919 A1 | 7/2004 | Wilder |
| 2002/0021219 A1 | 2/2002 | Edwards | | 2004/0148419 A1 | 7/2004 | Chen et al. |
| 2002/0027652 A1 | 3/2002 | Paromtchik et al. | | 2004/0148731 A1 | 8/2004 | Damman et al. |
| 2002/0036779 A1 | 3/2002 | Kiyoi et al. | | 2004/0153212 A1 | 8/2004 | Profio et al. |
| 2002/0081937 A1 | 6/2002 | Yamada et al. | | 2004/0156541 A1 | 8/2004 | Jeon et al. |
| 2002/0095239 A1 | 7/2002 | Wallach et al. | | 2004/0158357 A1 | 8/2004 | Lee et al. |
| 2002/0097400 A1 | 7/2002 | Jung et al. | | 2004/0181706 A1 | 9/2004 | Chen et al. |
| 2002/0104963 A1 | 8/2002 | Mancevski | | 2004/0187249 A1 | 9/2004 | Jones et al. |
| 2002/0108209 A1 | 8/2002 | Peterson | | 2004/0187457 A1 | 9/2004 | Colens |
| 2002/0112742 A1 | 8/2002 | Bredo et al. | | 2004/0196451 A1 | 10/2004 | Aoyama |
| 2002/0113973 A1 | 8/2002 | Ge | | 2004/0200505 A1 | 10/2004 | Taylor et al. |
| 2002/0116089 A1 | 8/2002 | Kirkpatrick | | 2004/0201361 A1 | 10/2004 | Koh et al. |

| | | |
|---|---|---|
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015920 A1 | 1/2005 | Kim et al. |
| 2005/0021181 A1 | 1/2005 | Kim et al. |
| 2005/0067994 A1 | 3/2005 | Jones et al. |
| 2005/0085947 A1 | 4/2005 | Aldred et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | de Guzman |
| 2006/0000050 A1 | 1/2006 | Cipolla et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0114975 A1 | 5/2007 | Cohen et al. |
| 2007/0150096 A1 | 6/2007 | Yeh et al. |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0184518 A1 | 8/2008 | Taylor et al. |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3317376 A1 | 11/1984 |
| DE | 3536907 C2 | 2/1989 |
| DE | 3404202 C2 | 12/1992 |
| DE | 199311014 U1 | 10/1993 |
| DE | 4414683 A1 | 10/1995 |
| DE | 4338841 C2 | 8/1999 |
| DE | 19849978 | 2/2001 |
| DE | 19849978 C2 | 2/2001 |
| DE | 10242257 A1 | 4/2003 |
| DE | 10357636 A1 | 7/2005 |
| DE | 102004041021 B3 | 8/2005 |
| DE | 102005046813 A1 | 4/2007 |
| DK | 199803389 A | 12/1988 |
| EP | 0114926 | 8/1984 |
| EP | 265542 A1 | 5/1988 |
| EP | 281085 A2 | 9/1988 |
| EP | 358628 A3 | 5/1991 |
| EP | 437024 A1 | 7/1991 |
| EP | 433697 A3 | 12/1992 |
| EP | 479273 A3 | 5/1993 |
| EP | 294101 B1 | 12/1993 |
| EP | 554978 A3 | 3/1994 |
| EP | 615719 A1 | 9/1994 |
| EP | 0748006 | 12/1996 |
| EP | 0 792 726 | 9/1997 |
| EP | 861629 A1 | 9/1998 |
| EP | 307381 A3 | 7/1999 |
| EP | 930040 A3 | 10/1999 |
| EP | 845237 B1 | 4/2000 |
| EP | 1018315 A1 | 7/2000 |

| | | | | | | |
|---|---|---|---|---|---|---|
| EP | 1172719 A1 | 1/2002 | | JP | 05095879 | 4/1993 |
| EP | 1228734 A3 | 6/2003 | | JP | 5042076 U | 6/1993 |
| EP | 1 331 537 A1 | 7/2003 | | JP | 5046246 U | 6/1993 |
| EP | 1 331 537 B1 | 7/2003 | | JP | 5150827 A | 6/1993 |
| EP | 1380246 A3 | 3/2005 | | JP | 5150829 A | 6/1993 |
| EP | 1553472 | 7/2005 | | JP | 5046239 B | 7/1993 |
| EP | 1553472 A1 | 7/2005 | | JP | 5054620 U | 7/1993 |
| EP | 1806086 | 7/2007 | | JP | 05175933 | 7/1993 |
| EP | 1836941 | 9/2007 | | JP | 5040519 Y2 | 10/1993 |
| EP | 1642522 A3 | 11/2007 | | JP | 5257527 A | 10/1993 |
| ES | 2238196 B1 | 11/2006 | | JP | 5257533 A | 10/1993 |
| FR | 2601443 B1 | 11/1991 | | JP | 5285861 A | 11/1993 |
| FR | 2 828 589 | 8/2001 | | JP | 5302836 | 11/1993 |
| GB | 381622 | 10/1932 | | JP | 5312514 | 11/1993 |
| GB | 449815 | 7/1936 | | JP | 5341904 | 12/1993 |
| GB | 702426 A | 1/1954 | | JP | 6003251 Y2 | 1/1994 |
| GB | 2128842 B | 4/1986 | | JP | 6026312 U | 4/1994 |
| GB | 2213047 A | 8/1989 | | JP | 6137828 A | 5/1994 |
| GB | 2225221 A | 5/1990 | | JP | 6154143 | 6/1994 |
| GB | 2 283 838 | 5/1995 | | JP | 6293095 A | 10/1994 |
| GB | 2284957 A | 6/1995 | | JP | 06-327598 | 11/1994 |
| GB | 2267360 B | 12/1995 | | JP | 6105781 B | 12/1994 |
| GB | 2300082 B | 9/1999 | | JP | 7047046 | 2/1995 |
| GB | 2404330 B | 7/2005 | | JP | 7059702 A2 | 3/1995 |
| GB | 2417354 A | 2/2006 | | JP | 07-129239 | 5/1995 |
| JP | 53021869 U | 2/1978 | | JP | 7059702 B | 6/1995 |
| JP | 53110257 A | 9/1978 | | JP | 7222705 A | 8/1995 |
| JP | 53110257 A2 | 9/1978 | | JP | 7222705 A2 | 8/1995 |
| JP | 943901 C | 3/1979 | | JP | 7270518 A | 10/1995 |
| JP | 57014726 A2 | 1/1982 | | JP | 7281742 A2 | 10/1995 |
| JP | 57064217 A | 4/1982 | | JP | 7281752 A | 10/1995 |
| JP | 59005315 B | 2/1984 | | JP | 7-295636 | 11/1995 |
| JP | 59033511 U | 3/1984 | | JP | 7311041 A2 | 11/1995 |
| JP | 59094005 A | 5/1984 | | JP | 7313417 A | 12/1995 |
| JP | 59099308 U | 7/1984 | | JP | 7319542 A2 | 12/1995 |
| JP | 59112311 U | 7/1984 | | JP | 8-16776 | 1/1996 |
| JP | 59033511 B | 8/1984 | | JP | 8000393 B2 | 1/1996 |
| JP | 59120124 U | 8/1984 | | JP | 8000393 Y2 | 1/1996 |
| JP | 59131668 U | 9/1984 | | JP | 8016241 U | 1/1996 |
| JP | 59164973 A | 9/1984 | | JP | 8016776 B2 | 2/1996 |
| JP | 59184917 A | 10/1984 | | JP | 8063229 A2 | 3/1996 |
| JP | 2283343 A2 | 11/1984 | | JP | 8083125 A | 3/1996 |
| JP | 59212924 A | 12/1984 | | JP | 8083125 A2 | 3/1996 |
| JP | 59226909 A | 12/1984 | | JP | 08-089451 | 4/1996 |
| JP | 60089213 | 5/1985 | | JP | 8084696 | 4/1996 |
| JP | 60089213 U | 6/1985 | | JP | 8089449 A | 4/1996 |
| JP | 60211510 A | 10/1985 | | JP | 2520732 B2 | 5/1996 |
| JP | 60259895 A | 12/1985 | | JP | 8123548 A | 5/1996 |
| JP | 61023221 A2 | 1/1986 | | JP | 08-152916 | 6/1996 |
| JP | 6109712 A | 5/1986 | | JP | 8152916 A2 | 6/1996 |
| JP | 61023221 B | 6/1986 | | JP | 8256960 A2 | 10/1996 |
| JP | 62074018 A | 4/1987 | | JP | 8263137 A | 10/1996 |
| JP | 62070709 U | 5/1987 | | JP | 8286741 A | 11/1996 |
| JP | 62-120510 | 6/1987 | | JP | 8286744 A2 | 11/1996 |
| JP | 62-154008 | 7/1987 | | JP | 8322774 A | 12/1996 |
| JP | 62154008 | 7/1987 | | JP | 8322774 A2 | 12/1996 |
| JP | 62164431 U | 10/1987 | | JP | 8335112 A | 12/1996 |
| JP | 62263507 A | 11/1987 | | JP | 9043901 A | 2/1997 |
| JP | 62263508 A | 11/1987 | | JP | 9044240 A | 2/1997 |
| JP | 62189057 U | 12/1987 | | JP | 9047413 A | 2/1997 |
| JP | 63079623 A | 4/1988 | | JP | 9066855 A | 3/1997 |
| JP | 63-183032 | 7/1988 | | JP | 9145309 A | 6/1997 |
| JP | 63158032 A | 7/1988 | | JP | 9160644 A | 6/1997 |
| JP | 63-241610 | 10/1988 | | JP | 9160644 A2 | 6/1997 |
| JP | 1162454 A | 6/1989 | | JP | 9-179625 | 7/1997 |
| JP | 1118752 | 8/1989 | | JP | 9179625 A2 | 7/1997 |
| JP | 2-6312 | 1/1990 | | JP | 9179685 A2 | 7/1997 |
| JP | 2006312 U1 | 1/1990 | | JP | 9185410 | 7/1997 |
| JP | 2026312 B | 6/1990 | | JP | 9192069 A2 | 7/1997 |
| JP | 2283343 A | 11/1990 | | JP | 9204223 A2 | 8/1997 |
| JP | 03-051023 | 3/1991 | | JP | 9206258 A | 8/1997 |
| JP | 3051023 A2 | 3/1991 | | JP | 9206258 A2 | 8/1997 |
| JP | 3197758 A | 8/1991 | | JP | 9233712 A | 9/1997 |
| JP | 3201903 A | 9/1991 | | JP | 09251318 | 9/1997 |
| JP | 4019586 B | 3/1992 | | JP | 9251318 A | 9/1997 |
| JP | 4084921 A | 3/1992 | | JP | 9265319 A | 10/1997 |
| JP | 04300516 | 10/1992 | | JP | 9269807 A | 10/1997 |
| JP | 5023269 B | 4/1993 | | JP | 9269810 A | 10/1997 |
| JP | 5091604 A2 | 4/1993 | | JP | 02555263 Y2 | 11/1997 |

| | | | | | | |
|---|---|---|---|---|---|---|
| JP | 9319431 A2 | 12/1997 | | JP | 3375843 | 11/2002 |
| JP | 9319432 A | 12/1997 | | JP | 2002333920 A | 11/2002 |
| JP | 9319434 A | 12/1997 | | JP | 2002-355206 | 12/2002 |
| JP | 9325812 A3 | 12/1997 | | JP | 2002-360471 | 12/2002 |
| JP | 10055215 A | 2/1998 | | JP | 2002-360482 | 12/2002 |
| JP | 10117973 A | 5/1998 | | JP | 2002360479 A | 12/2002 |
| JP | 10117973 A2 | 5/1998 | | JP | 2002366227 A | 12/2002 |
| JP | 10118963 A | 5/1998 | | JP | 2002369778 A | 12/2002 |
| JP | 10165738 | 6/1998 | | JP | 2002369778 A2 | 12/2002 |
| JP | 10177414 A | 6/1998 | | JP | 2003-10076 | 1/2003 |
| JP | 10214114 A | 8/1998 | | JP | 2003010076 A | 1/2003 |
| JP | 10214114 A2 | 8/1998 | | JP | 2003010088 A | 1/2003 |
| JP | 10228316 | 8/1998 | | JP | 2003015740 A | 1/2003 |
| JP | 10240342 A2 | 9/1998 | | JP | 2003028528 A | 1/2003 |
| JP | 10260727 A2 | 9/1998 | | JP | 2003-5296 | 2/2003 |
| JP | 10295595 A | 11/1998 | | JP | 2003-036116 | 2/2003 |
| JP | 10314088 | 12/1998 | | JP | 2003-38401 | 2/2003 |
| JP | 11015941 A | 1/1999 | | JP | 2003-38402 | 2/2003 |
| JP | 11065655 A2 | 3/1999 | | JP | 2003-505127 | 2/2003 |
| JP | 11085269 A2 | 3/1999 | | JP | 2003036116 | 2/2003 |
| JP | 11102219 A2 | 4/1999 | | JP | 2003047579 A | 2/2003 |
| JP | 11102220 A | 4/1999 | | JP | 2003052596 A | 2/2003 |
| JP | 11162454 A | 6/1999 | | JP | 2003-061882 | 3/2003 |
| JP | 11174145 A | 7/1999 | | JP | 2003084994 A | 3/2003 |
| JP | 11175149 A | 7/1999 | | JP | 2003167628 A | 6/2003 |
| JP | 11178764 A | 7/1999 | | JP | 2003180586 A | 7/2003 |
| JP | 11178765 A | 7/1999 | | JP | 2003180587 A | 7/2003 |
| JP | 11-508810 | 8/1999 | | JP | 2003186539 A | 7/2003 |
| JP | 11212642 A | 8/1999 | | JP | 2003190064 A | 7/2003 |
| JP | 11212642 A2 | 8/1999 | | JP | 2003190064 A2 | 7/2003 |
| JP | 11213157 A | 8/1999 | | JP | 2003228421 | 8/2003 |
| JP | 11-510935 | 9/1999 | | JP | 2003241836 A | 8/2003 |
| JP | 11248806 A | 9/1999 | | JP | 2003262520 A | 9/2003 |
| JP | 11282532 A | 10/1999 | | JP | 2003285288 A | 10/2003 |
| JP | 11282533 A | 10/1999 | | JP | 2003304992 A | 10/2003 |
| JP | 11295412 A | 10/1999 | | JP | 2003-310489 | 11/2003 |
| JP | 11346964 | 12/1999 | | JP | 2003310509 A | 11/2003 |
| JP | 11346964 A2 | 12/1999 | | JP | 2003330543 A | 11/2003 |
| JP | 2000047728 A | 2/2000 | | JP | 2004123040 A | 4/2004 |
| JP | 2000056006 A | 2/2000 | | JP | 2004125479 | 4/2004 |
| JP | 2000056831 A | 2/2000 | | JP | 2004148021 A | 5/2004 |
| JP | 2000060782 | 2/2000 | | JP | 2004160102 A | 6/2004 |
| JP | 2000066722 A | 3/2000 | | JP | 2004166968 A | 6/2004 |
| JP | 2000075925 A | 3/2000 | | JP | 2004174228 A | 6/2004 |
| JP | 2000102499 | 4/2000 | | JP | 2004198330 A | 7/2004 |
| JP | 10240343 A2 | 5/2000 | | JP | 2004219185 A | 8/2004 |
| JP | 2000510750 | 8/2000 | | JP | 2004267236 | 9/2004 |
| JP | 2000279353 | 10/2000 | | JP | 2004304714 | 10/2004 |
| JP | 20000275321 A | 10/2000 | | JP | 2004306242 | 11/2004 |
| JP | 2000342497 | 12/2000 | | JP | 2005040578 | 2/2005 |
| JP | 2000342498 | 12/2000 | | JP | 2005117295 | 4/2005 |
| JP | 2000353014 A2 | 12/2000 | | JP | 2005118354 A | 5/2005 |
| JP | 20000353014 | 12/2000 | | JP | 2005135400 A | 5/2005 |
| JP | 2001022443 A | 1/2001 | | JP | 2005142800 | 6/2005 |
| JP | 2001067588 A | 3/2001 | | JP | 2005211360 A | 8/2005 |
| JP | 2001087182 | 4/2001 | | JP | 2005224265 A | 8/2005 |
| JP | 2001087182 A | 4/2001 | | JP | 2005230032 A | 9/2005 |
| JP | 2001121455 A | 5/2001 | | JP | 2005245916 A | 9/2005 |
| JP | 2001125641 A | 5/2001 | | JP | 2005528967 | 9/2005 |
| JP | 2001508572 | 6/2001 | | JP | 2005296511 A | 10/2005 |
| JP | 2001197008 | 7/2001 | | JP | 2005346700 A2 | 12/2005 |
| JP | 2001216482 A | 8/2001 | | JP | 2005352707 A | 12/2005 |
| JP | 2001-258807 | 9/2001 | | JP | 2006043071 A | 2/2006 |
| JP | 2001258807 A | 9/2001 | | JP | 2006155274 A | 6/2006 |
| JP | 2001265437 A | 9/2001 | | JP | 2006164223 A | 6/2006 |
| JP | 2001-275908 | 10/2001 | | JP | 2006227673 A | 8/2006 |
| JP | 2001289939 A | 10/2001 | | JP | 2006247467 A | 9/2006 |
| JP | 2001306170 A | 11/2001 | | JP | 2006260161 A | 9/2006 |
| JP | 2001320781 A | 11/2001 | | JP | 2006293662 A | 10/2006 |
| JP | 2001-525567 | 12/2001 | | JP | 2006296697 A | 11/2006 |
| JP | 2002-78650 | 3/2002 | | JP | 2007034866 A | 2/2007 |
| JP | 2002073170 | 3/2002 | | JP | 2007213180 A | 8/2007 |
| JP | 2002-204768 | 7/2002 | | JP | 04074285 B2 | 4/2008 |
| JP | 2002204769 A | 7/2002 | | JP | 2009015611 A | 1/2009 |
| JP | 2002247510 A | 8/2002 | | JP | 20100198552 A | 9/2010 |
| JP | 2002-532178 | 10/2002 | | KR | 1020043088 | 1/2004 |
| JP | 3356170 | 10/2002 | | WO | WO 95/26512 | 10/1995 |
| JP | 2002532180 | 10/2002 | | WO | WO9530887 A1 | 11/1995 |
| JP | 2002-323925 | 11/2002 | | WO | WO9617258 A3 | 2/1997 |

| | | |
|---|---|---|
| WO | WO 97/15224 | 5/1997 |
| WO | WO 97/40734 | 11/1997 |
| WO | WO 97/41451 | 11/1997 |
| WO | WO 98/53456 | 11/1998 |
| WO | 9908584 | 2/1999 |
| WO | WO9905580 A2 | 2/1999 |
| WO | WO 99/16078 | 4/1999 |
| WO | WO 99/28800 | 6/1999 |
| WO | WO 99/38056 | 7/1999 |
| WO | WO 99/38237 | 7/1999 |
| WO | WO 99/43250 | 9/1999 |
| WO | WO 99/59042 | 11/1999 |
| WO | WO 00/04430 | 1/2000 |
| WO | WO 00/36962 | 6/2000 |
| WO | WO 00/38029 | 6/2000 |
| WO | WO0038026 A1 | 6/2000 |
| WO | WO0038028 A1 | 6/2000 |
| WO | WO 00/78410 | 12/2000 |
| WO | WO 01/06904 | 2/2001 |
| WO | WO 01/06905 | 2/2001 |
| WO | WO0180703 A1 | 11/2001 |
| WO | WO0191623 A2 | 12/2001 |
| WO | WO 02/39864 | 5/2002 |
| WO | WO 02/39868 | 5/2002 |
| WO | WO 02/058527 | 8/2002 |
| WO | WO 02/062194 | 8/2002 |
| WO | WO 02/067744 | 9/2002 |
| WO | WO 02/067745 | 9/2002 |
| WO | WO 02/074150 | 9/2002 |
| WO | WO 02/075356 | 9/2002 |
| WO | WO 02/075469 | 9/2002 |
| WO | WO 02/075470 | 9/2002 |
| WO | WO0269774 A1 | 9/2002 |
| WO | WO0275350 A1 | 9/2002 |
| WO | WO02067752 A1 | 9/2002 |
| WO | WO02081074 A1 | 10/2002 |
| WO | WO 02/101477 | 12/2002 |
| WO | WO03015220 A1 | 2/2003 |
| WO | WO03024292 A2 | 3/2003 |
| WO | WO 03/026474 | 4/2003 |
| WO | WO 03/040845 | 5/2003 |
| WO | WO 03/040846 | 5/2003 |
| WO | WO0269775 A3 | 5/2003 |
| WO | WO03040546 A1 | 5/2003 |
| WO | WO03062850 A2 | 7/2003 |
| WO | WO03062852 A1 | 7/2003 |
| WO | WO 2004/006034 | 1/2004 |
| WO | WO2004004533 A1 | 1/2004 |
| WO | WO2004004534 A1 | 1/2004 |
| WO | WO2004005956 A1 | 1/2004 |
| WO | WO2004058028 A2 | 1/2004 |
| WO | WO2004025947 A3 | 5/2004 |
| WO | WO2004043215 A1 | 5/2004 |
| WO | WO2004058028 | 7/2004 |
| WO | WO2005006935 A1 | 1/2005 |
| WO | 2005037496 | 4/2005 |
| WO | WO2005036292 A1 | 4/2005 |
| WO | WO 2005/055795 | 6/2005 |
| WO | WO2005055796 A2 | 6/2005 |
| WO | 2005062271 | 7/2005 |
| WO | WO2005076545 A1 | 8/2005 |
| WO | WO2005077243 A1 | 8/2005 |
| WO | WO2005077244 A1 | 8/2005 |
| WO | WO2005081074 A1 | 9/2005 |
| WO | WO2005082223 A1 | 9/2005 |
| WO | WO2005083541 A1 | 9/2005 |
| WO | WO2005098475 A1 | 10/2005 |
| WO | WO2005098476 A1 | 10/2005 |
| WO | WO2006046400 A1 | 5/2006 |
| WO | WO2006068403 A1 | 6/2006 |
| WO | WO2006073248 A1 | 7/2006 |
| WO | 2006089307 | 8/2006 |
| WO | 2007028049 | 3/2007 |
| WO | WO2007036490 A3 | 5/2007 |
| WO | WO2007065033 A2 | 6/2007 |
| WO | 2007137234 | 11/2007 |
| WO | WO2007137234 A2 | 11/2007 |

OTHER PUBLICATIONS

Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct 22-24, 1993.

Electrolux designed for the well-lived home, website: http://www.electroluxusa.com/node57.as[?currentURL=node142.asp%3F, acessed Mar. 18, 2005.

eVac Robotic Vacuum S1727 Instruction Manual, Sharper Image Corp, Copyright 2004.

Everyday Robots, website: http://www.everydayrobots.com/index.php?option=content&task=view&id=9, accessed Apr. 20, 2005.

Facts on the Trilobite webpage: "http://trilobiteelectroluxse/presskit_en/nodel1335asp?print=yes&pressID=" accessed Dec. 12, 2003.

Friendly Robotics Robotic Vacuum RV400—The Robot Store website: http://www.therobotstore.com/s.nl/sc.9/category,-109/it.A/id.43/.f, accessed Apr. 20, 2005.

Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.

Hitachi: News release: The home cleaning robot of the autonomous movement type (experimental machine) is developed, website: http://www.i4u.com/japanreleases/hitachirobot.htm., accessed Mar. 18, 2005.

Kärcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004.

Karcher RC 3000 Cleaning Robot—user manual Manufacturer: Alfred-Karcher GmbH & Co, Cleaning Systems, Alfred Karcher-STR 28-40, PO Box 160, D-71349 Winnenden, Germany, Dec. 2002.

Kärcher RoboCleaner RC 3000 Product Details webpages: "http://wwwrobocleanerde/english/screen3html" through " . . . screen6html" accessed Dec. 12, 2003.

Karcher USA, RC3000 Robotic Cleaner, website: http://www.karcher-usa.com/showproducts.php?op=view_prod&param1=143&param2=&param3=, accessed Mar. 18, 2005.

Put Your Roomba . . . On "Automatic" Roomba Timer> Timed Cleaning—Floorvac Robotic Vacuum webpages: http://cgi.ebay.com/ws/eBayISAPI.dll?ViewItem&category=43575198387&rd=1, accessed Apr. 20, 2005.

Put Your Roomba . . . On "Automatic" webpages: "http://www.acomputeredge.com/roomba," accessed Apr. 20, 2005.

RoboMaid Sweeps Your Floors So You Won't Have to, the Official Site, website: http://www.therobomaid.com/, acessed Mar. 18, 2005, 2 pgs.

Robot Review Samsung Robot Vacuum (VC-RP30W), website: http://www.onrobo.com/reviews/At_Home/Vacuun_Cleaners/on00vcrp30rosam/index.htm, accessed Mar. 18, 2005.

Robotic Vacuum Cleaner-Blue, website: http://www.sharperimage.com/us/en/catalog/productview.jhtml?sku=S1727BLU, accessed Mar. 18, 2005.

Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct 18-21, 1999, pp. 1427-1434.

Wired News: Robot Vacs Are in the House, website: http://www.wired.com/news/print/0,1294,59237,00.html, accessed Mar. 18, 2005.

Zoombot Remote Controlled Vaccum—RV-500 New Roomba 2, website: http://cgi.ebay.com/ws/eBayISAPI.dll?ViewItem&category=43526&item=4373497618&rd=1, accessed Apr. 20, 2005.

Wolf et al. "Robust Vision-based Localization for Mobile Robots Using an Image Retrieval System Based on Invariant Features", Proceedings of the 2002 IEEE international Conference on Robotics & Automation, Washington, D.C. pp. 359-365. May 2002.

Wolf et al. "Robust Vision-Based Localization by Combining an Image-Retrieval System with Monte Carol Localization", IEEE Transactions on Robotics. vol. 21. No. 2. pp. 208-216, Apr. 2005.

Wong "EIED Online>> Robot Business", ED Online ID# 13114, 17 pages, Jul. 2006.

Yamamoto et al. "Optical Sensing for Robot Perception and Localization", 2005 IEEE Workshop on Advanced Robotics and its Social Impacts, pp. 14-17, 2005.

Yata et al. "Wall Following Using Angle Information Measured by a Single Ultrasonic Transducer", Proceedings of the 1998 IEEE, International Conference on Robotics & Automation, Leuven, Belgium. pp. 1590-1596, May 1998.

Yun, et al. "Image-Based Absolute Positioning System for Mobile Robot Navigation", IAPR International Workshops SSPR, Hong Kong, pp. 261-269, Aug. 17-19, 2006.

Yun, et al. "Robust Positioning a Mobile Robot with Active Beacon Sensors", Lecture Notes in Computer Science, 2006, vol. 4251, pp. 690-897, 2006.

Yuta, et al. "Implementation of an Active Optical Range sensor Using Laser Slit for In-Door Intelligent Mobile Robot", IEE/RSJ International workshop on Intelligent Robots and systems (IROS 91) vol. 1, Osaka, Japan, pp. 415-420, Nov. 3-5, 1991.

Zha et al. "Mobile Robot Localization Using Incomplete Maps for Change Detection in a Dynamic Environment", Advanced Intelligent Mechatronics '97. Final Program and Abstacts., IEEE/ASME International Conference, pp. 110, Jun. 16-20, 1997.

Zhang, et al. "A Novel Mobile Robot Localization Based on Vision", SPIE vol. 6279, 6 pages, Jan. 29, 2007.

Euroflex Intellegente Monstre Mauele (English only except).

Roboking—not just a vacuum cleaner, a robot! Jan. 21, 2004, 5 pages.

SVET Computers—New Technologies—Robot vacuum cleaner, 1 page.

Popco.net Make your digital life http://www.popco.net/zboard/view.php?id=tr_review no=40 accessed Nov. 1, 2011.

Matsumura Camera Online Shop http://www.rakuten.co.jp/matsucame/587179/711512/ accessed Nov. 1. 2011.

Dyson's Robot Vacuum Cleaner—the DC06, May 2, 2004 http://www.gizmag.com/go/1282/ accessed Novmber 11, 2011.

Electrolux Trilobite, http://www.electrolux-ui.com:8080/2002%5C822%5C833102EN.pdf 10 pages.

Electrolux Trilobite. Time to enjoy life. 38 pages http://www.robocon.co.kr/trilobite/Presentation_Trilobite_Kor_030104. ppt accessed Dec. 22, 2011.

Facts on the Trilobite http://www.frc.ri.cmu.edu/~hpm/talks/Extras/trilobite.desc.html 2 pages accessed Nov. 1, 2011.

Euroflex Jan. 1, 2006 http://www.eurofiex.tv/novita_dett.php?id=15 1 page accessed Nov. 1, 2011.

FloorBotics, VR-8 Floor Cleaning Robot, Product Description for Manuafacturers, http://www.consensus.com.au/SoftwareAwards/CSAarchive/CSA2004/CSAart04/FloorBot/F.

Friendly Robotics, 18 pages http://www.robotsandrelax.com/PDFs/RV400Manual.pdf accessed Dec. 22, 2011.

It's eye, 2003 www.hitachi.co.jp/rd/pdf/topics/hitac2003_10.pdf 2 pages.

Hitachi, May 29, 2003 http://www.hitachi.co.jp/New/cnews/hl_030529_hl_030529.pdf 8 pages.

Robot Buying Guide, LG announces the first robotic vacuum cleaner for Korea, Apr. 21, 2003 http://robotbg.com/news/2003/04/22/lg_announces_the_first_robotic_vacu.

CleanMate 365, Intelligent Automatic Vacuum Cleaner, Model No. QQ-1, User Manual www.metapo.com/support/user_manual.pdf 11 pages.

UBOT, cleaning robot capable of wiping with a wet duster, http://us.aving.net/news/view.php?articleId=23031, 4 pages accessed Nov. 1, 2011.

Taipei Times. Robotic vacuum by Matsuhita about ot undergo testing. Mar. 26, 2002 http://www.taipeitimes.com/News/worldbiz/archives/2002/03/26/0000129338 accessed.

Tech-on! http://techon.nikkeibp.co.jp/members/01db/200203/1006501/, 4 pages, accessed Nov. 1, 2011.

http://ascii.jp/elem/000/000/330/330024/.

IT media http://www.itmedia.co.jp/news/0111/16/robofesta_m.html accessed Nov. 1. 2011.

Yujin Robotics, an intelligent cleaning robot 'iclebo Q' AVING USA http://us.aving.net/news/view.php?articleid=7257, 8 pages accessed Nov. 4, 2011.

Special Reports. Vacuum Cleaner Robot Operated in Conjunction with 3G Cellular Phone vol. 59, No. 9 (2004) 3 pages http://www.toshiba.co.jp/tech/review/2004/09/59_0.

Toshiba Corporation 2003, http://warp.ndl.go.jp/info:ndljp/pid/258151/www.soumu.go.jp/joho_tsusin/policyreports/chousa/netrobot/pdf/030214_1_33_a.pdf 16 pages.

http://www.karcher.de/versions/intg/assets/video/2_4_robo_en.swf. Accessed Sep. 25, 2009.

McLurkin "The Ants: A community of Microrobots", Paper submitted for requirements of BSEE at MIT, May 12, 1995.

Grumet "Robots Clean House", Popular Mechanics, Nov. 2003.

McLurkin Stupid Robot Tricks: A Behavior-based Distributed Algorithm Library for Programming Swarms of Robots, Paper submitted for requirements of BSEE at MIT, May 2004.

Kurs et al, Wireless Power transfer via Strongly Coupled Magnetic Resonances, Downloaded from www.sciencemag.org , Aug. 17, 2007.

Borges et al. "Optimal Mobile Robot Pose Estimation Using Geometrical Maps", IEEE Transactions on Robotics and Automation, vol. 18, No. 1, pp. 87-94, Feb. 2002.

Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.

Bulusu, et al. "Self Configuring Localization systems: Design and Experimental Evaluation", ACM Transactions on Embedded Computing Systems vol. 3 No. 1 pp. 24-60, 2003.

Caccia, et al. "Bottom-Following for Remotely Operated Vehicles", 5th IFAC conference, Alaborg, Denmark, pp. 245-250 Aug. 1, 2000.

Chae, et al. "StarLITE: A new artificial landmark for the navigation of mobile robots", http://www.irc.atr.jp/jk-nrs2005/pdf/Starlite.pdf, 4 pages, 2005.

Chamberlin et al. "Team 1: Robot Locator Beacon System" NASA Goddard SFC, Design Proposal, 15 pages, Feb. 17, 2006.

Champy "Physical management of IT assets in Data Centers using RFID technologies", RFID 2005 University, Oct. 12-14, 2005.

Chin "Joystick Control for Tiny OS Robot", htp://www.eecs.berkeley.edu/Programs/ugrad/superb/papers2002/chiri.pdf. 12 pages, Aug. 8, 2002.

Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.

Andersen et al., "Landmark based navigation strategies", SPIE Conference on Mobile Robots XIII, SPIE vol. 3525, pp.

Clerentin et al. "A localzation method based on two omnidirectional perception systems cooperation" Proc of IEEE International Conference on Robotics & Automation, San Francisco, CA vol. 2, pp. 1219-1224, Apr. 2000.

Corke "High Performance Visual serving for robots end-point control". SPIE vol. 2056 Intelligent robots and computer vision 1993.

Cozman et al. "Robot Localization using a Computer Vision Sextant", IEEE International Midwest Conference on Robotics and Automation, pp. 106-111, 1995.

D'Orazio, et al. "Model based Vision System for mobile robot position estimation", SPIE vol. 2058 Mobile Robots VIII, pp. 38-49, 1992.

De Bakker, et al. "Smart PSD—array for sheet of light range imaging", Proc. of SPIE vol. 3965, pp. 1-12, May 15, 2000.

Desaulniers et al. "An Efficient Algorithm to find a shortest path for a car-like Robot", IEEE Transactions on robotics and Automation vol. 11 No. 6, pp. 819-828, Dec. 1995.

Dorfmüller-Ulhaas "Optical Tracking From User Motion to 3D Interaction", http://www.cg.tuwien.ac.at/research/publications/2002/Dorfmueller-Ulhaas-thesis, 182 pages, 2002.

Dorsch, et al. "Laser Triangulation: Fundamental uncertainty in distance measurement", Applied Optics, vol. 33 No. 7, pp. 1306-1314, Mar. 1, 1994.

Dudek et al. "Localizing a Robot with Minimum Travel" Proceedings of the sixth ACM-SIAM symposium on Discrete algorithms, vol. 27 No. 2 pp. 583-604, Apr. 1998.

Dulimarta, et al. "Mobile Robot Localization in Indoor Environment", Pattern Recognition, vol. 30, No. 1, pp. 99-111, 1997.

EBay "Roomba Timer—> Timed Cleaning—Floorvac Robotic Vacuum", Cgi.ebay.com/ws/eBayISAPI.dll? viewitem&category=43526&item=4375198387&rd=1. 5 pages, Apr. 20, 2005.

Electrolux "Welcome to the Electrolux trilobite" www.electroluxusa.com/node57.asp?currentURL=node142.asp%3F, 2 pages, Mar. 18, 2005.

Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95, pp. 548-551, 1995.

Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.

Barker, "Navigation by the Stars—Ben Barker 4th Year Project" Power point pp. 1-20.

Becker, et al. "Reliable Navigation Using Landmarks" IEEE International Conference on Robotics and Automation, 0-7803-1965-6, pp. 401-406, 1995.

Benayad-Cherif, et al.. "Mobile Robot Navigation Sensors" SPIE vol. 1831 Mobile Robots, VII, pp. 378-387, 1992.

Facchinetti Claudio et al. "Using and Learning Vision-Based Self-Positioning for Autonomous Robot Navigation", ICARCV '94, vol. 3 pp. 1694-1698, 1994.

Betke, et al., "Mobile Robot localization using Landmarks" Proceedings of the IEEE/RSJ/GI International Conference on Intelligent Robots and Systems '94 "Advanced Robotic Systems and the Real World" (IROS '94), vol.

Facchinetti, Claudio et al, "Self-Positioning Robot Navigation Using Ceiling Images Sequences", ACCV '95, 5 pages, Dec. 5-8, 1995.

Fairfield, Nathaniel et al. "Mobile Robot Localization with Sparse Landmarks", SPIE vol. 4573 pp. 148-155, 2002.

Favre-Bulle, Bernard "Efficient tracking of 3D—Robot Position by Dynamic Triangulation", IEEE Instrumentation and Measurement Technology Conference IMTC 98 Session on Instrumentation and Measurement in Robotics, vol. 1, pp. 446-449, May 18-21, 1998.

Fayman "Exploiting Process Integration and Composition in the context of Active Vision", IEEE Transactions on Systems, Man, and Cybernetics—Part C: Application and reviews, vol. 29 No. 1, pp. 73-86, Feb. 1999.

Florbot GE Plastics Image (1989-1990).

Franz, et al. "Biomimetric robot navigation", Robotics and Autonomous Systems vol. 30 pp. 133-153, 2000.

Friendly Robotics "Friendly Robotics—Friendly Vac, Robotic Vacuum Cleaner", www.friendlyrobotics.com/vac.htm. 5 pages Apr. 20, 2005.

Fuentes, et al. "Mobile Robotics 1994", University of Rochester. Computer Science Department, TR 588, 44 pages, Dec. 7, 1994.

Bison, P et al., "Using a structured beacon for cooperative position estimation" Robotics and Autonomous Systems vol. 29, No. 1, pp. 33-40, Oct. 1999.

Fukuda, et al. "Navigation System based on Ceiling Landmark Recognition for Autonomous mobile robot", 1995 IEEE/RSJ International Conference on Intelligent Robots and Systems 95. 'Human Robot Interaction and Cooperative Robots', Pittsburgh, PA, pp. 1466/ 1471, Aug. 5-9, 1995.

Gionis "A hand-held optical surface scanner for environmental Modeling and Virtual Reality", Virtual Reality World, 16 pages 1996.

Goncalves et al. "A Visual Front-End for Simultaneous Localization and Mapping", Proceedings of the 2005 IEEE International Conference on Robotics and Automation, Barcelona, Spain, pp. 44-49, Apr. 2005.

Gregg et al. "Autonomous Lawn Care Applications", 2006 Florida Conference on Recent Advances in Robotics, FCRAR 2006. pp. 1-5, May 25-26, 2006.

Hamamatsu "SI PIN Diode S5980 S5981 S5870—Multi-element photodiodes for surface mounting", Hamatsu Photonics. 2 pages Apr. 2004.

Hammacher Schlemmer "Electrolux Trilobite Robotic Vacuum" www.hammacher.com/publish/71579.asp?promo=xsells, 3 pages, Mar. 18, 2005.

Haralick et al. "Pose Estimation from Corresponding Point Data", IEEE Transactions on systems, Man, and Cybernetics, vol. 19, No. 6, pp. 1426-1446. Nov. 1989.

Hausler "About the Scaling Behaviour of Optical Range Sensors", Fringe'97, Proceedings of the 3rd International Workshop on Automatic Processing of Fringe Patterns, Bremen, Germany, pp. 147-155, Sep. 15-17, 1997.

Blaasvaer et al. "AMOR—An Autonomous Mobile Robot Navigation System", Proceedings of the IEEE Intenatonal Conference on Systems, Man, and Cybernetics, pp. 2266-2271, 1994.

Hoag, et al. "Navigation and Guidance in interstellar space", ACTA Astronautica vol. 2, pp. 513-533 , Feb. 14, 1975.

Huntsberger et al. "CAMPOUT: A Control Architecture for Tightly Coupled Coordination of Multirobot Systems for Planetary Surface Exploration", IEEE Transactions on Systems, Man, and Cybernetics—Part A: Systems and Humans, vol. 33, No. 5, pp. 550-559, Sep. 2003.

Iirobotics.com "Samsung Unveils Its Multifunction Robot Vacuum", www.iirobotics.com/webpages/hotstuff.php?ubre=111, 3 pages, Mar. 18, 2005.

Jarosiewicz et al. "Final Report—Lucid", University of Florida, Departmetn of Electrical and Computer Engineering, EEL 5666—Intelligent Machine Design Laboratory, 50 pages, Aug. 4, 1999.

Jensfelt, et al. "Active Global Localization for a mobile robot using multiple hypothesis tracking", IEEE Transactions on Robots and Automation vol. 17. No. 5, pp. 748-760, Oct. 2001.

Jeong, et al. "An intelligent map-building system for indoor mobile robot using low cost photo sensors", SPIE vol. 6042 6 pages, 2005.

Kahney, "Robot Vacs are in the House," www.wired.com/news/technology/o,1282,59237,00.html, 6 pages, Jun. 18, 2003.

Karcher "Product Manual Download Karch", www.karcher.com, 17 pages, 2004.

Karcher "Karcher RoboCleaner RC 3000", www.robocleaner.de/english/screen3.html, 4 pages, Dec. 12, 2003.

Karcher USA "RC 3000 Robotics cleaner", www.karcher-usa.com, 3 pages, Mar. 18, 2005.

Karlsson et al., The vSLAM Algorithm for Robust Localization and Mapping, Proceedings of the 2005 IEEE International Conference on Robotics and Automation, Barcelona, Spain, pp. 24-29, Apr. 2005.

Karlsson, et al Core Technologies for service Robotics, IEEE/RSJ International Conference on intelligent Robots and Systems (IROS 2004), vol. 3, pp. 2979-2984, Sep. 28-Oct. 2, 2004.

King, "Helpmate-TM—Autonomous mobile Robots Navigation Systems", SPIE vol. 1388 Mobile Robots pp. 190-198, 1990.

Kleinberg, The Localization Problem for Mobile Robots, Laboratory for Computer Science, Massachusetts Institute of Technology, 1994 IEEE, pp. 521-531, 1994.

Knight, et al., "Localization and Identification of Visual Landmarks", Journal of Computing Sciences in Colleges, vol. 16, Issue 4, 2001 pp. 312-313, May 2001.

Kolodko et al. "Experimental System for Real-Time Motion Estimation", Proceedings of the 2003 IEEE/ASME International Conference on Advanced Intelligent Mechatronics (AIM 2003), pp. 981-986, 2003.

Komoriya et al., Planning of Landmark Measurement for the Navigation of a Mobile Robot, Proceedings of the 1992 IEEE/RSJ International Cofnerence on Intelligent Robots and Systems, Raleigh, NC pp. 1476-1481, Jul. 7-10, 1992.

Koolatron "KOOLVAC—Owner's Manual", 13 pages.

Krotov, et al. "Digital Sextant", Downloaded from the internet at: http://www.cs.cmu.edu/~epk/ , 1 page, 1995.

Krupa et al. "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.

Kuhl, et al. "Self Localization in Environments using Visual Angles", VRCAI '04 Proceedings of the 2004 ACM SIGGRAPH international conference on Virtual Reality continuum and its applications in industry, pp. 472-475, 2004.

Kurth, "Range-Only Robot Localization and SLAM with Radio", http://www.ri.cmu.edu/pub_files/pub4/kurth_derek_2004_1/kurth_derek_2004_1.pdf. 60 pages, May 2004.

Lambrinos, et al. "A mobile robot employing insect strategies for navigation", http://www8.cs.umu.se/kurser/TDBD17/VT04/dl/Assignment%20Papers/lambrinos-RAS-2000.pdf, 38 pages, Feb. 19, 1999.

Lang et al. "Visual Measurement of Orientation Using Ceiling Features", 1994 IEEE, pp. 552-555, 1994.

Lapin, "Adaptive position estimation for an automated guided vehicle", SPIE vol. 1831 Mobile Robots VII, pp. 82-94, 1992.

LaValle et al. "Robot Motion Planning in a Changing, Partially Predictable Environment", 1994 IEEE International Symposium on Intelligent Control, Columbus, OH, pp. 261-266, Aug. 16-18, 1994.

Lee, et al. "Localization of a Mobile Robot Using the Image of a Moving Object", IEEE Transaction on Industrial Electronics, vol. 50, No. 3 pp. 612-619, Jun. 2003.

Lee, et al. "Development of Indoor Navigation system for Humanoid Robot Using Multi-sensors Integration", ION NTM, San Diego, CA pp. 798-805, Jan. 22-24, 2007.

Leonard, et al. "Mobile Robot Localization by tracking Geometric Beacons", IEEE Transaction on Robotics and Automation, vol. 7, No. 3 pp. 376-382, Jun. 1991.

Li et al. "Robust Statistical Methods for Securing Wireless Localization in Sensor Networks", Wireless Information Network Laboratory, Rutgers University.

Li et al "Making a Local Map of Indoor Environments by Swiveling a Camera and a Sonar", Proceedings of the 1999 IEEE/RSJ International Conference on Intelligent Robots and Systems, pp. 954-959, 1999.

Lin, et al.. "Mobile Robot Navigation Using Artificial Landmarks", Journal of robotics System 14(2). pp. 93-106, 1997.

Linde "Dissertation, "On Aspects of Indoor Localization"" https://eldorado.tu-dortmund.de/handle/2003/22854, University of Dortmund, 138 pages, Aug. 28, 2006.

Lumelsky, et al. "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," 2002, lEeE, p. 2359-2364.

Ma "Thesis: Documentation on Northstar", California Institute of Technology, 14 pages, May 17, 2006.

Madsen, et al. "Optimal landmark selection for triangulation of robot position", Journal of Robotics and Autonomous Systems vol. 13 pp. 277-292, 1996.

Martishevcky, "The Accuracy of point light target coordinate determination by dissectoral tracking system", SPIE vol. 2591 pp. 25-30.

Matsutek Enterprises Co. Ltd "Automatic Rechargeable Vacuum Cleaner", http://matsutek.manufacturer.globalsources.com/si/6008801427181/pdtl/Home-vacuum/10..., Apr. 23, 2007.

McGillem, et al. "Infra-red Lacation System for Navigation and Autonomous Vehicles", 1988 IEEE International Conference on Robotics and Automation, vol. 2, pp. 1236-1238, Apr. 24-29, 1988.

McGillem,et al. "A Beacon Navigation Method for Autonomous Vehicles", IEEE Transactions on Vehicular Technology, vol. 38. No. 3, pp. 132-139, Aug. 1989.

Michelson "Autonomous Navigation", 2000 Yearbook of Science & Technology. McGraw-Hill, New York, ISBN 0-07-052771-7, pp. 28-30, 1999.

Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.

MobileMag "Samsung Unveils High-tech Robot Vacuum Cleaner", http://www.mobilemag.com/content/100/102/C2261/, 4 pages, Mar. 18, 2005.

Monteiro, et al. "Visual Servoing for Fast Mobile Robot: Adaptive Estimation of Kinematic Parameters", Proceedings of the IECON '93., International Conference on Industrial Electronics, Maui, HI, pp. 1588-1593, Nov. 15-19, 1993.

Moore, et al. A simple Map-bases Localization strategy using range measurements, SPIE vol. 5804 pp. 612-620, 2005.

Munich et al. "SIFT-ing Through Features with ViPR", IEEE Robotics & Automation Magazine, pp. 72-77, Sep. 2006.

Munich et al. "ERSP: A Software Platform and Architecture for the Service Robotics Industry", Intelligent Robots and Systems, 2005. (IROS 2005), pp. 460-467, Aug. 2-6, 2005.

Nam, et al. "Real-Time Dynamic Visual Tracking Using PSD Sensors and extended Trapezoidal Motion Planning", Applied Intelligence 10, pp. 53-70, 1999.

Nitu et al. "Optomechatronic System for Position Detection of a Mobile Mini-Robot", IEEE Ttransactions on Industrial Electronics, vol. 52, No. 4, pp. 969-973, Aug. 2005.

On Robo "Robot Reviews Samsung Robot Vacuum (VC-RP30W)", www.onrobo.com/reviews/AT_Home/vacuum_cleaners/on00vcrb30rosam/index.htm.. 2 pages, 2005.

InMach "Intelligent Machines", www.inmach.de/inside.html, 1 page , Nov. 19, 2008.

Innovation First "2004 EDU Robot Controller Reference Guide", http://www.ifirobotics.com, 13 pgs., Mar. 1, 2004.

OnRobo "Samsung Unveils Its Multifunction Robot Vacuum", www.onrobo.com/enews/0210/samsung_vacuum.shtml, 3 pages, Mar. 18, 2005.

Pages et al. "Optimizing Plane-to-Plane Positioning Tasks by Image-Based Visual Servoing and Structured Light", IEEE Transactions on Robotics, vol. 22, No. 5, pp. 1000-1010, Oct. 2006.

Pages et al. "A camera-projector system for robot positioning by visual servoing", Proceedings of the 2006 Conference on Computer Vision and Pattern Recognition Workshop (CVPRW06), 8 pages, Jun. 17-22, 2006.

Pages, et al. "Robust decoupled visual servoing based on structured light", 2005 IEEE/RSJ Int. Conf. on Intelligent Robots and Systems, pp. 2676-2681, 2005.

Park et al. "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun. 27-Jul. 2, 1994.

Park, et al. "Dynamic Visual Servo Control of Robot Manipulators using Neutral Networks", The Korean Institute Telematics and Electronics, vol. 29-B, No. 10. pp. 771-779, Oct. 1992.

Paromtchik "Toward Optical Guidance of Mobile Robots".

Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).

Penna, et al. "Models for Map Building and Navigation", IEEE Transactions on Systems. Man. and Cybernetics. vol. 23 No. 5, pp. 1276-1301, Sep./Oct. 1993.

Pirjanian "Reliable Reaction", Proceedings of the 1996 IEEE/SICE/RSJ International Conference on Multisensor Fusion and Integration for Intelligent Systems, pp. 158-165, 1996.

Pirjanian "Challenges for Standards for consumer Robotics", IEEE Workshop on Advanced Robotics and its Social impacts, pp. 260-264, Jun. 12-15, 2005.

Pirjanian et al. "Distributed Control for a Modular, Reconfigurable Cliff Robot", Proceedings of the 2002 IEEE International Conference on Robotics & Automation, Washington, D.C. pp. 4083-4088, May 2002.

Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.

Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.

Pirjanian et al. "A decision-theoretic approach to fuzzy behavior coordination", 1999 IEEE International Symposium on Computational Intelligence in Robotics and Automation, 1999. CIRA '99., Monterey, CA, pp. 101-106. Nov. 8-9, 1999.

Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430, Apr. 1997.
Prassler et al., "A Short History of Cleaning Robots", Autonomous Robots 9, 211-226, 2000, 16 pages.
Radio Frequency Identification: Tracking ISS Consumables, Author Unknown, 41 pages.
Remazeilles, et al. "Image based robot navigation in 3D environments", Proc. of SPIE, vol. 6052, pp. 1-14, Dec. 6, 2005.
Rives, et al. "Visual servoing based on ellipse features", SPIE vol. 2056 Intelligent Robots and Computer Vision pp. 356-367, 1993.
Robotics World Jan. 2001: "A Clean Sweep" (Jan. 2001).
Ronnback "On Methods for Assistive Mobile Robots", http://www.openthesis.org/documents/methods-assistive-mobile-robots-595019.html, 218 pages, Jan. 1, 2006.
Roth-Tabak, et al. "Environment Model for mobile Robots Indoor Navigation", SPIE vol. 1388 Mobile Robots pp. 453-463, 1990.
Sadath M Maiik et al. "Virtual Prototyping for Conceptual Design of a Tracked Mobile Robot". Electrical and Computer Engineering, Canadian Conference on, IEEE, PI. May 1, 2006, pp. 2349-2352.
Sahin, et al. "Development of a Visual Object Localization Module for Mobile Robots", 1999 Third European Workshop on Advanced Mobile Robots, (Eurobot '99), pp. 65-72, 1999.
Salomon, et al. "Low-Cost Optical Indoor Localization system for Mobile Objects without Image Processing", IEEE Conference on Emerging Technologies and Factory Automation, 2006. (ETFA '06), pp. 629-632, Sep. 20-22, 2006.
Sato "Range Imaging Based on Moving Pattern Light and Spatio-Temporal Matched Filter", Proceedings International Conference on Image Processing, vol. 1., Lausanne, Switzerland, pp. 33-36, Sep. 16-19, 1996.
Schenker, et al. "Lightweight rovers for Mars science exploration and sample return", Intelligent Robots and Computer Vision XVI, SPIE Proc. 3208, pp. 24-36, 1997.
Sebastian Thrun, Learning Occupancy Grid Maps With Forward Sensor Models, School of Computer Science, Carnegie Mellon University, pp. 1-28.
Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim, et al "Learning Visual Landmarks for Pose Estimation", IEEE International Conference on Robotjcs and Automation, vol. 3, Detroit, MI, pp. 1972-1978, May 10-15, 1999.
Sobh et al. "Case Studies in Web-Controlled Devices and Remote Manipulation", Automation Congress, 2002 Proceedings of the 5th Biannual World, pp. 435-440, Dec. 10, 2002.
Stella, et al. "Self-Location for Indoor Navigation of Autonomous Vehicles", Part of the SPIE conference on Enhanced and Synthetic Vision SPIE vol. 3364 pp. 298-302, 1998.
Summet "Tracking Locations of Moving Hand-held Displays Using Projected Light", Pervasive 2005, LNCS 3468 pp. 37-46 (2005).
Svedman et al. "Structure from Stereo Vision using Unsynchronized Cameras for Simultaneous Localization and Mapping", 2005 IEEE/RSJ International Conference on Intelligent Robots and Systems, pp. 2993-2998, 2005.
Takio et al. "Real-Time Position and Pose Tracking Method of Moving Object Using Visual Servo System", 47th IEEE International Symposium on Circuits and Systems, pp. 167-170, 2004.
Teller "Pervasive pose awareness for people, Objects and Robots", http://www.ai.mit.edu/lab/dangerous-ideas/Spring2003/teller-pose.pdf, 6 pages, Apr. 30, 2003.
Terada et al. "An Acquisition of the Relation between Vision and Action using Self-Organizing Map and Reinforcement Learning", 1998 Second International Conference on Knowledge-Based Intelligent Electronic Systems, Adelaide, Australian pp. 429-434, Apr. 21-23, 1998.
The Sharper Image "e-Vac Robotic Vacuum, S1727 Instructions"www.sharperimage.com, 18 pages.
The Sharper Image "Robotic Vacuum Cleaner—Blue" www.Sharperimage.com, 2 pages, Mar. 18, 2005.
The Sharper Image "E Vac Robotic Vacuum", www.sharperiamge.com/us/en/templates/products/pipmorework1printable.jhtml, 2 pages, Mar. 18, 2005.
TheRobotStore.com "Friendly Robotics Robotic Vacuum RV400—The Robot Store", www.therobotstore.com/s.nl/sc.9/category.-109/it.A/id.43/.f, 1 page, Apr. 20, 2005.
TotalVac.com RC3000 RoboCleaner website Mar. 18, 2005.
Trebi-Ollennu et al."Mars Rover Pair Cooperatively Transporting a Long Payload", Proceedings of the 2002 IEEE International Conference on Robotics & Automation, Washington, D.C. pp. 3136-3141, May 2002.
Trbeihorn et al., "Evaluating the Roomba: A low-cost, ubiquitous platform for robotics research and education," 2007, IEEE, p. 1393-1399.
Tse et al. "Design of a Navigation System for a Household Mobile Robot Using Neural Networks", Department of Manufacturing Engg. & Engg. Management, City University of Hong Kong, pp. 2151-2156, 1998.
UAMA (Asia) Industrial Co., Ltd. "RobotFamily", 2005.
Watanabe et al. "Position Estimation of Mobile Robots With Internal and External Sensors Using Uncertainty Evolution Technique", 1990 IEEE International Conference on Robotics and Automation, Cincinnati, OH, pp. 2011-2016, May 13-18, 1990.
Watts "Robot, boldly goes where no man can", The Times—pp. 20, Jan. 1985.
Wijk et al. "Triangulation-Based Fusion of Sonar Data with Application in Robot Pose Tracking", IEEE Transactions on Robotics and Automation, vol. 16, No. 6, pp. 740-752, Dec. 2000.
Prassler et al., "A Short History of Cleaning Robots", Autonomous Robots 9, 211-226, 2000.
Andersen et al., "Landmark based navigation strategies", SPIE Conference on Mobile Robots XII, SPIE vol. 3525, pp. 170-181, Jan. 8, 1999.
Ascii, Mar. 25, 2002, http://ascii.jp/elem/000/000/330/330024/ accessed Nov. 1, 2011.
U.S. Appl. No. 60/605,066 as provided to WIPO in PCT/US2005/030422, corresponding to U.S. National Stage Entry Appl. No. 11/574,290, U.S. publication 2008/0184518, filed Aug. 27, 2004.
U.S. Appl. No. 60/605,181 as provided to WIPO in PCT/US2005/030422, corresponding to U.S. National Stage Entry Appl. No. 11/574,290, U.S. publication 2008/0184518, filed Aug. 27, 2004.
Derek Kurth, "Range-Only Robot Localization and SLAM with Radio", http://www.ri.cmu.edu/pub files/pub4/kurth_derek_2004_1/kurth_derek_2004_1.pdf. 60 pages, May 2004, accessed Jul. 27, 2012.
Electrolux Trilobite, Jan. 12, 2001, http://www.eletrolux-ui.com:8080/2002%5C822%5C833102EN.pdf, accessed Jul. 2, 2012, 10 pages.
Florbot GE Plastics, 1989-1990, 2 pages, available at http://www.fuseid.com/, accessed Sep. 27, 2012.
Gregg et al., "Autonomous Lawn Care Applications," 2006 Florida Conference on Recent Advances in Robotics, Miami, Florida, May 25-26, 2006, Florida International University, 5 pages.
Hitachi 'Feature', http://kadenfan.hitachi.co.jp/robot/feature/feature.html, 1 page, Nov. 19, 2008.
Hitachi, http://www.hitachi.co.jp/New/cnews/hi_030529_hi_030529.pdf , 8 pages, May 29, 2003.
Home Robot—UBOT; Microbotusa.com, retrieved from the WWW at www.microrobotusa.com, accessed Dec. 2, 2008.
King and Weiman, "Helpmate™ Autonomous Mobile Robots Navigation Systems," SPIE vol. 1388 Mobile Robots, pp. 190-198 (1990).
Li et al. "Robust Statistical Methods for Securing Wireless Localization in Sensor Networks," Information Procesing in Sensor Networks, 2005, Fourth International Symposium on, pp. 91-98, Apr. 2005.
Martishevcky, "The Accuracy of point light target coordinate determination by dissectoral tracking system", SPIE vol. 2591, pp. 25-30, Oct. 23, 2005.
Maschinemarkt Würzburg 105, Nr. 27, pp. 3, 30, Jul. 5, 1999.
Miwako Doi "Using the symbiosis of human and robots from approaching Research and Development Center," Toshiba Corporation, 16 pages, available at http://warp.ndl.go.jp/info:ndljp/pid/

258151/www.soumu.go.jp/joho_tsusin/policyreports/chousa/netrobot/pdf/030214_1_33_a.pdf, Feb. 26, 2003.

Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.

Roboking—not just a vacuum cleaner, a robot!, Jan. 21, 2004, infocom.uz/2004/01/21/robokingne-prosto-pyilesos-a-robot/, accessed Oct. 10, 2011, 7 pages.

Sebastian Thrun, "Learning Occupancy Grid Maps With Forward Sensor Models," Autonomous Robots 15, 111-127, Sep. 1, 2003.

SVET Computers—New Technologies—Robot Vacuum Cleaner, Oct. 1999, available at http://www.sk.rs/1999/10/sknt01.html, accessed Nov. 1, 2011.

Written Opinion of the International Searching Authority, PCT/US2004/001504, Aug. 20, 2012, 9 pages.

Kwon et al., "Table Recognition through Range-based Candidate Generation and Vision based Candidate Evaluation," *ICAR 2007, The 13th International Conference on Advanced Robotics Aug. 21-24, 2007, Jeju, Korea*, 918-923 (2007).

\* cited by examiner

OBSTACLE FOLLOWING SENSOR SCHEME FOR A MOBILE ROBOT

CROSS REFERENCE TO RELATED APPLICATIONS

This U.S. patent application is a continuation of, and claims priority under 35 U.S.C. §120 from U.S. patent application Ser. No. 11/834,553 filed on Aug. 6, 2007, now U.S. Pat. No. 7,430,455 which is a continuation of Ser. No. 11/166,986, filed on Jun. 24, 2005, which is a continuation-in-part of U.S. patent application Ser. No. 10/453,202, filed on Jun. 3, 2003, now U.S. Pat. No. 7,155,308 which is a continuation-in-part of U.S. patent application Ser. No. 09/768,773, filed on Jan. 24, 2001, now U.S. Pat. No. 6,594,844, which claims priority under 35 U.S.C. §119(e) to U.S. Provisional Application 60/177,703, filed on Jan. 24, 2000. U.S. patent application Ser. No. 11/166,986 also claims priority under 35 U.S.C. §119(e) to U.S. Provisional Application 60/582,992, filed on Jun. 25, 2004. The disclosures of the prior applications are considered part of (and are hereby incorporated by reference in) the disclosure of this application.

FIELD OF THE INVENTION

This invention relates to an obstacle detection system for an autonomous robot, such as an autonomous cleaning robot.

BACKGROUND OF THE INVENTION

There is a long felt need for autonomous robotic cleaning and processing devices for dusting, mopping, vacuuming, sweeping, lawn mowing, ice resurfacing, ice melting, and other operations. Although technology exists for complex robots which can, to some extent, "see" and "feel" their surroundings, the complexity, expense and power requirements associated with these types of robotic subsystems render them unsuitable for the consumer marketplace.

The assignee of the subject application has devised a less expensive, battery operated, autonomous cleaning robot which operates in various modes, including random bounce and wall-following modes. In the random bounce mode, the processing circuitry of the robot causes it to move in a straight line until the robot comes into contact with an obstacle; the robot then turns away from the obstacle and heads in a random direction. In the wall-following mode, the robot encounters a wall, follows it for a time, and then returns to the random mode. By using this combination of modes, robotic theory has proven that the floor, including the edges thereof, is adequately covered in an optimal time resulting in a power savings.

Unfortunately, however, presently available sensor subsystems such as sonar sensors for detecting obstacles on or in the floor or for detecting the wall in order to enter the wall-following mode (or to avoid bumping into the wall) are either too complex or too expensive or both. Tactile sensors are inefficient to ensure that walls or other obstacles can be effectively followed at a predetermined distance.

Some existing systems that disclose wall-following modes for autonomous robots are disclosed in International Publication No. WO 02/101477 A2, U.S. patent application Ser. No. 10/453,202 and U.S. Pat. No. 6,809,490, the disclosures of which are herein incorporated by reference in their entireties. In an embodiment of the system disclosed in the U.S. patent and application (and available commercially from iRobot Corporation as the ROOMBA® Robotic Floorvac), analog electronics (i.e., a comparator) are used to determine whether a sensor has detected the wall or not. The system is designed to follow along a wall at a predetermined distance to allow a cleaning mechanism (e.g., a side brush) to clean against a wall. In the ROOMBA® Robotic Floorvac, a mechanical shutter proximate the sensor can be manually adjusted by the user in order to make the robot follow an appropriate distance from the wall. This shutter is used since the sensor can be sensitive to the albedo of the wall. This manually adjusted shutter, while effective, detracts from the autonomous nature of mobile robots; thus, a fully independent wall-following scheme for a mobile robot is needed.

SUMMARY OF THE INVENTION

Accordingly, the control system of the present invention utilizes, in one embodiment, a synchronous detection scheme inputted directly into an A/D port on a microprocessor of the robot. This allows sensor values, and not merely the presence or absence of a wall, to be used to control the robot. The synchronous detection algorithm also allows readings to be taken with and without the sensor emitter powered, which allows the system to take into account ambient light.

In one aspect, the invention relates to a robot obstacle detection system that is simple in design, low cost, accurate, easy to implement, and easy to calibrate.

In an embodiment of the above aspect, such a robot detection system prevents an autonomous cleaning robot from driving off a stair or an obstacle that is too high.

In another aspect, the invention relates to a robotic wall detection system that is low cost, accurate, easy to implement, and easy to calibrate.

In an embodiment of the above aspect, such a robot wall detection system effects smoother robot operation in the wall-following mode.

In yet another aspect, the invention relates to a sensor subsystem for a robot that consumes a minimal amount of power.

In still another aspect, the invention relates to a sensor subsystem that is unaffected by surfaces of different reflectivity or albedo.

Another aspect of the invention results from the realization that a low cost, accurate, and easy-to-implement system for either preventing an autonomous robot from driving off a stair or over an obstacle which is too high or too low and/or for more smoothly causing the robot to follow a wall for more thorough cleaning can be effected by intersecting the field of view of a detector with the field of emission of a directed beam at a predetermined region and then detecting whether the floor or wall occupies that region. If the floor does not occupy the predefined region, a stair or some other obstacle is present and the robot is directed away accordingly. If a wall occupies the region, the robot is first turned away from the wall and then turned back towards the wall at decreasing radiuses of curvature until the wall once again occupies the region of intersection to effect smoother robot operation in the wall-following mode.

One embodiment of the invention features an autonomous robot having a housing that navigates in at least one direction on a surface. A first sensor subsystem is aimed at the surface for detecting obstacles on the surface. A second sensor subsystem is aimed at least proximate the direction of navigation for detecting walls. Each subsystem can include an optical emitter which emits a directed beam having a defined field of emission and a photon detector having a defined field of view which intersects the field of emission of the emitter at a finite, predetermined region.

Another embodiment of the robot obstacle detection system of this invention features a robot housing which navigates with respect to a surface and a sensor subsystem having a defined relationship with respect to the housing and aimed at the surface for detecting the surface. The sensor subsystem can include an optical emitter which emits a directed beam having a defined field of emission and a photon detector having a defined field of view which intersects the field of emission of the emitter at a region. A circuit in communication with the detector then redirects the robot when the surface does not occupy the region to avoid obstacles.

In certain embodiments, there are a plurality of sensor subsystems spaced from each other on the housing of the robot and the circuit includes logic for detecting whether any detector has failed to detect a beam from an emitter.

In one embodiment, the robot includes a surface cleaning brush. Other embodiments attach to the robot a buffing brush for floor polishing, a wire brush for stripping paint from a floor, a sandpaper drum for sanding a surface, a blade for mowing grass, etc. The emitter typically includes an infrared light source and, consequently, the detector includes an infrared photon detector. A modulator connected to the infrared light source modulates the directed infrared light source beam at a predetermined frequency, with the photon detector tuned to that frequency. The emitter usually includes an emitter collimator about the infrared light source for directing the beam and the detector then further includes a detector collimator about the infrared photon detector. The emitter collimator and the detector collimator may be angled with respect to the surface to define a finite region of intersection.

One embodiment of the robot wall detection system in accordance with the invention includes a robot housing which navigates with respect to a wall and a sensor subsystem having a defined relationship with respect to the housing and aimed at the wall for detecting the presence of the wall. The sensor subsystem includes an emitter which emits a directed beam having a defined field of emission and a detector having a defined field of view which intersects the field of emission of the emitter at a region. A circuit in communication with the detector redirects the robot when the wall occupies the region.

In another embodiment, there are a plurality of sensor subsystems spaced from each other on the housing of the robot and the circuit includes logic for detecting whether any detector has detected a beam from an emitter.

The circuit includes logic which redirects the robot away from the wall when the wall occupies the region and back towards the wall when the wall no longer occupies the region of intersection, typically at decreasing radiuses of curvature until the wall once again occupies the region of intersection to effect smooth operation of the robot in the wall-following mode.

The sensor subsystem for an autonomous robot which rides on a surface in accordance with this invention includes an optical emitter which emits a directed optical beam having a defined field of emission, a photon detector having a defined field of view which intersects the field of emission of the emitter at a region and a circuit in communication with a detector for providing an output when an object is not present in the region.

If the object is the surface, the output from the circuit causes the robot to be directed to avoid an obstacle. If, on the other hand, the object is a wall, the output from the circuit causes the robot to be directed back towards the wall.

If the object is diffuse, at least one of the detector and the emitter may be oriented normal to the object. Also, an optional lens for the emitter and a lens for the detector control the size and/or shape of the region. A control system may be included and configured to operate the robot in a plurality of modes including an obstacle following mode, whereby said robot travels adjacent to an obstacle. Typically, the obstacle following mode comprises alternating between decreasing the turning radius of the robot as a function of distance traveled, such that the robot turns toward said obstacle until the obstacle is detected, and such that the robot turns away from said obstacle until the obstacle is no longer detected. In one embodiment, the robot operates in obstacle following mode for a distance greater than twice the work width of the robot and less than approximately ten times the work width of the robot. In one example, the robot operates in obstacle following mode for a distance greater than twice the work width of the robot and less than five times the work width of the robot.

In another aspect, the invention relates to a method for operating a mobile robot, the method including the steps of detecting the presence of an object proximate the mobile robot, sensing a value of a signal corresponding to the object, comparing the value to a predetermined value, moving the mobile robot in response to the comparison, and updating the predetermined value upon the occurrence of an event. In another embodiment, the updated predetermined value is based at least in part on a product of the predetermined value and a constant. In certain embodiments, the event may include a physical contact between the mobile robot and the object or may include when a scaled value is less than the predetermined value. In one embodiment, the scaled value is based at least in part on a product of the value and a constant. The step of moving the mobile robot may include causing the robot to travel toward the object, when the value is less than the predetermined value, and/or causing the robot to travel away from the object, when the value is greater than the predetermined value.

In other embodiments, the method includes conditioning the value of the signal corresponding to the object. The detection step of the method may also include a first detection at a first distance to the object, and a second detection at a second distance to the object. The detection step may include emitting at least one signal and/or measuring at least one signal with at least one sensor. Embodiments of the above aspect may average a plurality of signals or filter one or more signals. In certain embodiments, a plurality of sensors are disposed on the mobile robot in a predetermined pattern that minimizes a variation in object reflectivity. Other embodiments vary the power of at least one emitted signal and/or vary the sensitivity of at least one sensor.

In various embodiments of the above aspect, at least one emitted signal or detected signal includes light having at least one of a visible wavelength and an infrared wavelength. In other embodiments of the above aspect, at least one emitted signal or detected signal includes an acoustic wave having at least one of an audible frequency and an ultrasonic frequency. Other embodiments of the above aspect include a mobile robot, the robot having at least one infrared emitter and at least one infrared detector, wherein the infrared emitter and the infrared detector are oriented substantially parallel to each other. In certain embodiments, the signal value corresponds to at least one of a distance to the object and an albedo of the object.

In another aspect, the invention relates to a method for operating a mobile robot, the method including the steps of detecting a presence of an object proximate the mobile robot, detecting an absence of the object, moving the robot a predetermined distance in a predetermined first direction, and rotating the robot in a predetermined second direction about a fixed point. In certain embodiments of the above aspect, the predetermined distance corresponds at least in part to a distance from a sensor located on the robot to a robot wheel axis. In one embodiment, the first direction is defined at least in part by a previous direction of motion of the robot prior to detecting the absence of the object.

In alternative embodiments, the fixed point is a point between a first wheel of the robot and the object. In some embodiments, the first wheel is proximate the object. In other embodiments, rotating the robot may cease on the occurrence of an event, the event including detecting a presence of an object, contacting an object, or rotating the robot beyond a predetermined angle. An additional step of moving in a third direction is included in other embodiments.

BRIEF DESCRIPTION OF THE DRAWINGS

Other objects, features and advantages will occur to those skilled in the art from the following description of some embodiments of the invention and the accompanying drawings, in which.

DETAILED DESCRIPTION

Figure 1:
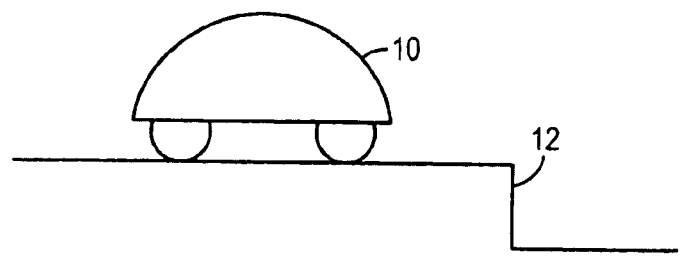
FIG. 1 is schematic view of a robot in accordance with one embodiment of the invention approaching a downward stair.

Robotic cleaning device 10, FIG. 1 can be configured to dust, mop, vacuum, and/or sweep a surface such as a floor. Typically, robot 10 operates in several modes: random coverage, spiral, and a wall-following mode, as discussed in U.S.

Figure 2:
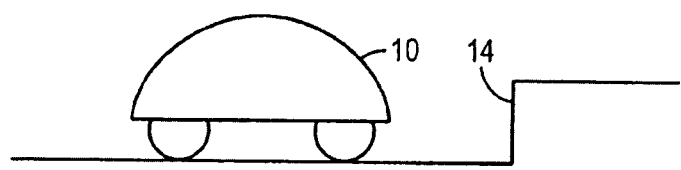
FIG. 2 is a schematic view of the robot of FIG. 1 approaching an upward stair.
Figure 3:
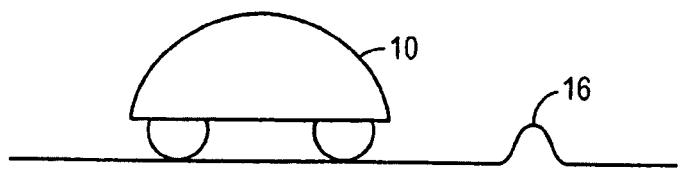
FIG. 3 is a schematic view of the robot of FIG. 1 approaching an obstacle on a floor.

Pat. No. 6,809,490 and in the Background section above. In any mode, robot 10 may encounter downward stair 12 or another similar "cliff," upward stair 14, FIG. 2, or another similar rise, and/or obstacle 16, FIG. 3. According to one specification, the robot must be capable of traversing obstacles less then ⅝" above or below floor level. Therefore, robot 10 must avoid stairs 12 and 14 but traverse obstacle 16 which may be an extension cord, the interface between a rug and hard flooring, or a threshold between rooms.

Figure 4:
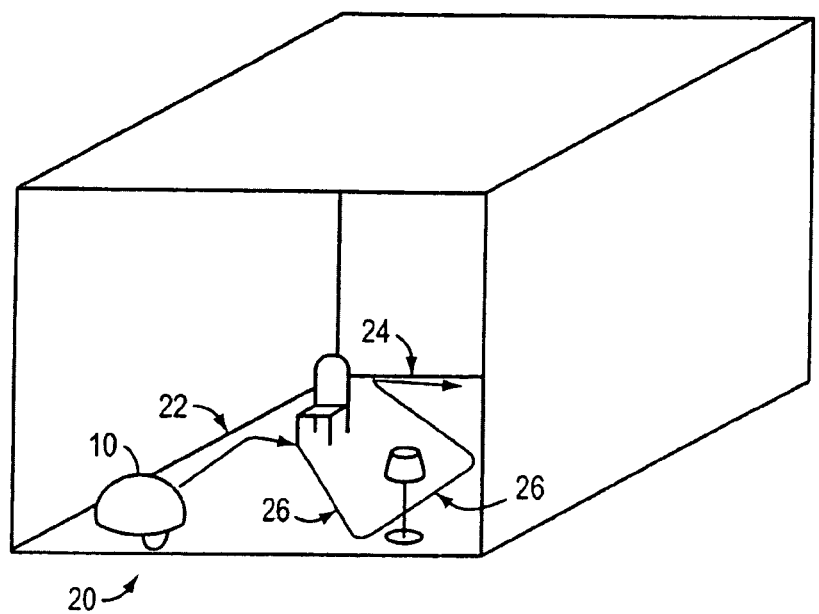
FIG. 4 is a schematic view showing the difference between the wall-following and random modes of travel of a robot in accordance with one embodiment of the invention.

As delineated in the background of the invention, presently available obstacle sensor subsystems useful in connection with robot 10 are either too complex or too expensive or both. Moreover, robot 10, depicted in FIG. 4, is designed to be inexpensive and to operate based on battery power to thus thoroughly clean room 20 in several modes: a spiral mode (not shown), a wall-following mode as shown at 22 and 24, and a random bounce mode as shown at 26. In the wall-following mode, the robot follows the wall for a time. In the random bounce mode, the robot travels in a straight line until it bumps into an object. It then turns away from the obstacle by a random turn and then continues along in a straight line until the next object is encountered.

Accordingly, any obstacle sensor subsystem must be inexpensive, simple in design, reliable, must not consume too much power, and must avoid certain obstacles but properly recognize and traverse obstacles which do not pose a threat to the operation of the robot.

Although the following disclosure relates to cleaning robots, the invention hereof is not limited to such devices and may be useful in other devices or systems wherein one or more of the design criteria listed above are important.

Figure 5A:
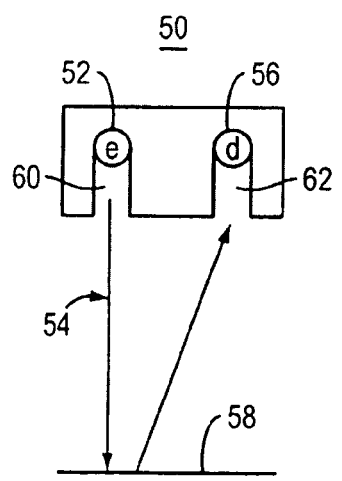
FIG. 5A is a schematic view of a sensor subsystem in accordance with one embodiment of the invention.

In one embodiment, depicted in FIG. 5A, sensor subsystem 50, includes optical emitter 52 which emits a directed beam 54 having a defined field of emission explained supra. Sensor subsystem 50 also includes photon detector 56 having a defined field of view which intersects the field of emission of emitter 52 at or for a given region. Surface 58 may be a floor or a wall depending on the arrangement of sensor subsystem 50 with respect to the housing of the robot.

In general, for obstacle avoidance, circuitry is added to the robot and connected to detector 56 to redirect the robot when surface 58 does not occupy the region defining the intersection of the field of emission of emitter 52 and the field of view of detector 56. For wall-following, the circuitry redirects the robot when the wall occupies the region defined by the intersection of the field of emission of emitter 52 and the field of view of detector 56. Emitter collimator tube 60 forms directed beam 54 with a predefined field of emission and detector collimator tube 62 defines the field of view of the detector 56. In alternative embodiments, collimator tubes 60, 62 are not used.

FIG. 5A depicts one embodiment of the invention where the emitter 52 and detector 56 are parallel to each other and perpendicular to a surface. This orientation makes the signal strength at the detector more dependant on the distance to obstacle. However, in this orientation, the difference between a white or highly reflective surface a long distance away from subsystem 50 and a black or non-reflective surface closer to subsystem 50 cannot be easily detected by the control circuitry. Moreover, the effects of specular scattering are not always easily compensated for adequately when the beam from emitter 52 is directed normal to the plane of surface 58. Notwithstanding the foregoing, this parallel configuration of emitter 52 and detector 56 can be utilized advantageously with the wall-following mode depicted in FIGS. 21A and 21B, described in more detail below.

Figure 6A:
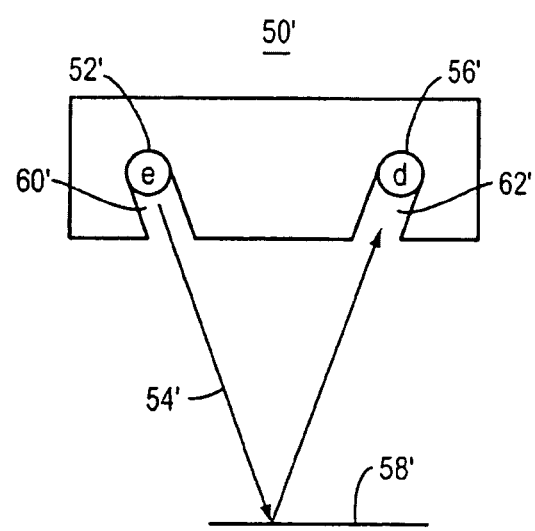
FIG. 6A is a schematic view of a sensor subsystem in accordance with another embodiment of the invention.
Figure 7:
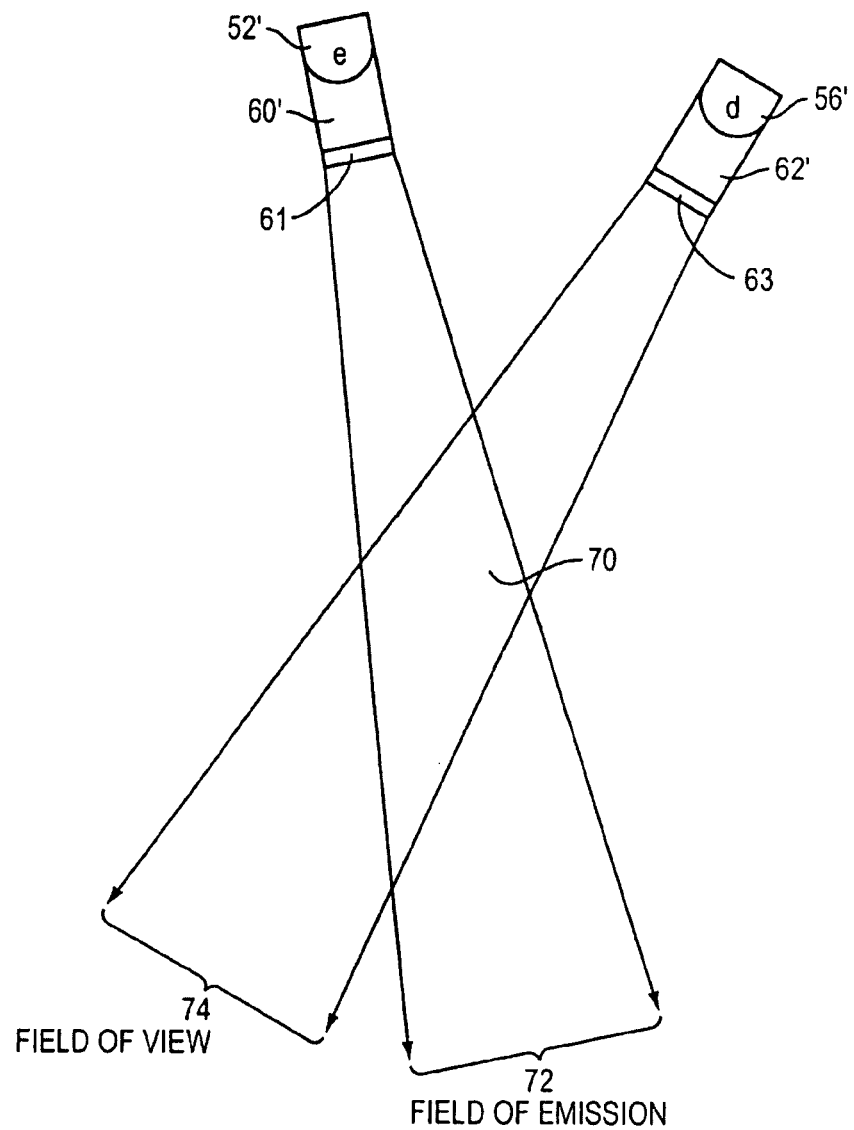
FIG. 7 is a schematic view showing the field of emission of the emitter and the field of view of the detector of the sensor subsystem in accordance with one embodiment of the invention.

In another embodiment, depicted in FIG. 6A, emitter collimator 60' and detector collimator 62' are both angled with respect to surface 58 and with respect to each other as shown, which is intended to reduce the signal strength dependence on the wall reflectivity. In this way, the region 70, FIG. 7, in which the field of emission of emitter 52' as shown at 72 and the field of view of detector of 56' as shown at 74 intersect is finite to more adequately address specular scattering and surfaces of different reflectivity. In this design, the emitter is typically an infrared emitter and the detector is typically an infrared radiation detector. The infrared energy directed at the floor decreases rapidly as the sensor-to-floor distance increases while the infrared energy received by the detector changes linearly with surface reflectivity. Note, however, that an angled relationship between the emitter and detector is not required for diffuse surfaces. Optional lenses 61 and 63 may also be employed to better control the size and/or shape of region 70.

Figure 5B:
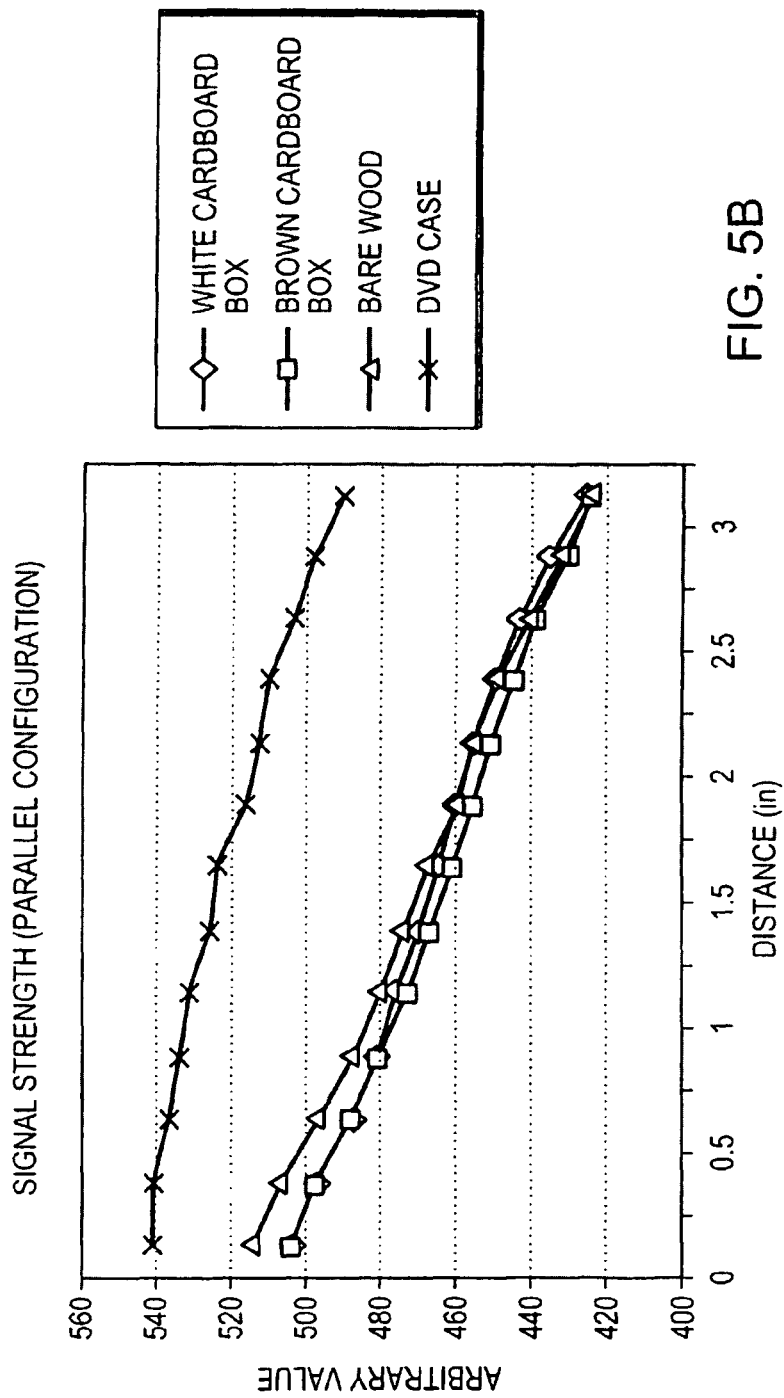
FIG. 5B is a graph of signal strength versus distance for the sensor-detector configuration depicted in FIG. 5A.
Figure 6B:
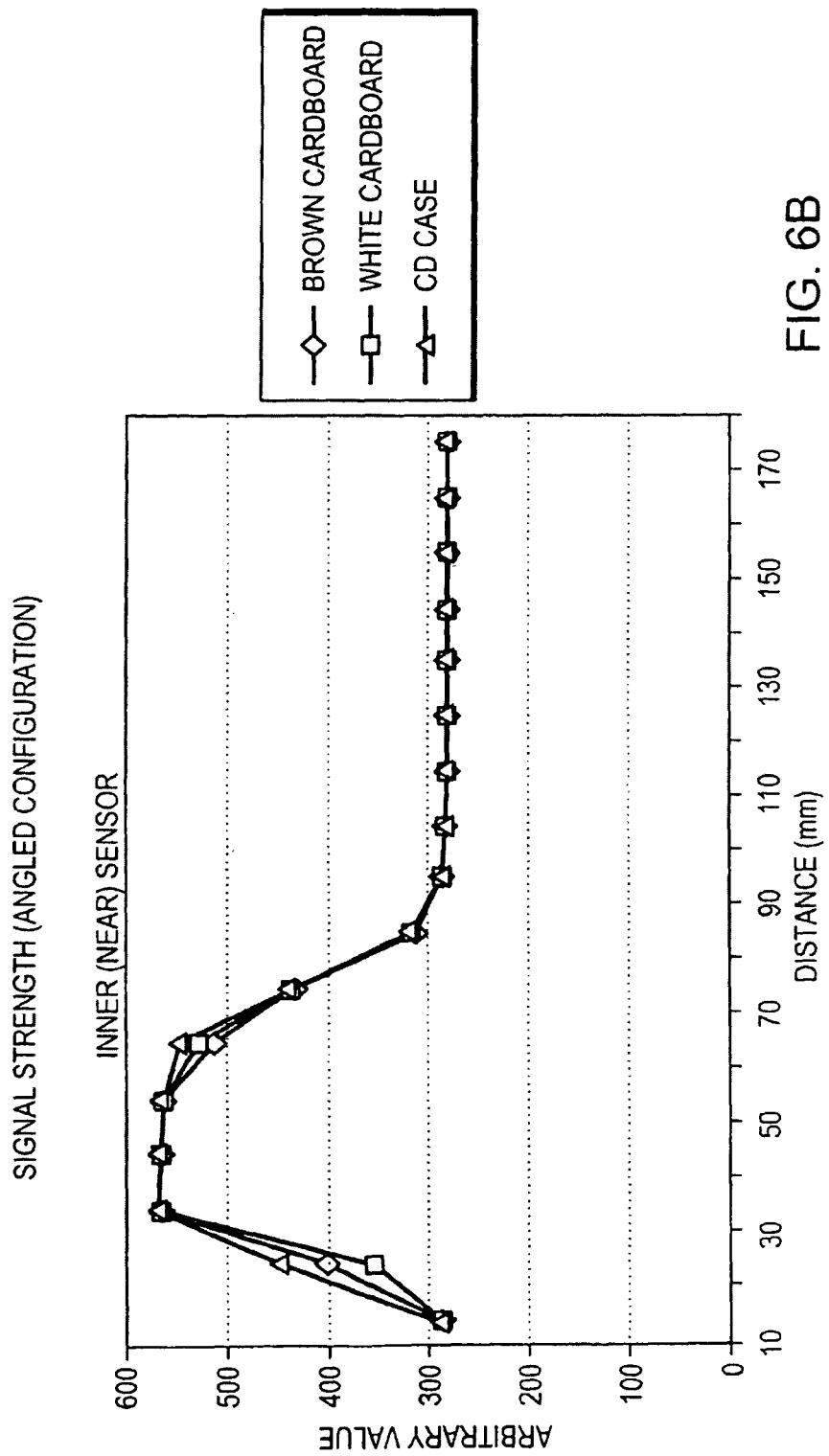
FIG. 6B is a graph of signal strength versus distance for the sensor-detector configuration depicted in FIG. 6A.

FIGS. 5B and 6B are graphs comparing the signal strength to distance from an object for the emitter/detector configurations depicted in FIGS. 5A and 6B, respectively. In FIG. 5B, depicting the relationship for a parallel configuration, the signal strength is proportional to the distance, and approaches a linear relationship for all four surfaces tested (white cardboard, brown cardboard, bare wood, and clear plastic). Accordingly, sensors arranged to detect walls or other essentially vertical obstacles are well-suited to the parallel configuration, as it allows surfaces further distance away to be effectively detected.

FIG. 6B, on the other hand, depicts the relationship for an angled configuration of the emitter/detector. In this orientation, the signal strength falls off rapidly at a closer distance, regardless of surface type, for all three surfaces tested (brown cardboard, white cardboard, and clear plastic). This occurs when the surface being detected is no longer present in the intersecting region of the emitter signal and detector field of view. Accordingly, the angled orientation and resulting overlap region are desirable for cliff detection subsystems. In that application, a difference in surface height must be detected clearly, allowing the robot to redirect accordingly, saving the robot from damage. Although the parallel configuration and angled configurations are better suited to wall- and cliff-detection, respectively, the invention contemplates using either configuration for either application.

Figure 8:
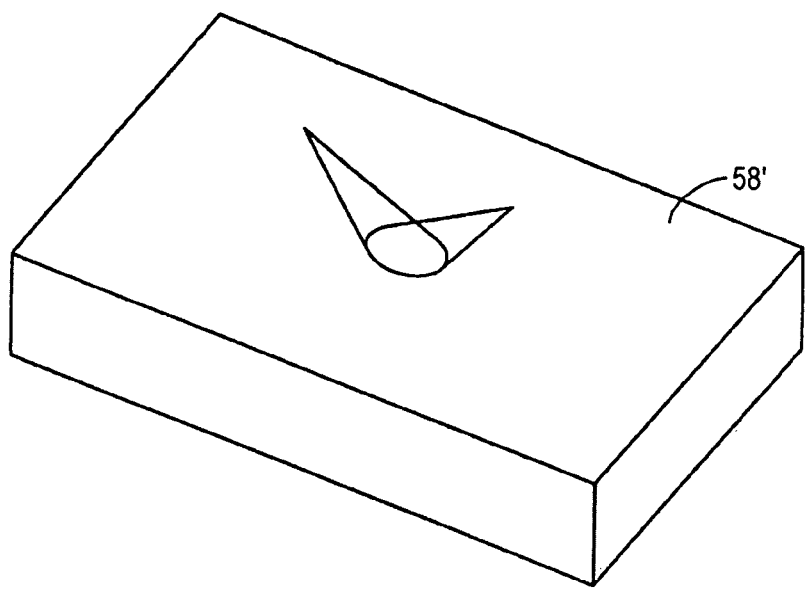
FIG. 8 is a three-dimensional schematic view showing a full overlap of the field of emission of the emitter and the field of view of the detector in accordance with one embodiment of the invention.
Figure 9:
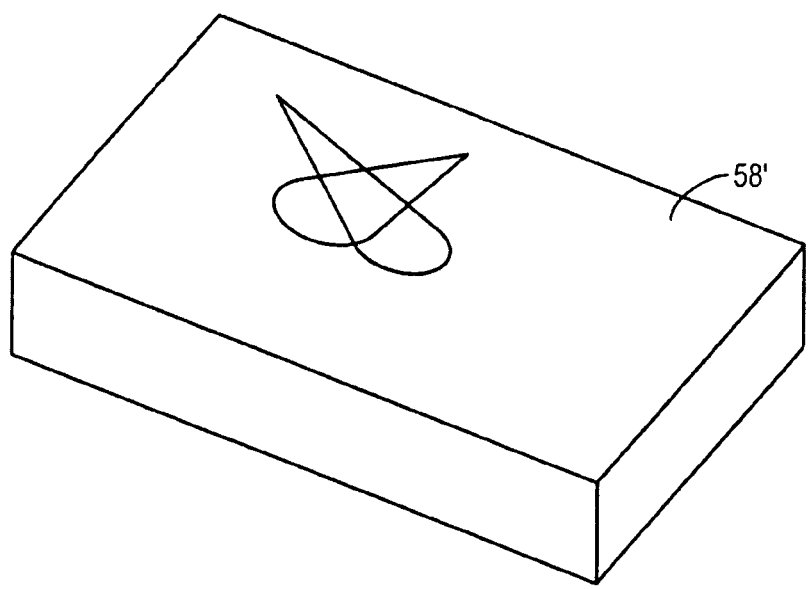
FIG. 9 is a three-dimensional schematic view showing the situation which occurs when there is a minimal overlap between the field of emission and the field of view of one embodiment of the sensor subsystem of the invention.

The sensor subsystem is calibrated such that when floor or surface 58', FIG. 8, is the "normal" or expected distance with respect to the robot, there is a full or a nearly full overlap between the field of emission of the emitter and the field of view of the detector as shown. When the floor or surface is too far away such that the robot can not successfully traverse an obstacle, there is no or only a minimal overlap between the field of emission of the emitter and the field of view of the detector as shown in FIG. 9. The emitter beam and the detector field of view are collimated such that they fully overlap only in a small region near the expected position of the floor. The detector threshold is then set so that the darkest available floor material is detected when the beam and the field of view fully overlap. As the robot approaches a cliff, the overlap decreases until the reflected intensity is below the preset threshold. This triggers cliff avoidance behavior. Highly reflective floor material delays the onset of cliff detection only slightly. By arranging the emitter and detector at 45°. with respect to the floor, the region of overlap as a function of height is minimized. Equal incidence and reflection angles ensure that the cliff detector functions regardless of whether the floor material is specular or diffuse. The size of the overlap region can be selected by choosing the degree of collimation and the nominal distance to the floor. In this way, the logic interface between the sensor subsystem and the control circuitry of the robot is greatly simplified.

By tuning the system to simply redirect the robot when there is no detectable overlap, i.e., when the detector fails to emit a signal, the logic interface required between the sensor subsystem and the control electronics (e.g., a microprocessor) is simple to design and requires no or little signal conditioning. The emitted IR beam may be modulated and the return beam filtered with a matching filter in order to provide robust operation in the presence of spurious signals, such as sunlight, IR-based remote control units, fluorescent lights, and the like. Conversely, for the wall sensor embodiment, the system is tuned to redirect the robot when there is a detectable overlap.

Figures 10, 11:
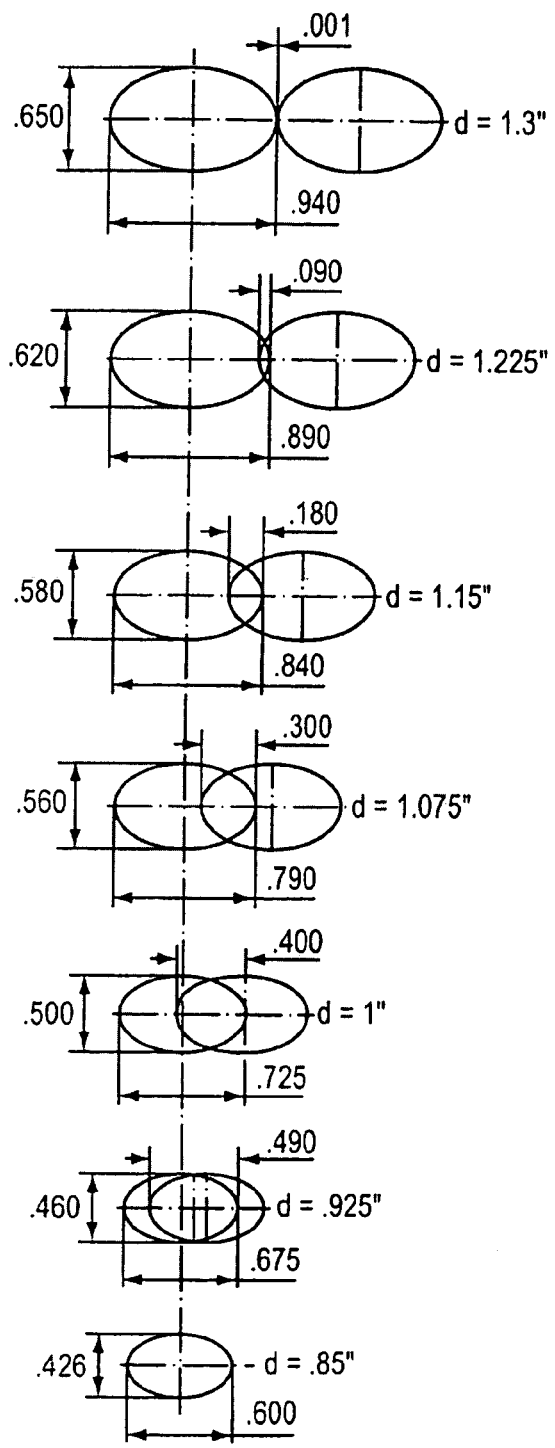
FIG. 10 is a series of views showing, from top to bottom, no overlap between the field of emission and the field of view and then a full overlap of the field of view over the field of emission.
FIG. 11 is a set of figures corresponding to FIG. 10 depicting the area of overlap for each of these conditions shown in FIG. 10.

FIGS. 10-11 provide in graphical form an example of the differences in the area of overlap depending on the height (d) of the sensor subsystem from a surface. The field of emission of the emitter and the field of view of the detector were set to be equal and non-overlapping at a distance (d) of 1.3 inches and each was an ellipse 0.940 inches along the major diameter and 0.650 inches along minor diameter. A full overlap occurred at d=0.85 inches where the resulting overlapping ellipses converge into a single ellipse 0.426 inches along the minor diameter and 0.600 inches along the major diameter. Those skilled in the art will understand how to adjust the field of emission and the field of view and the intersection region between the two to meet the specific design criteria of any robotic device in question. Thus, FIGS. 10 and 11 provide illustrative examples only.

Figure 12:
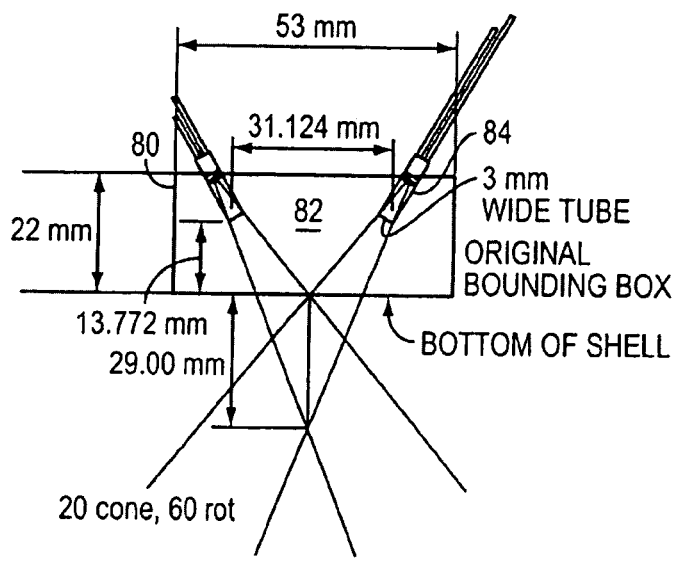
FIG. 12 is a more detailed schematic view of the sensor subsystem according to one embodiment of the invention.

In one embodiment, as shown in FIG. 12, in housing 80 of the sensor subsystem, a rectangular 22 mm by 53 mm by 3 mm diameter plastic emitter collimator tube 82 and 3 mm diameter plastic detector collimator tube 84 were placed 13.772 mm from the bottom of housing 80 which was flush with the bottom of the shell of the robot. The collimators 82, 84 may be either a separate component, or may be integrally formed in the robot housing. This configuration defined field of view and field of emission cones of 20° placed at a 60° angle from each other. The angle between the respective collimator tubes was 60° and they were spaced 31.24 mm apart. This configuration defined a region of intersection between the field of emission and the field of view 29.00 mm long beginning at the bottom of the robot.

Figure 13:
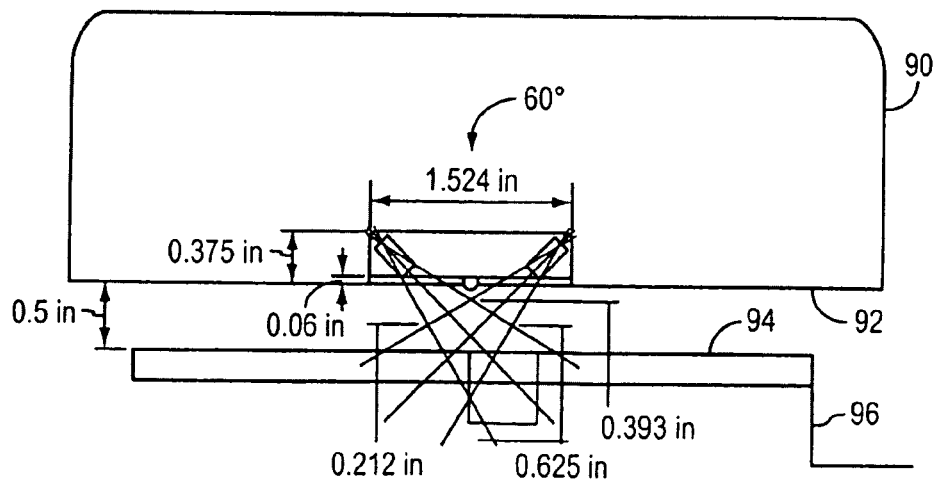
FIG. 13 is a schematic view of the sensor subsystem of FIG. 12 in place on or in a robot in accordance with one embodiment of the invention.

In the design shown in FIG. 13, the sensor subsystem is shown integrated with robot shell or housing 90 with a wheel (not shown) which supports the bottom 92 of shell 90 one-half inch above surface or floor 94. The region of overlap of the field of view and the field of emission was 0.688 inches, 0.393 inches above the surface. Thus, if stair 96 has a drop greater than 0.393 inches, no signal will be output by the detector and the robot redirected accordingly. In one embodiment, the emitter includes an infrared light source and the detector includes an infrared photon detector each disposed in round plastic angled collimators. The emitter, however, may also be a laser or any other source of light.

Figure 14:
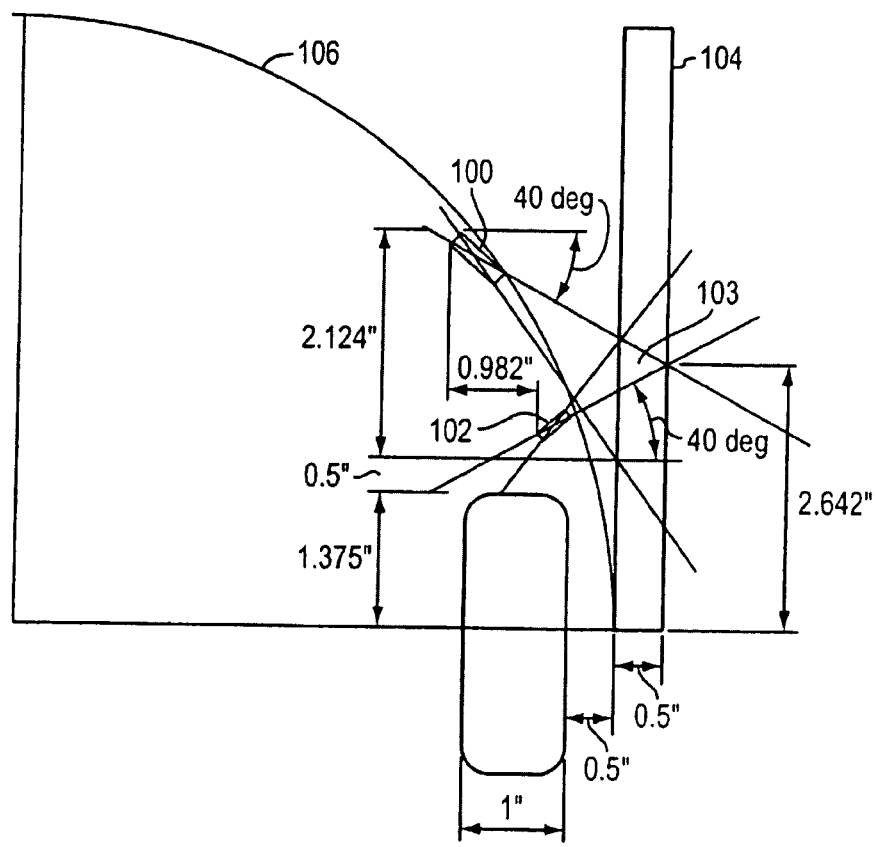
FIG. 14 is a schematic top view of the wall detection system in accordance with one embodiment of the invention in place on the shell or housing of a robot.

For wall detection, emitter 102 and detector 100 are arranged as shown in FIG. 14. The optical axes of the emitter and detector are parallel to the floor on which the robot travels. The field of emission of the emitter and the field of view of the detector are both 22 degree cones. A three millimeter diameter tube produces a cone of this specification when the active element is mounted 0.604 inches from the open end as shown. The optical axes of the emitter and detector intersect at an angle of 80 degrees. The volume of intersection 103 occurs at a point about 2.6 inches ahead of the point of tangency between the robot shell 106 and the wall 104 when the robot is traveling parallel to the wall. The line bisecting the intersection of the optical axes of the emitter and detector is perpendicular to the wall. This ensures that reflections from specular walls are directed from the emitter into the detector.

Figure 15:
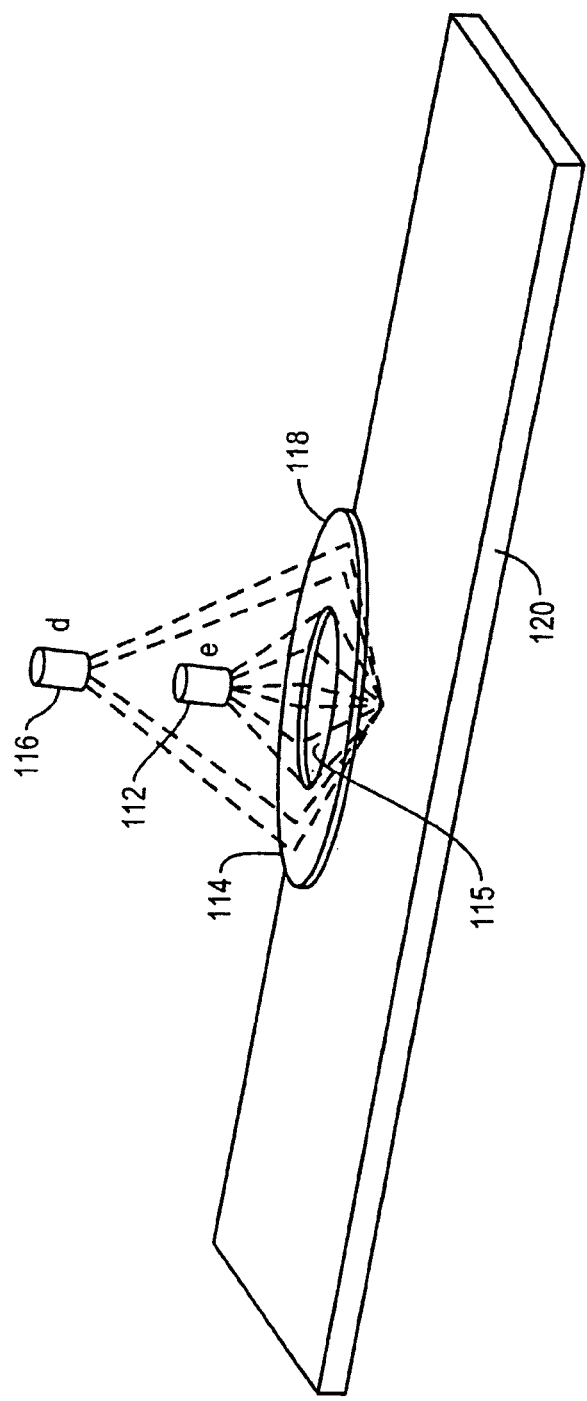
FIG. 15 is a schematic three dimensional view of the sensor system in accordance with another embodiment of the invention.

In another embodiment, depicted in FIG. 15, detector 116 is positioned above emitter 112 and lens 118 with two areas of different curvature 115 and 114 used to focus light from emitter 112 to the same spot as the field of view of detector 116 at only one height above surface 120 so that if the height changes, there is no or at least not a complete overlap between the field of view of detector 116 and emitter 112 as defined by curvature areas 115 and 114. In this situation, the rapid change of reflected intensity with height is provided by focusing two lenses on a single spot. When the floor is in the nominal position relative to the sensor subsystem, the emitter places all its energy on a small spot. The detector is focused on the same spot. As the floor falls away from the nominal position, light reflected into the detector (now doubly out of focus) decreases rapidly. By carefully selecting the lens-to-floor distance and the focal lengths of the two lenses, it is possible for the emitter and detector to be located at different points but have a common focus on the floor. Lens may also be used in connection with the embodiments of FIGS. 5A-7 to better control the shape and/or size of the region of intersection.

Figure 16:
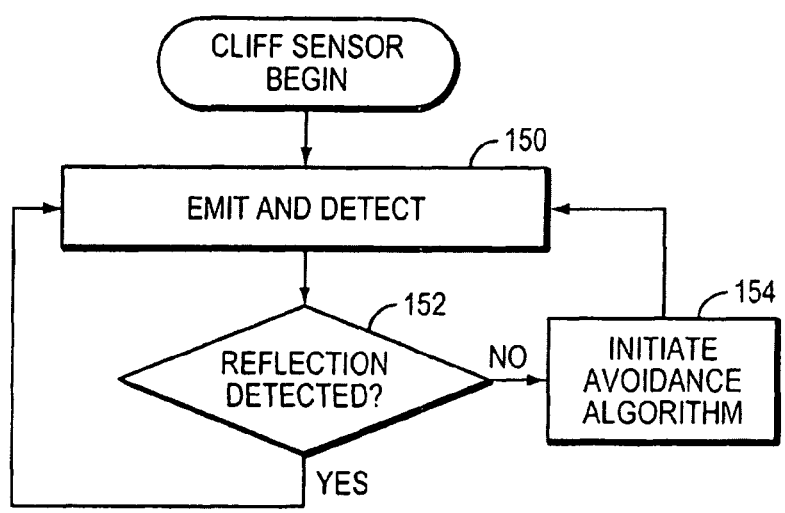
FIG. 16 is a flow chart depicting the primary steps associated with a logic which detects whether a cliff is present in front of the robot in accordance with one embodiment of the invention.

The logic of the circuitry associated with the cliff sensor embodiment modulates the emitter at a frequency of several kilohertz and detects any signal from the detector, step 150, FIG. 16, which is tuned to that frequency. When a signal is not output by the detector, step 152, the expected surface is not present and no overlap is detected. In response, an avoidance algorithm is initiated, step 154, to cause the robot to avoid any interfering obstacle. When a reflected signal is detected, processing continues to step 150.

Figure 17:
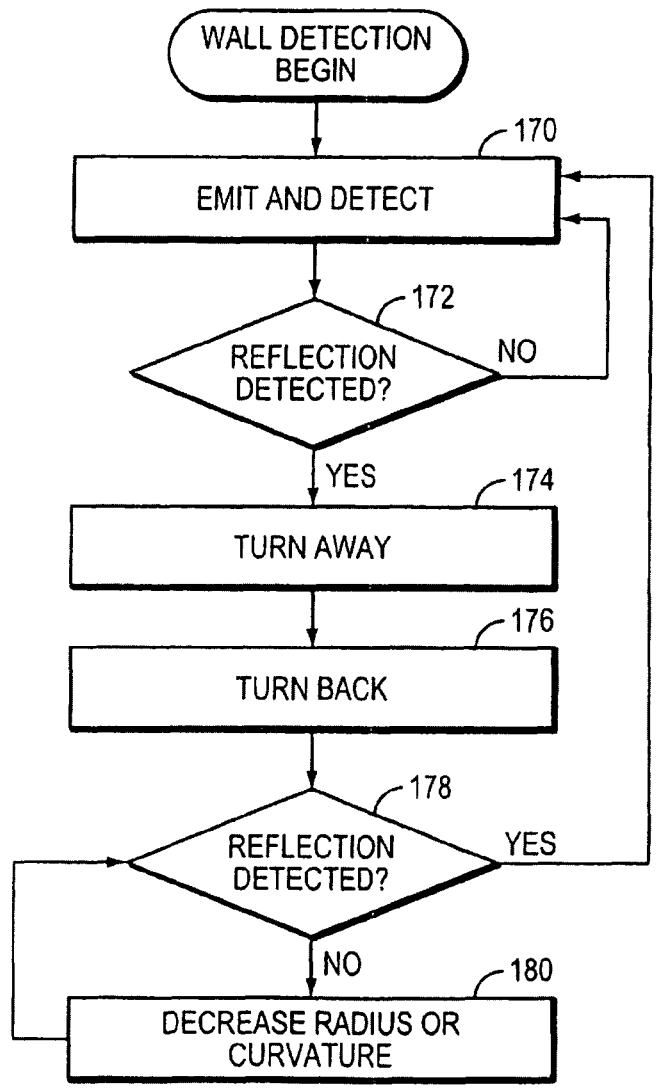
FIG. 17 is a flow chart depicting the primary steps associated with the wall-detection logic in accordance with one embodiment of the invention.

In the wall detection mode, the logic of the circuitry associated with the sensor subsystem modulates the emitter and detects signals from the detector as before, step 170, FIG. 17 until a reflection is detected, step 172. A wall is then next to the robot and the controlling circuitry causes the robot to turn away from the wall, step 174 and then turn back, step 176 until a reflection (the wall) is again detected, step 178. By continuously decreasing the radius of curvature of the robot, step 180, the path of the robot along the wall in the wall-following mode is made smoother.

Figure 18:
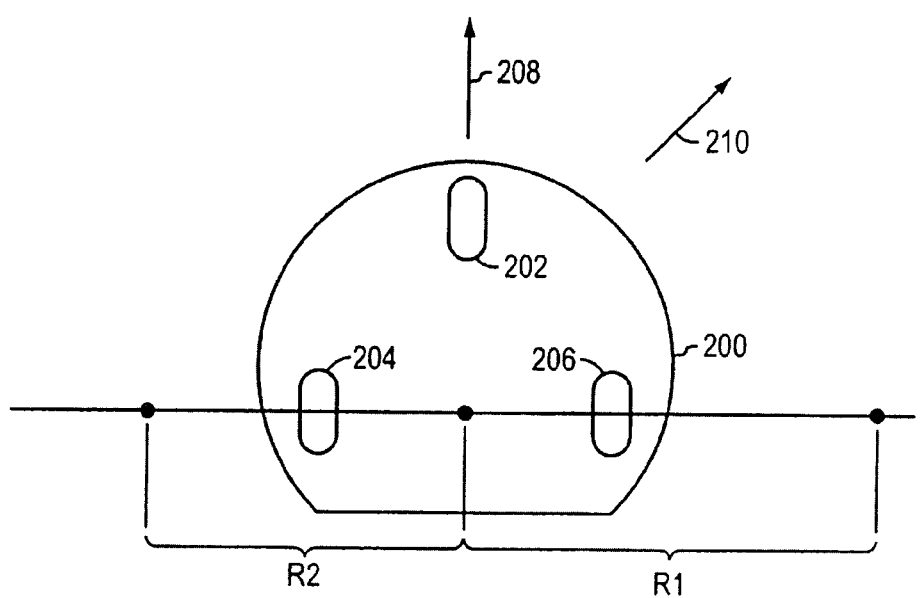
FIG. 18 is a bottom view of a cleaning robot in accordance with one embodiment of the invention configured to turn about curvatures of decreasing radiuses.

As shown in FIG. 18, robot housing 200 includes three wheels 202, 204, and 206 and is designed to only move forward in the direction shown by vector 208. When a wall is first detected (step 172, FIG. 17), the robot turns away from the wall in the direction of vector 210 and then turns back towards the wall rotating first about radius $R_1$ and then about radius $R_2$ and then about smoothly decreasing radius points (steps 178-180, FIG. 17) until the wall is again detected. This discussion assumes the detector is on the right of robot housing 200.

Figure 19:
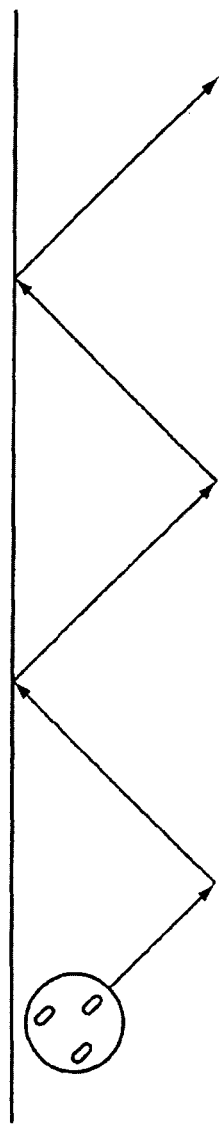
FIG. 19 is a schematic top view showing the abrupt turns made by a robot in the wall-following mode when the wall-following algorithm of an embodiment of the invention is not employed.

As shown in FIG. 19, if only one constant radius of curvature was chosen, the robot's travel path along the wall would be a series of abrupt motions. In contrast, by continuously reducing the radius of curvature as the robot moves forward back to the wall in accordance with the subject invention, the robot's travel path along the wall is relatively smooth as shown in FIG. 20A.

FIGS. 20B-20G depict a sequence corresponding to a corner-turning behavior of an autonomous robot 600. The corner-turning behavior allows the robot 600 to turn smoothly about an outside corner 612 without colliding with the corner 612 or the wall 614. Avoiding unnecessary collisions helps to improve cleaning efficiency and enhances users' perception of the robot's effectiveness.

The robot 600 depicted in FIGS. 20B-20G includes at least one wall sensor 602 and two drive wheels, described with respect to the wall 614 as a outside wheel 604 and a inside wheel 606. The wheels are aligned on a common axis 610. The signal 608 may be either a reflected signal projected by a corresponding emitter (in the sensor 602) or may be the signal received as a result of the ambient light, obstacle reflectivity, or other factors. In this embodiment, the sensor 602 is oriented approximately perpendicular to both the robot's general direction of motion $M_G$ and the wall 614. The sensor is located a distance X forward of the common axis 610 of the robot's drive wheels 604, 606. In this embodiment, X equals approximately three inches, but may be any distance based on the size of the robot 600, the robot's application, or other factors.

Figure 20A:
FIG. 20A is a view similar to FIG. 19 except that now the wall-following algorithm of one embodiment of the invention is employed to smooth out the path of the robotic cleaning device in the wall-following mode.
Figure 20B:
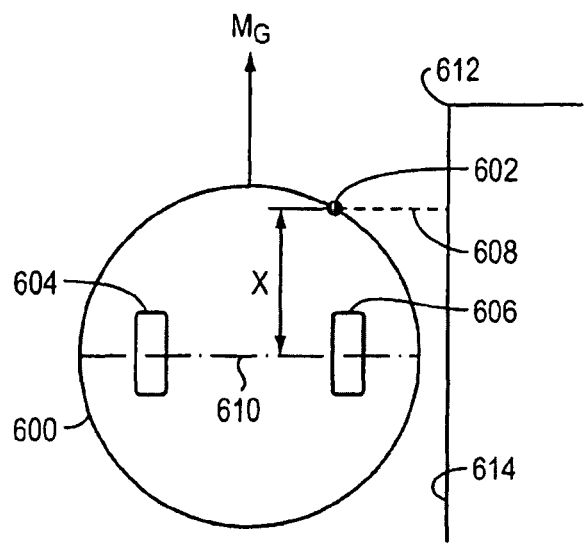
FIGS. 20B-20G depict a sequence wherein a mobile robot operates a wall-following, corner-turning algorithm in accordance with one embodiment of the invention.
Figure 20C:
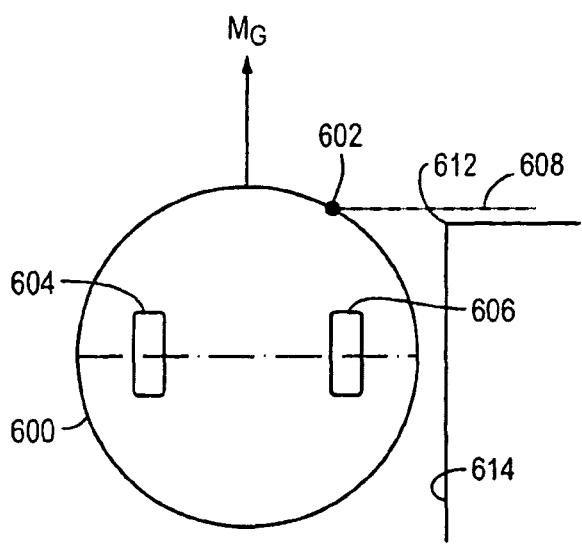

During the wall-following operation depicted in FIGS. 20A and 20B, the robot 600 servos on the analog signal from the sensor 602. That is, while moving generally forward along $M_G$ along the wall 614, the robot 600 turns slightly toward or away from the wall as the signal 608 decreases or increases, respectively. FIG. 20C depicts the condition when the robot 600 reaches an outside corner 612 and the signal 608 suddenly decreases to a low or zero value. When this occurs, the robot 600 triggers its corner-turning behavior. In an alternative embodiment, or in addition to the corner-turning behavior described below, the robot may turn immediately in an effort to bump the wall 614, allowing it to confirm the presence or absence of the wall 614. If the signal 608 remains low or at zero, but the bump sensor continues to activate, the robot would be able to self-diagnose a failed wall sensor 602.

Figure 20D:
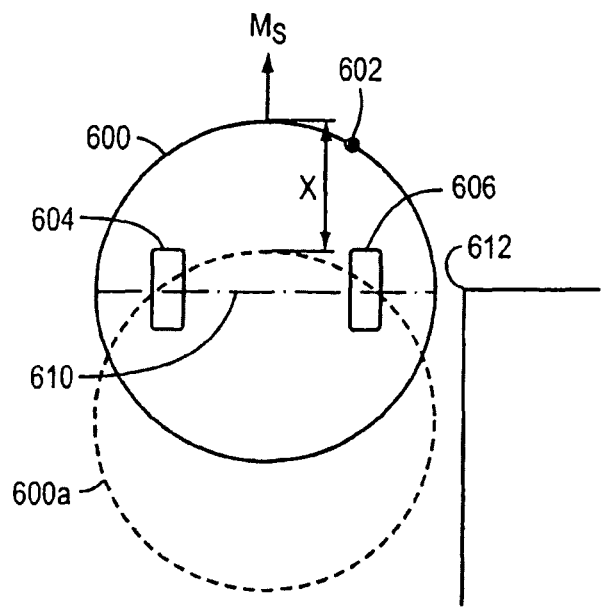
Figure 20E:
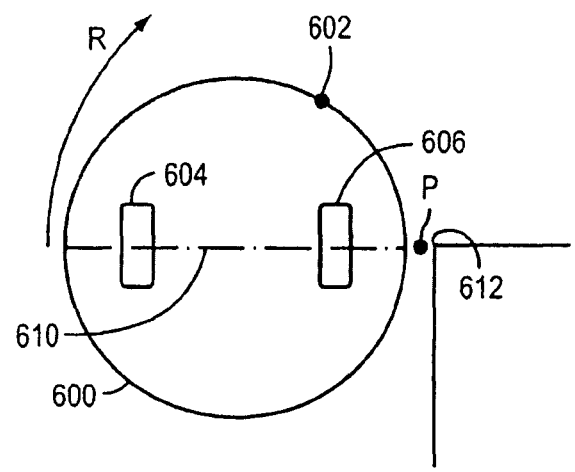

FIG. 20D depicts the initial step of corner-turning behavior, when the robot 600 first ceases servoing on the wall (i.e., moving generally forward $M_G$—the robot's last position while servoing is shown by dashed outline 600a) and moves straight $M_S$ ahead. The robot moves straight ahead $M_S$ a distance equal to the distance X between the servo sensor 602 and the drive wheel axis 610 (in this embodiment, approximately three inches). The drive wheel axis 610 now approximately intersects the corner 612. At this stage the robot 600 begins to rotate R about a point P located to the outside of the inside wheel 606 near the corner 612, as depicted in FIG. 20E. The distance from the inside wheel 606 to the point P can be selected in various ways. In one embodiment, the point P is approximately one inch from the inside drive wheel 606. This distance allows the robot 600 to turn, without collision, about an outside corner 612 of any angle or even a standard-width door. In the case of a door the robot 600 would make a 180-degree turn.

Figure 20F:
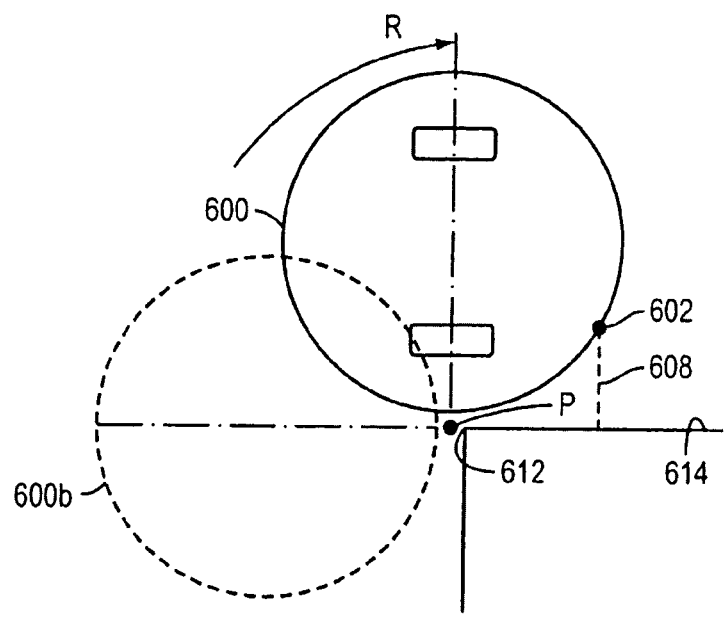
Figure 20G:
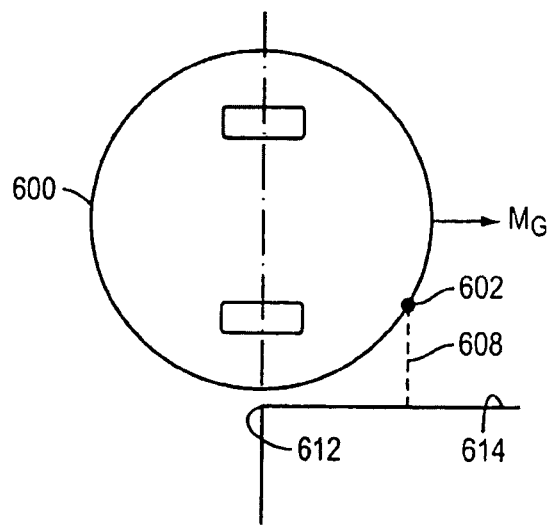

The robot 600 continues to rotate in a direction R about the rotation point P until one of three events occurs. FIG. 20F (showing with a dashed outline 600b, the position of the robot at rotation initiation) depicts the first scenario, where the signal 608 from the sensor 602 becomes high. Here, the robot 600 assumes it has found a wall 614. The robot 600 resumes the wall-following behavior, servoing on the wall 614, and moving generally forward $M_G$, as depicted in FIG. 20G. In a second scenario, the robot's bump sensor activates while rotating, at which time the robot may realign itself to the wall and begin following or, depending on other behaviors, the robot may abandon wall-following. The third scenario occurs if the robot turns nearly a complete circle or other predetermined angle without encountering a wall. The robot will assume it has "lost" the wall and can abandon wall-following mode.

Figure 21A:
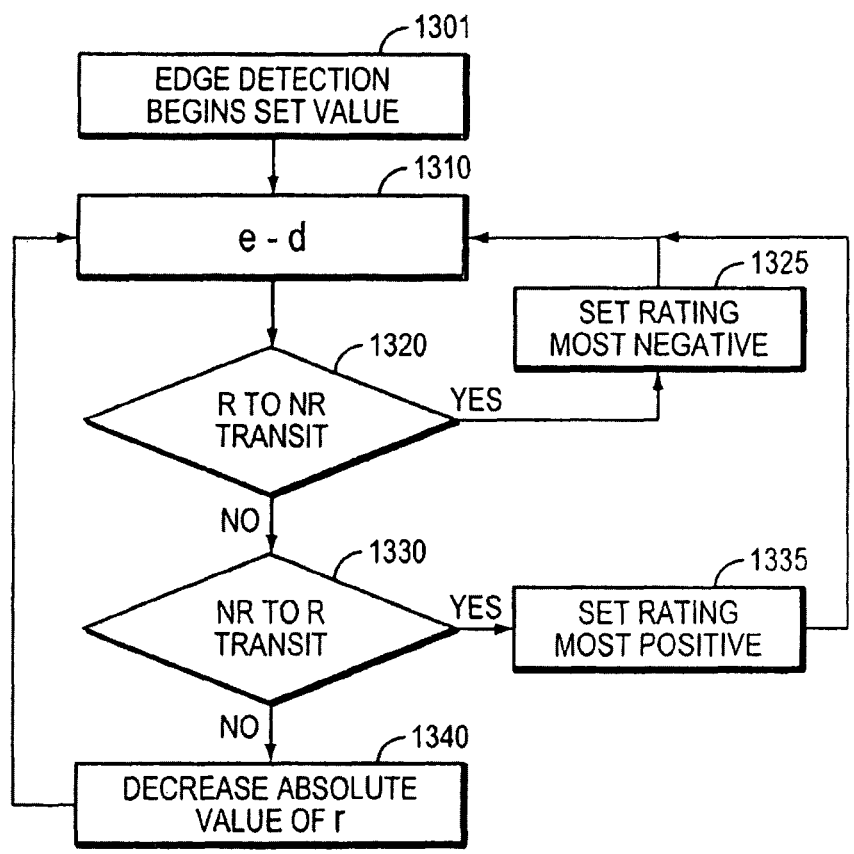
FIG. 21A is a flow-chart illustration of the obstacle-following algorithm of an embodiment of the invention.

The method used in one embodiment for following the wall is explained with reference to FIG. 21A and provides a smooth wall-following operation even with a one-bit sensor. (Here the one-bit sensor detects only the presence of absence of the wall within a particular volume rather than the distance between wall and sensor.) Other methods of detecting a wall or object can be used, such as bump sensing or sonar sensors.

Once the wall-following operational mode, or wall-following behavior of one embodiment is initiated (step 1301), the robot first sets its initial value for the steering at $r_0$. The wall-following behavior then initiates the emit-detect routine in the wall-follower sensor (step 1310). The existence of a reflection for the IR transmitter portion of the sensor translates into the existence of an object within a predetermined distance from the sensor. The wall-following behavior then determines whether there has been a transition from a reflection (object within range) to a non-reflection (object outside of range) (step 1320). If there has been a transition (in other words, the wall is now out of range), the value of r is set to its most negative value and the robot will veer slightly to the right (step 1325). The robot then begins the emit-detect sequence again (step 1310). If there has not been a transition from a reflection to a non-reflection, the wall-following behavior then determines whether there has been a transition from non-reflection to reflection (step 1330). If there has been such a transition, the value of r is set to its most positive value and the robot will veer slightly left (step 1335). In one embodiment, veering or turning is accomplished by driving the wheel opposite the direction of turn at a greater rate than the other wheel (i.e., the left wheel when veering right, the right wheel when veering left). In an alternative embodiment, both wheels may drive at the same rate, and a rearward or forward caster may direct the turn.

In the absence of either type of transition event, the wall-following behavior reduces the absolute value of r (step 1340) and begins the emit-detect sequence (step 1310) anew. By decreasing the absolute value of r, the robot 10 begins to turn more sharply in whatever direction it is currently heading. In one embodiment, the rate of decreasing the absolute value of r is a constant rate dependant on the distance traveled.

Figure 21B:
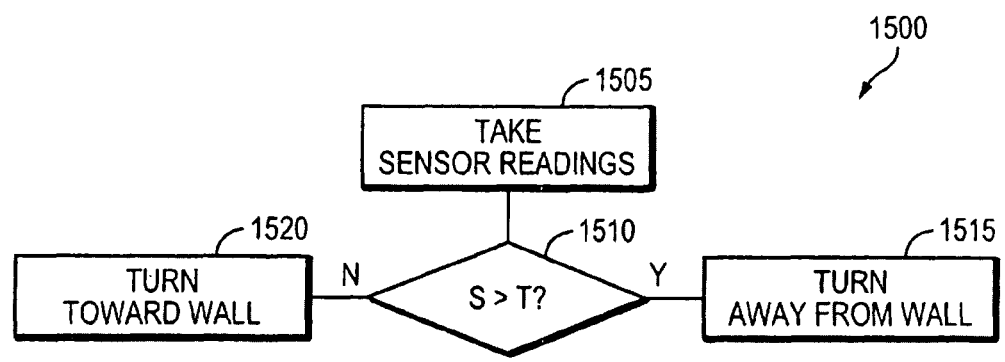
FIG. 21B is a flow-chart illustration of the obstacle-following algorithm of another embodiment of the invention.
Figure 21C:
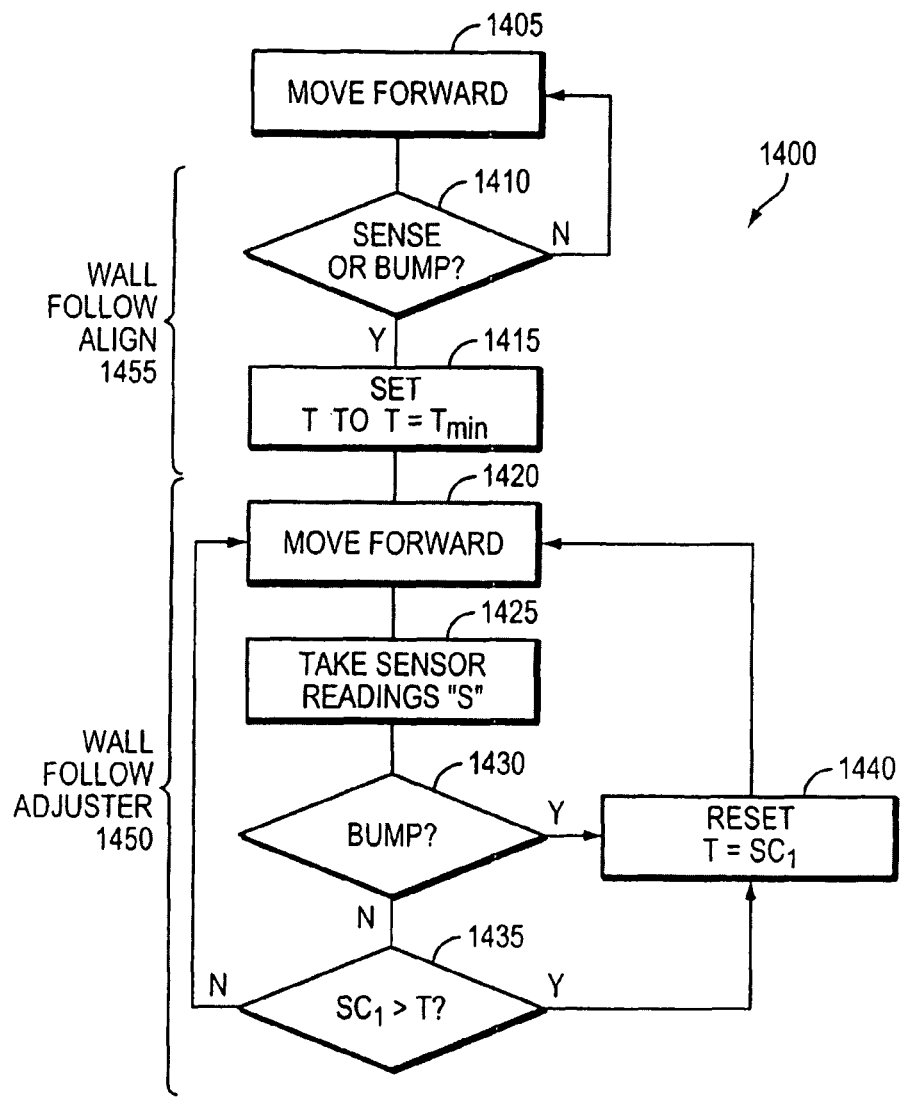
FIG. 21C is a flow-chart illustration of the threshold-adjustment subroutine of the algorithm depicted in FIG. 21B.

FIG. 21B, depicts another embodiment of the obstacle-following algorithm 1500 of the invention. The microprocessor takes sensor readings (step 1505) and monitors the strength of the signal detected by the wall-following sensor (S) against constantly updated and adjusted threshold values (T) (step 1510). The threshold adjustment algorithm is depicted in FIG. 21C, described below. In general, in order to follow along an obstacle, the robot is running a behavior that turns away from the wall if the sensor reading is greater than the threshold value (step 1515), and turns toward the wall if the sensor reading is less than the threshold value (step 1520). In certain embodiments, the value of the difference between S and T can be used to set the radius of the robot's turn, thereby reducing oscillations in wall-follow mode.

FIG. 21C depicts an embodiment of the threshold-adjustment subroutine utilized with the obstacle-following algorithm depicted in FIG. 21B. In this embodiment, the synchronous detection scheme 1400 inputs directly into the A/D port on the microprocessor of the robot. This allows sensor values (not merely the presence or absence of a wall, as described in FIG. 21A) to be used. The synchronous detection allows readings to be taken with and without the emitter powered, which allows the system to take into account ambient light.

FIG. 21C depicts the steps of setting and adjusting the threshold value (T). The program 1400 may run while the robot is in wall-following (or obstacle-following) mode. In the depicted embodiment, the robot is moving forward (step 1405) in any operational mode. The term "forward," is used here to describe any operational mode or behavior that is not the wall- or obstacle-following mode described herein. Such modes or behaviors include spiral, straightline, and bounce (or random) as described in U.S. Pat. No. 6,809,490, even though that movement does not consist solely of movement in a single direction. Entering wall-following mode occurs after the robot has sensed an obstacle through its optical or tactile sensors (step 1410). It is therefore assumed, at the time program 1400 begins, the robot is adjacent to a wall or obstacle. When the robot enters wall-following mode, it first sets the threshold value to a minimum level, $T_{min}$ (step 1415), and aligns the robot initially along the wall and begins moving along the wall (step 1420). The system then takes sensor readings (step 1425). In one embodiment, the detection scheme (step 1425) involves taking four readings and averaging the results. Additional filtering of the sensor input can be used to remove localized changes in the wall surface (e.g., spots of dirt, patches of missing or altered paint, dents, etc.)

The system then looks for either of two conditions to reset the threshold (T): (i) a bump event (i.e. contact with the wall) (step 1430) or (ii) if S times $C_1$ exceeds T (step 1435), where in one embodiment $C_1$ is 0.5. In general, $C_1$ should be between 0 and 1, where a higher value causes the robot to follow closer to the wall. If T is to be reset, it is set to $SC_1$ (step 1440). If neither condition is met, the system continues to move along the wall (step 1420) and take additional sensor readings (step 1425).

In the embodiment of the threshold-adjustment algorithm depicted in FIG. 21C, the process called "wall-follow-adjuster" 1450 is constantly updating the threshold (T) based on the current signal from the wall sensor (S). The behavior called "wall-follow-align" 1455 initializes the threshold on a bump or sensor detection of a wall or other obstacle (step 1410). Near the beginning of this algorithm, it sets the threshold (step 1415) based on the sensor signal without the check done in the "wall-follow-adjuster" process (i.e., step 1435) that ensures that the new threshold is higher (step 1440).

Other embodiments of the wall-following sensor and system include the ability to vary the power or sensitivity of the emitter or detector. A stronger emitted signal, for example, would allow the robot to effectively follow the contours of a wall or other obstacle at a further distance. Such an embodiment would allow a robot to deliberately mop or vacuum, for example, an entire large room following the contours of the wall from the outer wall to the innermost point. This would be an extremely efficient way to clean large rooms devoid of furniture or other obstructions, such as ballrooms, conference centers, etc.

The sensor system may also take readings at various distances from the wall (e.g., at the wall and after a small amount of movement) to set the threshold. Such an embodiment would be particularly useful to increase the likelihood that the robot never touch obstacles (such as installation art pieces in museums) or walls in architecturally sensitive buildings (such as restored mansions and the like). Other embodiments of the wall detection system use multiple receivers at different distances or angles so as to accommodate differences caused by various reflective surfaces or single surfaces having different reflectivities due to surface coloration, cleanliness, etc. For example, some embodiments may have multiple detectors set at different depths and/or heights within the robot housing.

Other embodiments of the sensor subsystem may utilize an emitter to condition the value of the signal that corresponds to an object. For example, the detection sequence may include emitting a signal from an LED emitter and detecting the signal and corresponding value. The system may then detect a signal again, without emitting a corresponding signal. This would allow the robot to effectively minimize the effect of ambient light or walls of different reflectivities.

The wall-follower mode can be continued for a predetermined or random time, a predetermined or random distance, or until some additional criteria are met (e.g., bump sensor is activated, etc.). In one embodiment, the robot continues to follow the wall indefinitely. In another embodiment, minimum and maximum travel distances are determined, whereby the robot will remain in wall-following behavior until the robot has either traveled the maximum distance or traveled at least the minimum distance and encountered an obstacle. This implementation of wall-following behavior ensures the robot spends an appropriate amount of time in wall-following behavior as compared to its other operational modes, thereby decreasing systemic neglect and distributing coverage to all areas. By increasing wall-following, the robot is able to move in more spaces, but the robot is less efficient at cleaning any one space. In addition, by exiting the wall-following behavior after obstacle detection, the robot increases the users' perceived effectiveness.

Figure 22:
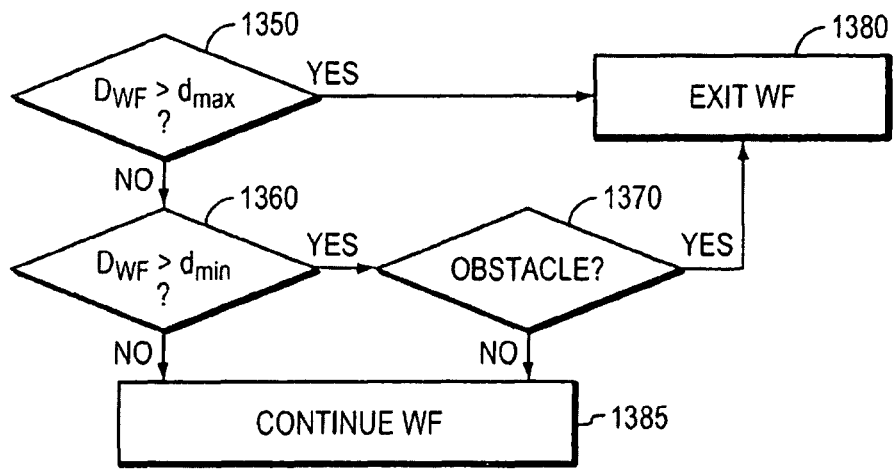
FIG. 22 is a flow-chart illustration of an algorithm for determining when to exit the obstacle following mode.

FIG. 22 is a flow-chart illustration showing an embodiment of determining when to exit wall-following behavior. The robot first determines the minimum distance to follow the wall ($d_{min}$) and the maximum distance to follow the wall ($d_{max}$). While in wall (or obstacle) following mode, the control system tracks the distance the robot has traveled in that mode ($d_{wf}$). If $d_{wf}$ is greater than $d_{max}$ (step 1350), then the robot exits wall-following mode (step 1380). If, however, $d_{wf}$ is less than $d_{max}$ (step 1350) and $d_{wf}$ is less than $d_{max}$ (step 1360), the robot remains in wall-following mode (step 1385). If $d_{wf}$ is greater than $d_{min}$ (step 1360) and an obstacle is encountered (step 1370), the robot exits wall-following mode (step 1380).

Theoretically, the optimal distance for the robot to travel in wall-following behavior is a function of room size and configuration and robot size. In a preferred embodiment, the minimum and maximum distance to remain in wall-following are set based upon the approximate room size, the robot's width and a random component, where by the average minimum travel distance is 2 w/p, where w is the width of the work element of the robot and p is the probability that the robot will enter wall-following behavior in a given interaction with an obstacle. By way of example, in one embodiment, w is approximately between 15 cm and 25 cm, and p is 0.095 (where the robot encounters 6 to 15 obstacles, or an average of 10.5 obstacles, before entering an obstacle following mode). The minimum distance is then set randomly as a distance between approximately 115 cm and 350 cm; the maximum distance is then set randomly as a distance between approximately 170 cm and 520 cm. In certain embodiments the ratio between the minimum distance to the maximum distance is 2:3. For the sake of perceived efficiency, the robot's initial operation in an obstacle-following mode can be set to be longer than its later operations in obstacle following mode. In addition, users may place the robot along the longest wall when starting the robot, which improves actual as well as perceived coverage.

The distance that the robot travels in wall-following mode can also be set by the robot depending on the number and frequency of objects encountered (as determined by other sensors), which is a measure of room "clutter." If more objects are encountered, the robot would wall follow for a greater distance in order to get into all the areas of the floor. Conversely, if few obstacles are encountered, the robot would wall follow less in order to not over-cover the edges of the space in favor of passes through the center of the space. An initial wall-following distance can also be included to allow the robot to follow the wall a longer or shorter distance during its initial period where the wall-following behavior has control.

In one embodiment, the robot may also leave wall-following mode if the robot turns more than, for example, 270 degrees and is unable to locate the wall (or object) or if the robot has turned a total of 360 degrees since entering the wall-following mode.

In certain embodiments, when the wall-following behavior is active and there is a bump, the align behavior becomes active. The align behavior turns the robot counter-clockwise to align the robot with the wall. The robot always turns a minimum angle. The robot monitors its wall sensor and if it detects a wall and then the wall detection goes away, the robot stops turning. This is because at the end of the wall follower range, the robot is well aligned to start wall-following. If the robot has not seen its wall detector go on and then off by the time it reaches its maximum angle, it stops anyway. This prevents the robot from turning around in circles when the wall is out of range of its wall sensor. When the most recent bump is within the side 60 degrees of the bumper on the dominant side, the minimum angle is set to 14 degrees and the maximum angle is 19 degrees. Otherwise, if the bump is within 30 degrees of the front of the bumper on the dominant side or on the non-dominant side, the minimum angle is 20 degrees and the maximum angle is 44 degrees. When the align behavior has completed turning, it cedes control to the wall-following behavior.

For reasons of cleaning thoroughness and navigation, the ability to follow walls is essential for cleaning robots. Dust and dirt tend to accumulate at room edges. The robot therefore follows walls that it encounters to insure that this special area is well cleaned. Also, the ability to follow walls enables a navigation strategy that promotes full coverage. Using this strategy, the robot can avoid becoming trapped in small areas. Such entrapments could otherwise cause the robot to neglect other, possibly larger, areas.

But, it is important that the detected distance of the robot from the wall does not vary according to the reflectivity of the wall. Proper cleaning would not occur if the robot positioned itself very close to a dark-colored wall but several inches away from a light-colored wall. By using the dual collimation system of the subject invention, the field of view of the infrared emitter and detector are restricted in such a way that there is a limited, selectable volume where the cones of visibility intersect. Geometrically, the sensor is arranged so that it can detect both diffuse and specular reflection. Additionally, a manual shutter may be utilized on or in the robot housing to further limit the intersection of the cones of visibility or adjust the magnitude of the detected signal. This arrangement allows the designer to select with precision the distance at which the robot follows the wall independent of the reflectivity of the wall.

Figure 23:
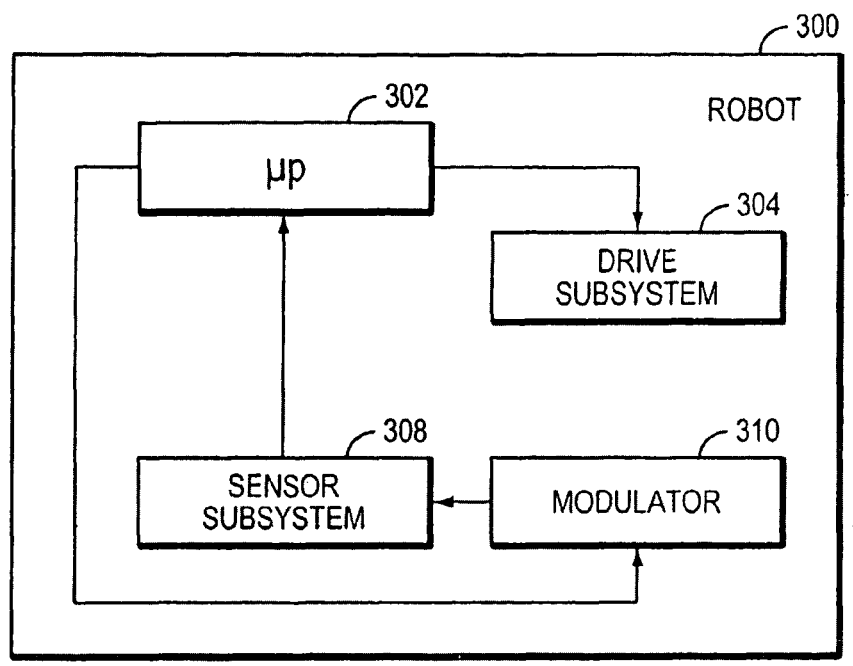
FIG. 23 is a block diagram showing the various components associated with a robotic cleaning device.

One robot system 300, FIG. 23, in accordance with this invention includes a circuit embodied in microprocessor 302 which controls drive motion subsystem 304 of robot 300 in both the random movement and wall-following modes to drive and turn the robot accordingly. Sensor subsystem 308 represents the designs discussed above with respect to FIGS. 5A-15. The detectors of each such subsystem provide an output signal to microprocessor 302 as discussed supra which is programmed according to the logic discussed with reference to FIGS. 16-17 to provide the appropriate signals to drive subsystem 304. Modulator circuitry 310 drives the emitters of the sensor subsystem 308 under the control of processor 302 as discussed above.

Figure 24:
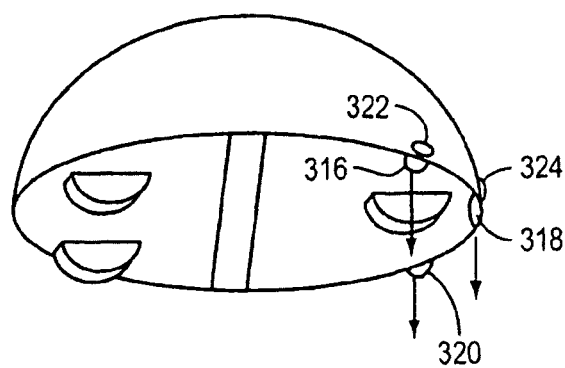
FIG. 24 is a schematic three-dimensional view of a robotic cleaning device employing a number of cliff sensors and wall sensors in accordance with one embodiment of the invention.

There may be three or more cliff-detector subsystems, as shown in FIG. 24, at locations 316, 318, and 320 spaced about the forward bottom portion of the robot and aimed downward and only one or two or more wall detector subsystems at locations 322 and 324 spaced about the forward portion of the robot housing and aimed outwardly.

Figure 25:
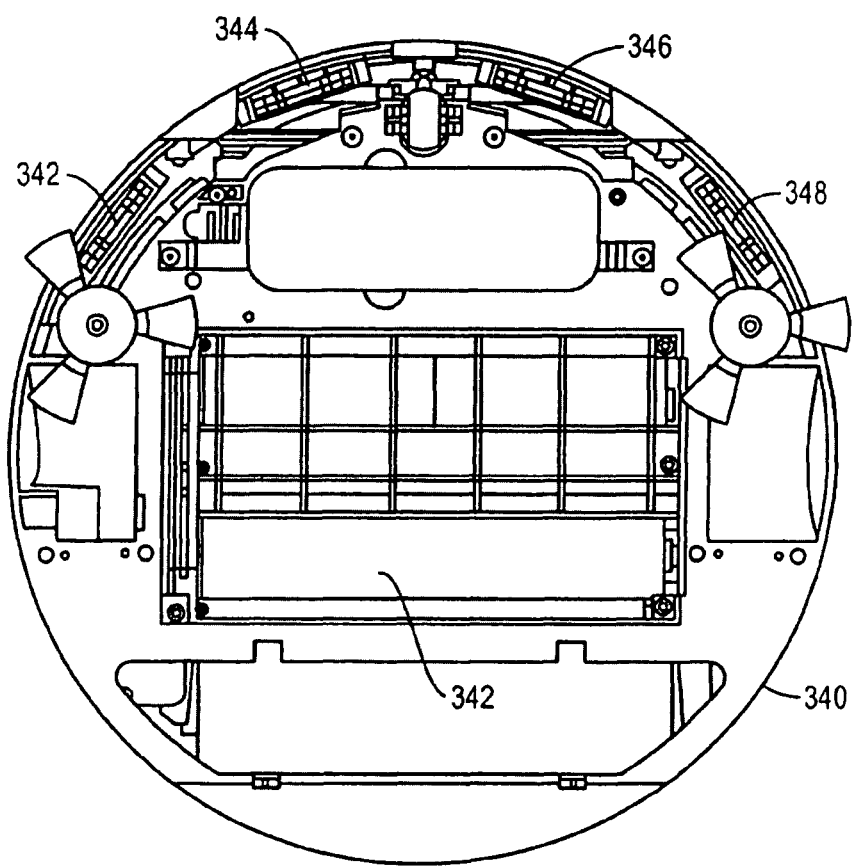
FIG. 25 is a bottom view of one particular robotic cleaning device and the cliff sensors incorporated therewith in accordance one embodiment of the invention.
Figure 26:
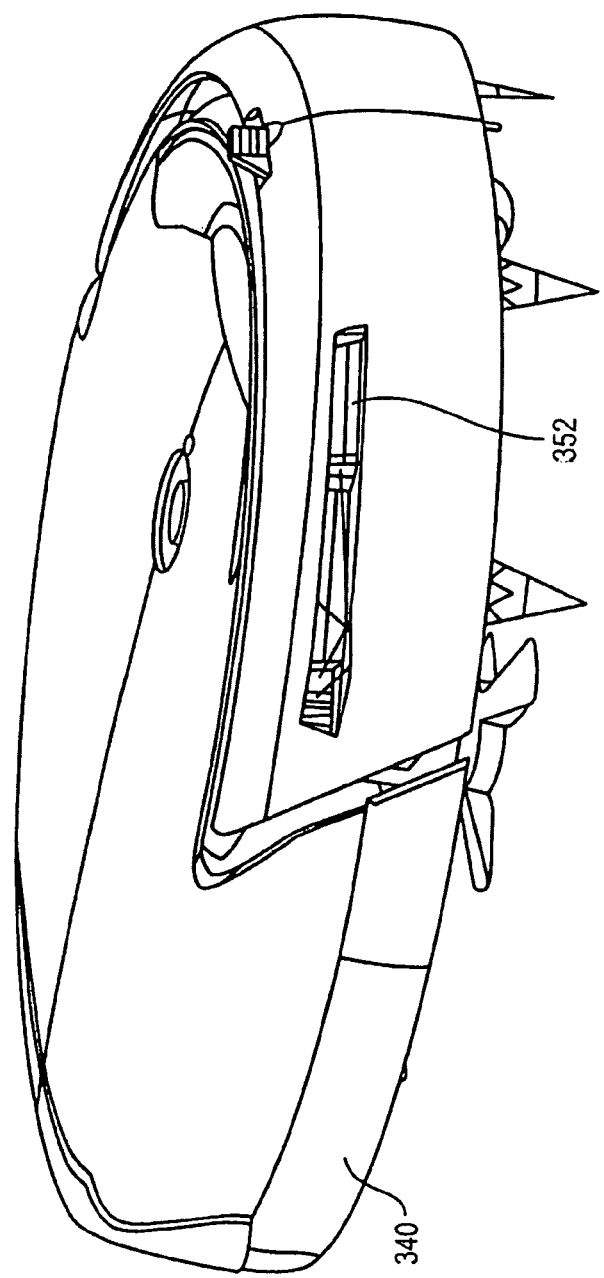
FIG. 26 is a side view of the robot of FIG. 25, further incorporating wall-following sensors in accordance with one embodiment of the invention.

In one embodiment, depicted in FIG. 25, a 12-inch diameter, three-wheeled, differentially-steered robot 340, is a sweeper-type cleaning robot equipped with sweeping brush 342 and includes four cliff-detector subsystems 342, 344, 346, and 348 and one wall-detector subsystem 352, FIG. 26. The output of the detectors of each subsystem are typically connected together by "OR" circuitry logic so that when any one detector detects a signal it is communicated to the processor.

Figure 27A:
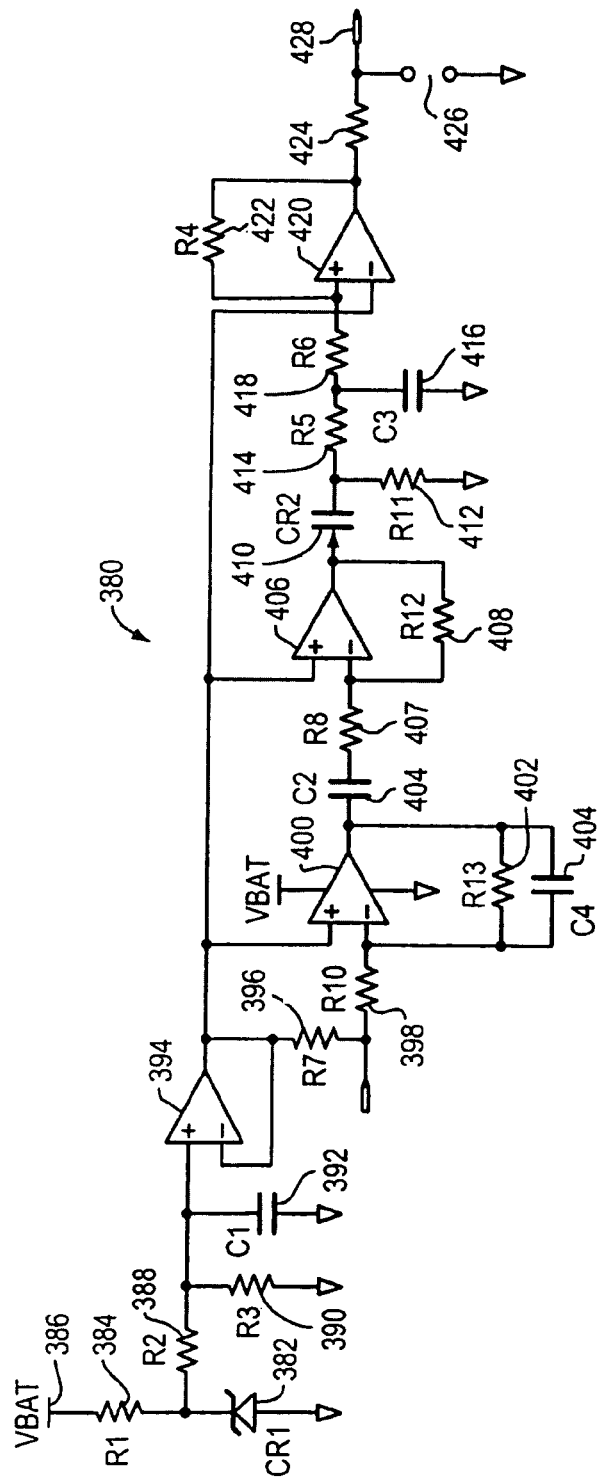
FIG. 27A is a circuit diagram for the detector circuit of one embodiment of the invention.

FIG. 27A shows one embodiment of a detector circuit. RI (384), CR1 (382), R2 (388), R3 (390), C1 (392), and U1:D (394) form a voltage reference used to prevent saturation of intermediate gain stages. In this embodiment, R1 (384) and CR1 (382) create from the input voltage (386) approximately 5.1V that is divided by voltage divider R2 (388), R3 (390) to create a voltage of approximately 1.8V. This is buffered by U1:D (394) configured as a unity gain follower. C1 (392) is provided to reduce noise. The photo-transistor (not shown) used in this embodiment requires a biasing current, provided from the above-described reference voltage through R7 (396). R10 (398), R13 (402), and U1:A (400) implement an amplifier with a gain of approximately −10. C4 (404) is provided for compensation and to reduce noise.

C2 (404) is used to block any DC component of the signal, while R8 (407), R12 (408), and U1:B (406) implement an amplifier with a gain of approximately −100. CR2 (410), R5 (414), and C3 (416) implement a peak detector/rectifier. R11 (412) provides a discharge path for C3 (416). The output of this peak detector is then compared to the above mentioned reference voltage by U1:C (420). R4 (422) provide hystersis. R9 (424) is a current limiting resistor used so that the output of U1:C (420) may be used to drive an indicator LED (not shown). Jumper JU1 (426) provides a convenient test point for debugging.

Figure 28:
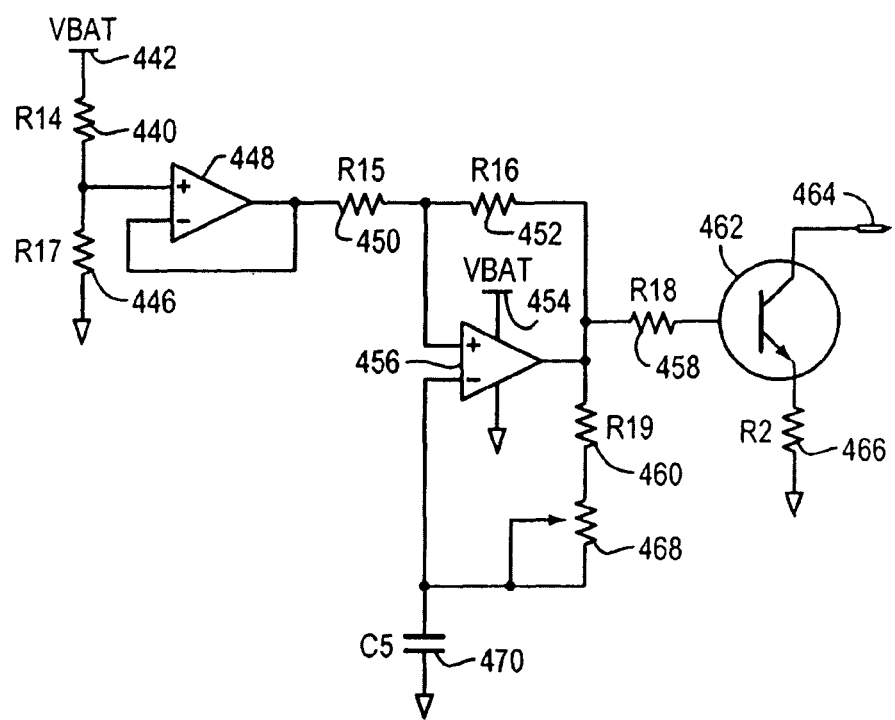
FIG. 28 is a circuit diagram for the oscillator circuit of one embodiment of the invention.

An oscillator circuit as shown in FIG. 28 is used to modulate the emitter IR LED at a frequency of several kHz. The exact frequency may be selected by adjusting R23 (468). Those skilled in the art will immediately deduce other ways of obtaining the same function. The simple filter/amplifier circuit of FIG. 27A is used to receive and amplify the output of a photo-transistor (not shown). A peak detector/integrator is used to convert the AC input to a threshold measurement. If sufficient energy in the selected bandwidth is received, the output signal is present at (428) is driven to a logical high state. Those skilled in the art will immediately recognize other ways of achieving the same ends. Components R14 (440), R17 (446), and U2:B (448) create a buffered bias voltage equal to approximately one-half of the input voltage (442). U2:A (456), R19 (460), R23 (468), and C5 (470) create a simple oscillator of a form commonly used. R18 (458), Q1 (462), and R21 (466) convert the voltage-mode oscillations of the oscillator described to current-mode oscillations in order that the emitter LED (connected to 464) be relatively constant current regardless of power supply voltage (442). The actual current impressed through the circuit may be altered to meet the requirements of the chosen LED by varying the value of R21 (466).

Figure 27B:
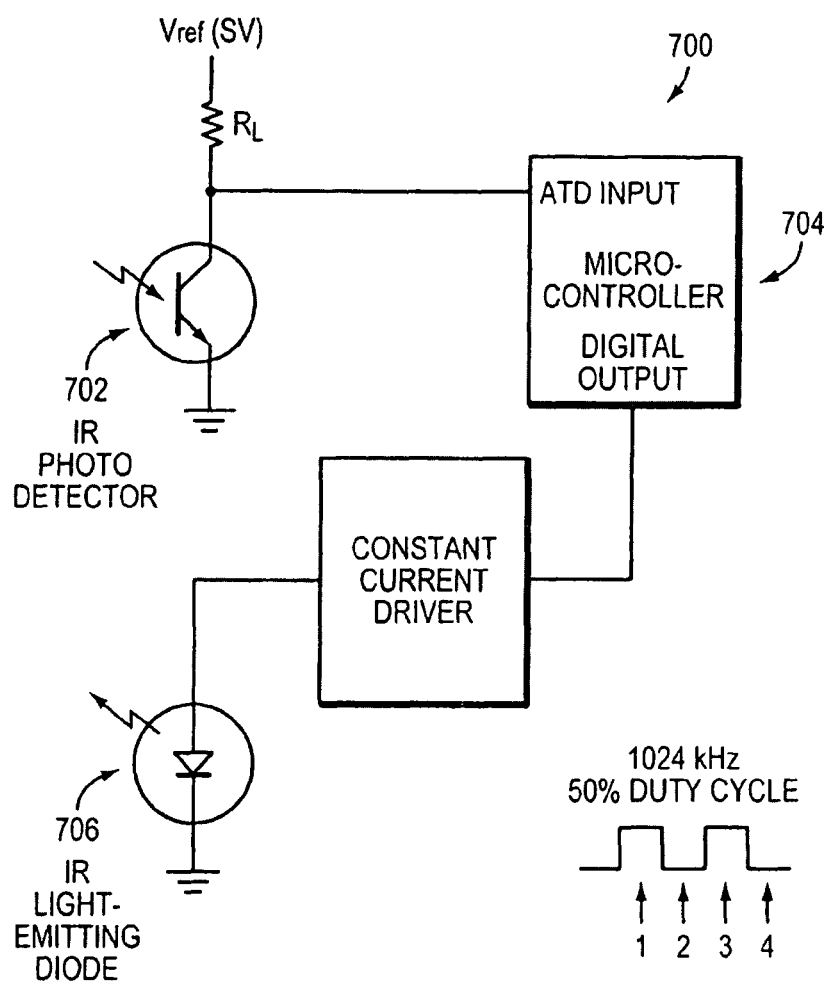
FIG. 27B is a circuit diagram for the detector circuit of another embodiment of the invention.

FIG. 27B depicts an embodiment of circuitry 700 that implements the wall-following behavior described in connection with FIG. 21B above. For this application, the four-stage circuit depicted in FIG. 27A can be replaced by a direct connection of a phototransistor light detector 702 to the analog input of the microcontroller 704. This significantly reduces the space required to implement the sensor system and reduces its cost, thus enabling more sensors to be used (for example, as additional proximity sensors around the circumference of a robot). In the depicted embodiment, an analog-to-digital conversion takes place within the microcontroller 704, and all signal processing is accomplished in the digital domain. This allows for maximum flexibility in the development of sensing algorithms.

This embodiment of the invention achieves a high response to the signal of interest, while minimizing the response to unwanted signals, by sampling the photodetector 702 at specific intervals synchronized with the modulated output of the infrared emitter 706. In this embodiment, moving-window averages of four IR-on and four IR-off samples are taken. In the figure, samples 1, 3, 5, and 7 are summed to produce an average IR-on value; samples 2, 4, 6, and 8 are summed to produce an average IR-off value. The difference between those averages represents the signal of interest. Because of the synchronous sampling, stray light, whether DC or modulated, has little effect on the measured signal.

Figure 29:
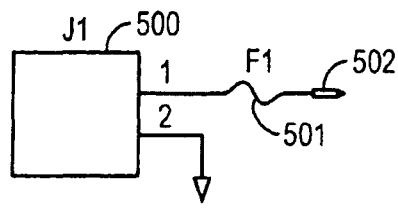
FIG. 29 is a circuit diagram for the power connection circuit of one embodiment of the invention.
Figure 30:
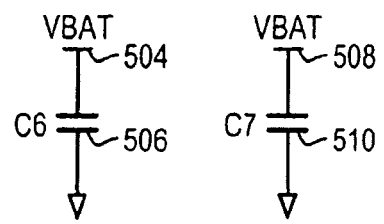
FIG. 30 is a decoupling circuit of one embodiment of the invention.
Figure 31:
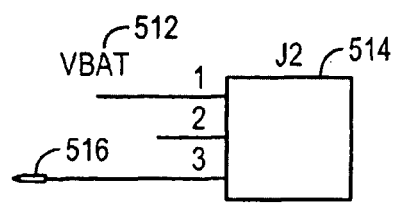
FIG. 31 is a diagram of a connector used in one embodiment of the invention.
Figure 32:
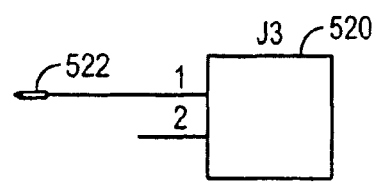
FIG. 32 is a diagram of another connector used in one embodiment of the invention.
Figure 33:
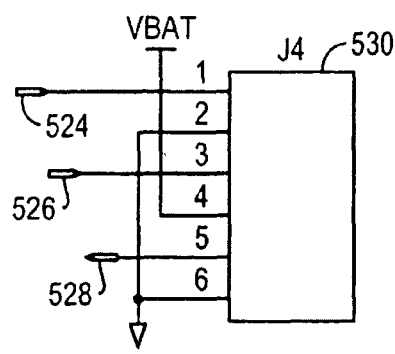
FIG. 33 is a diagram of still another connector used in one embodiment of the invention.
Figure 34:
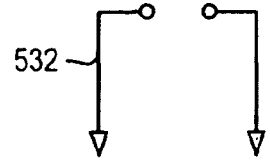
FIG. 34 is a circuit diagram of a jumper used in one embodiment of the invention.
Figure 35:
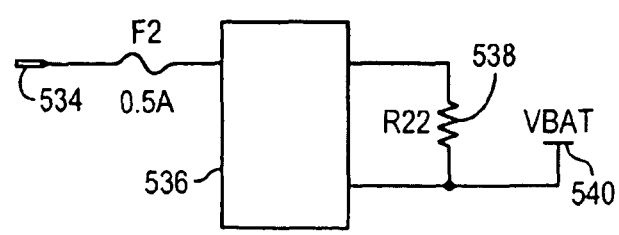
FIG. 35 is a circuit diagram for constant current source used in one embodiment of the invention.

In FIG. 29, a connector J1 (500) is used to connect the system to a means of supplying power (e.g., a battery). Fuse F1 (501) is included to limit excessive current flow in the event of a short circuit or other defect. Capacitors C6 (506) and C7 (510), FIG. 30 are provided for decoupling of other electronics (U1 and U2). Connector J2 (514), FIG. 31 provides a means of attachment for the IR LED transmitter (not shown). Connector J3 (520), FIG. 32 provides a means of attachment for the IR photo-transistor (not shown). Connector J4 (530), FIG. 33 provides a means of attachment for an indicator LED (to indicate the presence or absence of an obstacle, a means of attachment for a battery (not shown), and a means of attachment for a recharging power supply (not shown). Jumper JU2, FIG. 34, provides a convenient GROUND point for test equipment, etc. U3 (536) and R22 (538), FIG. 35 implements a constant-current source used in recharging an attached NiCad battery. U3 maintains a constant 5 volts between pins 3 and 2.5 volts divided by 22 Ohms (R22) creates a current of approximately 230 mA.

In other embodiments, a fiber optic source and detector may be used which operate similar to the sensor subsystems described above. The difference is that collimation is provided by the acceptance angle of two fiber optic cables. The fiber arrangement allows the emitter and detector to be located on a circuit board rather than mounted near the wheel of the robot. The cliff detector and wall detector can also be implemented using a laser as the source of the beam. The laser provides a very small spot size and may be useful in certain applications where the overall expense is not a priority design consideration. Infrared systems are desirable when cost is a primary design constraint. Infrared sensors can be designed to work well with all floor types. They are inexpensive and can be fitted into constrained spaces. In alternative embodiments audible or ultrasonic signals may be utilized for the emitter and/or detector.

Although specific features of the invention are shown in some drawings and not in others, this is for convenience only as each feature may be combined with any or all of the other features in accordance with the invention. The words "including," "comprising," "having," and "with" as used herein are to be interpreted broadly and comprehensively and are not limited to any physical interconnection. Moreover, any embodiments disclosed in the subject application are not to be taken as the only possible embodiments.

What is claimed is:

1. A method for operating a mobile robot, the method comprising the steps of:
   detecting the presence of a wall;
   driving the robot, based on the detecting, to follow the wall until the wall is no longer detected; and
   rotating the robot to seek the wall while determining:
      whether the wall is again detected,
      whether the robot is in contact with the wall, and
      whether the robot has turned a predetermined angle without detecting or contacting the wall,
   wherein detecting comprises defining a finite volume of intersection space between a signal emission region and a detection region and driving the robot comprises causing the robot to be directed back towards the wall while the wall does not occupy the intersection space.

2. The method of claim 1, further comprising realigning the robot for travel along the wall in response to contacting or again detecting the wall.

3. The method of claim 1, further comprising terminating a wall seeking routine in response to determining that the robot has turned a predetermined angle without encountering the wall.

4. The method of claim 1, further comprising detecting a level of ambient light and detecting a level of robot emitted light relative to the ambient light.

5. The method of claim 1, further comprising pivoting the robot 180 degrees about a wall end to follow an opposing side of the wall.

6. The method of claim 1, wherein driving the robot comprises maintaining a range of detected signal strength as a function of the orientation of the robot with respect to the wall.

7. The method of claim 1, further comprising varying the radius of rotation of the robot in response to the difference between a detected signal strength and a target signal strength.

8. The method of claim 1, further comprising terminating a wall following routine in response to determining that the robot has rotated 360 degrees in following the wall or in seeking the wall since last detecting the wall.

9. A method for operating a mobile robot, the method comprising the steps of:
   detecting the presence of a wall;
   driving the robot, based on the detecting, to follow the wall until the wall is no longer detected;
   rotating the robot to seek the wall while determining:
      whether the wall is again detected,
      whether the robot is in contact with the wall, and
      whether the robot has turned a predetermined angle without detecting or contacting the wall; and
   realigning the robot for travel along the wall in response to contacting or again detecting the wall.

10. A method for operating a mobile robot, the method comprising the steps of:
   detecting the presence of a wall;
   driving the robot, based on the detecting, to follow the wall until the wall is no longer detected;
   rotating the robot to seek the wall while determining:
      whether the wall is again detected,
      whether the robot is in contact with the wall, and
      whether the robot has turned a predetermined angle without detecting or contacting the wall; and
   terminating a wall seeking routine in response to determining that the robot has turned a predetermined angle without encountering the wall.

11. A method for operating a mobile robot, the method comprising the steps of:
   detecting the presence of a wall;
   driving the robot, based on the detecting, to follow the wall until the wall is no longer detected;
   rotating the robot to seek the wall while determining:
      whether the wall is again detected,
      whether the robot is in contact with the wall, and
      whether the robot has turned a predetermined angle without detecting or contacting the wall; and
   detecting a level of ambient light and detecting a level of robot emitted light relative to the ambient light.

12. A method for operating a mobile robot, the method comprising the steps of:
   detecting the presence of a wall;
   driving the robot, based on the detecting, to follow the wall until the wall is no longer detected; and
   rotating the robot to seek the wall while determining:
      whether the wall is again detected,
      whether the robot is in contact with the wall, and
      whether the robot has turned a predetermined angle without detecting or contacting the wall,
   wherein driving the robot comprises maintaining a range of detected signal strength as a function of the orientation of the robot with respect to the wall.

13. A method for operating a mobile robot, the method comprising the steps of:
   detecting the presence of a wall;
   driving the robot, based on the detecting, to follow the wall until the wall is no longer detected;
   rotating the robot to seek the wall while determining:
      whether the wall is again detected,
      whether the robot is in contact with the wall, and
      whether the robot has turned a predetermined angle without detecting or contacting the wall; and
   varying the radius of rotation of the robot in response to the difference between a detected signal strength and a target signal strength.

14. A method for operating a mobile robot, the method comprising the steps of:
   detecting the presence of a wall;
   driving the robot, based on the detecting, to follow the wall until the wall is no longer detected;
   rotating the robot to seek the wall while determining:
      whether the wall is again detected,
      whether the robot is in contact with the wall, and
      whether the robot has turned a predetermined angle without detecting or contacting the wall; and
   terminating a wall following routine in response to determining that the robot has rotated 360 degrees in following the wall or in seeking the wall since last detecting the wall.

* * * * *